(12) United States Patent
Kang et al.

(10) Patent No.: US 9,337,658 B2
(45) Date of Patent: May 10, 2016

(54) NETWORK SYSTEM

(75) Inventors: Daeyong Kang, Changwon-si (KR);
Yanghwan Kim, Changwon-si (KR);
Junho Ahn, Changwon-si (KR);
Jeongsang Seo, Changwon-si (KR);
Koonseok Lee, Changwon-si (KR);
Hoonbong Lee, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 877 days.

(21) Appl. No.: 13/579,439

(22) PCT Filed: Feb. 17, 2011

(86) PCT No.: PCT/US2011/025227
§ 371 (c)(1),
(2), (4) Date: Feb. 8, 2013

(87) PCT Pub. No.: WO2011/103278
PCT Pub. Date: Aug. 25, 2011

(65) Prior Publication Data
US 2013/0134781 A1   May 30, 2013

(30) Foreign Application Priority Data

| Feb. 17, 2010 | (KR) | ......................... 10-2010-0014154 |
| Mar. 9, 2010 | (KR) | ......................... 10-2010-0020599 |
| May 5, 2010 | (WO) | ................. PCT/KR2010/002851 |
| May 5, 2010 | (WO) | ................. PCT/KR2010/002852 |
| Jun. 10, 2010 | (WO) | ................. PCT/KR2010/003750 |
| Jun. 26, 2010 | (KR) | ......................... 10/2010/0060889 |
| Nov. 26, 2010 | (WO) | ................. PCT/IB2010/003388 |

(51) Int. Cl.
*H02J 3/14* (2006.01)
*H02J 4/00* (2006.01)
(Continued)

(52) U.S. Cl.
CPC . *H02J 4/00* (2013.01); *H02J 3/381* (2013.01); *H02J 13/0006* (2013.01); *H02J 2003/007* (2013.01); *Y02E 40/72* (2013.01); *Y02E 60/76* (2013.01); *Y04S 10/12* (2013.01);
(Continued)

(58) Field of Classification Search
CPC ............... H02J 4/00; G06F 1/26; G06F 17/60
See application file for complete search history.

(56) References Cited

U.S. PATENT DOCUMENTS 6,005,476 A    12/1999  Valiulis
6,577,962 B1 *  6/2003  Afshari .................. G06Q 10/06
                                              700/291

(Continued)

FOREIGN PATENT DOCUMENTS

JP    09-084146 A    3/1997
JP    2003-132121 A  5/2003
(Continued)

*Primary Examiner* — Kenneth B Wells
*Assistant Examiner* — Rafael Pacheco
(74) *Attorney, Agent, or Firm* — Dentons US LLP

(57) ABSTRACT

Provided is a network system including: a utility network including an energy generating unit; a home network consuming energy generated from the energy generating unit and including an energy consuming unit operating based on energy information including at least one energy price information; and a power adjusting device through which a current or a voltage supplied for an operation of the energy consuming unit is passed, wherein the power adjusting device reduces energy cost or an energy amount used by adjusting a voltage or current amount applied to the energy consuming unit based on the energy information.

14 Claims, 39 Drawing Sheets

US 9,337,658 B2
Page 2

(51) Int. Cl.
*H02J 3/38* (2006.01)
*H02J 13/00* (2006.01)
*H02J 3/00* (2006.01)

(52) U.S. Cl.
CPC .............. *Y04S 40/22* (2013.01); *Y10T 307/406* (2015.04); *Y10T 307/766* (2015.04)

(56) References Cited

U.S. PATENT DOCUMENTS

| | | | |
|---|---|---|---|
| 7,062,361 B1 | 6/2006 | Lane | |
| 2001/0025349 A1* | 9/2001 | Sharood | G06Q 30/0235 713/340 |
| 2001/0048030 A1 | 12/2001 | Sharood et al. | |
| 2003/0178894 A1 | 9/2003 | Ghent | |
| 2005/0138929 A1 | 6/2005 | Enis et al. | |
| 2007/0239317 A1 | 10/2007 | Bogolea et al. | |
| 2008/0114499 A1 | 5/2008 | Hakim et al. | |
| 2009/0058361 A1* | 3/2009 | John | A61N 1/3785 320/128 |
| 2009/0195349 A1* | 8/2009 | Frader-Thompson | G01D 4/002 340/3.1 |

FOREIGN PATENT DOCUMENTS

| | | |
|---|---|---|
| JP | 2004-072900 A | 3/2004 |
| JP | 2006-331372 A | 12/2006 |
| JP | 2007-523580 A | 8/2007 |
| JP | 2008-141925 A | 6/2008 |
| KR | 10-2004-0038129 A | 5/2004 |
| KR | 10-0615790 B1 | 8/2006 |
| KR | 10-2001-0020018 A | 3/2007 |
| KR | 10-2007-0098172 A | 10/2007 |
| KR | 10-2009-0034433 A | 4/2009 |
| KR | 10-2009-0046543 A | 5/2009 |
| KR | 10-0918923 B1 | 9/2009 |

* cited by examiner

NETWORK SYSTEM

CROSS-REFERENCE TO RELATED APPLICATIONS

This application claims the benefit of priority of PCT/US2011/025227 filed on Feb. 17, 2011, PCT Application No. PCT/KR2010/002852 filed on May 5, 2010, PCT Application No. PCT/KR2010/002851 filed on May 5, 2010 PCT Application No. PCT/KR2010/003750 filed on Jun. 10, 2010, PCT Application No. PCT/IB2010/003388 filed on Nov. 26, 2010, Korean Application No. 10-2010-0014154 filed on Feb. 17, 2010, Korean Application No. 10-2010-0020599 filed on Mar. 9, 2010 and Korean Application No. 10-2010-0060889 filed on Jun. 26, 2010, all of which are incorporated by reference in their entirety herein.

BACKGROUND

The present disclosure relates to a network system.

Providers simply provided an energy source such as electricity, water or gas, and customers simply used the energy source provided from the providers. As a result, it was difficult to perform effective management in view of energy production, energy distribution, energy usage, or the like. Therefore, it is required to develop a network system for effectively managing energy.

SUMMARY

Embodiments provide a network system capable of effectively managing an energy source.

In one embodiment, a network system includes: a utility network including an energy generating unit; a home network consuming energy generated from the energy generating unit and including an energy consuming unit operating based on energy information including at least one energy price information; and a power adjusting device through which a current or a voltage supplied for an operation of the energy consuming unit is passed, wherein the power adjusting device reduces energy cost or an energy amount used by adjusting a voltage or current amount applied to the energy consuming unit based on the energy information.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings. A network system according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

Figure 1:
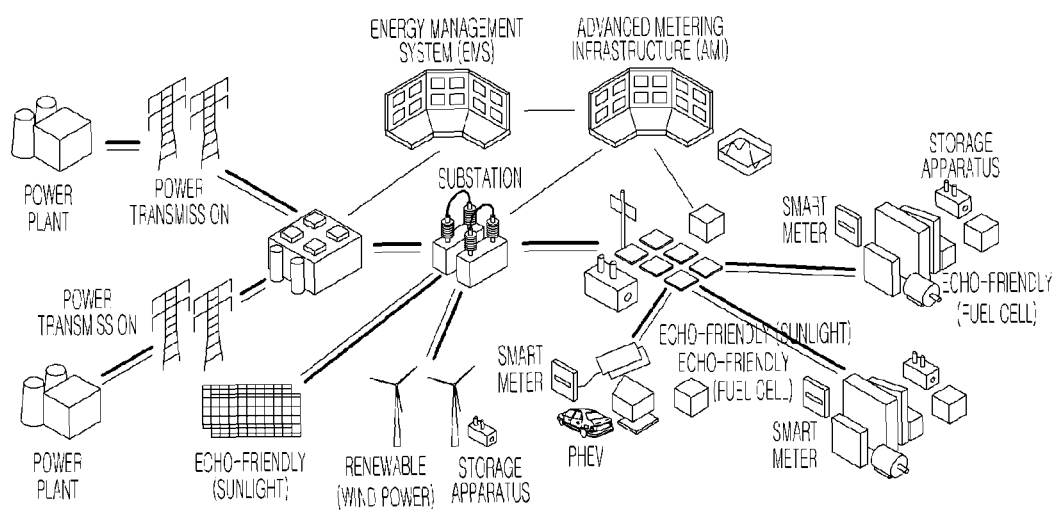
FIG. 1 is a view schematically showing an example of a network system according to the present disclosure.

FIG. 1 is a view schematically showing an example of a network system according to the present disclosure.

The network system is a system for managing an energy source such as electricity, water or gas. The energy source means one of which amount generated or used can be metered. Therefore, even a source not mentioned above may be used as the energy source. Hereinafter, electricity will be described as an example of the energy source, and details of this specification may be identically applied to other energy sources.

Referring to FIG. 1, a network system according to an embodiment includes a power plant for producing electricity. The power plant may include a power plant for producing electricity through a thermal power generation or nuclear power generation and a power plant using water power, sunlight power, wind power or the like which is eco-friendly energy.

The electricity produced in the power plant is transmitted to a sub-control center through a power transmission line, and the sub-control center transmits the electricity to a substation so that the electricity is distributed to customers such as houses or offices. Electricity produced by the eco-friendly energy is also transmitted to the substation so as to be distributed to each of the customers. The electricity transmitted from the substation is distributed to each of the offices or houses through electricity power storage, or is directly distributed to each of the offices or houses.

In a house using a home area network (HAN), electricity may be produced by itself through sunlight, fuel cells built in a plug-in hybrid electric vehicle (PHEV), or the like. Also, the produced electricity may be stored or distributed, or surplus electricity may be resold to the outside world.

The network system may include a smart meter for detecting the amount of electricity used in each customer (house, office or the like) in real time, and an advanced metering infrastructure (AMI) for metering the amount of electricity used in a plurality of customers.

The network system may further include an ENERGY MANAGEMENT SYSTEM (EMS) for managing energy. The EMS may generate information on operations of one or more components with respect to energy (production of energy, distribution of energy, usage of energy, storage of energy, and the like). The EMS may generate at least a command for the operations of the components.

In this specification, a function or solution performed by the EMS may be referred to as an energy management function or energy management solution. In the network system, one or more EMSs may be provided as a separate configuration, or the EMS may be included as an energy management function or energy management solution in one or more components.

Figure 2:
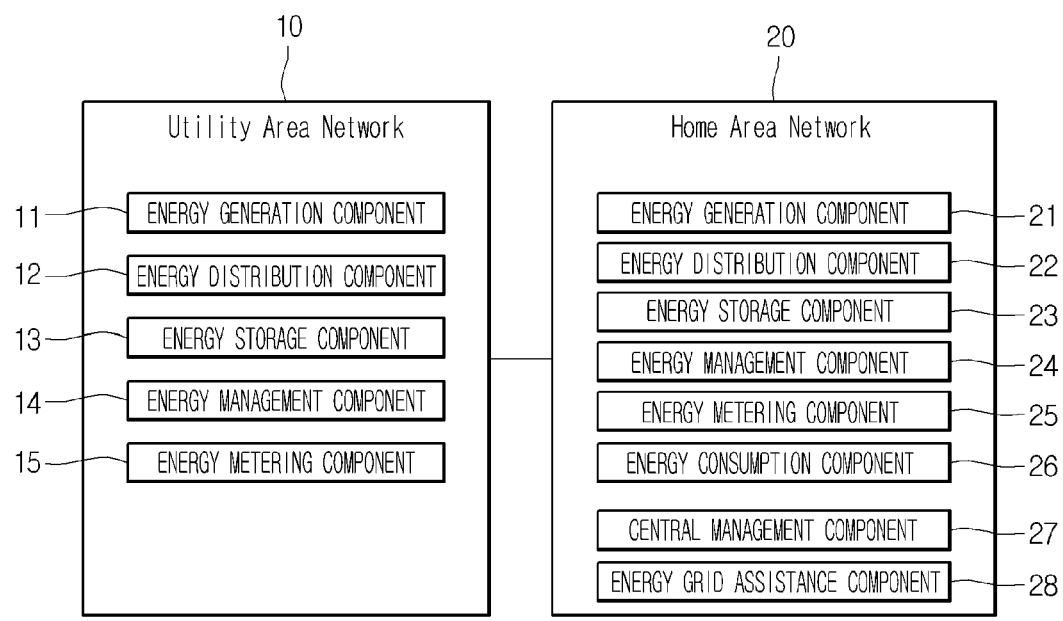
FIG. 2 is a block diagram schematically showing an example of the network system according to the present disclosure.

FIG. 2 is a block diagram schematically showing an example of the network system according to the present disclosure.

Referring to FIGS. 1 and 2, the network system according to the present disclosure is configured by a plurality of components. For example, the components of the network system are a power plant, a substation, a sub-control center, an EMS, electric home appliances, a smart meter, a storage battery, a web server, an AMI, a home server, and the like.

In the present disclosure, each of the components may be configured by a plurality of sub-components. As an example, in a case of one component is an electric home appliance, sub-components may be a microcomputer (MICOM), a heater, a display and the like. That is, all that perform a specific function may be components in the present disclosure, and such components constitute the network system of the present disclosure. Two components may communicate with each other by means of a communication unit.

One network may be one component or may be configured by a plurality of components. In this specification, the network system in which communication information is related to an energy source may be referred to as an energy grid.

A network system according to an embodiment may include a utility area network (UAN) 10 and a home area network (HAN) 20. The UAN 10 and the HAN 20 may perform wired or wireless communication by means of a communication unit, and may perform two-way communication. In this specification, the term "home" means not only a household as a lexical meaning but also a group in which specific components such as buildings or companies gather. Also, the term "utility" means a group in which specific components outside the home gather.

The UAN 10 includes an energy generation component 11 for generating energy, an energy distribution component 12 for distributing or transmitting energy, an energy storage component for storing energy, an energy management component 14 for managing energy, and an energy metering component 15 for metering information related to energy.

In a case where one or more components that constitute the UAN 10 consume energy, the components that consume the energy may be energy consumption components. The energy consumption component is a component corresponding to the energy consumption component 26 that constitutes the HAN 20. The energy consumption component may be the same component as the energy consumption component 26 or may be another component distinguished from the energy consumption component 26.

The energy generation component 11 may be a power plant as an example. The energy distribution component 12 distributes or transmits energy generated in the energy generation component 11 and/or energy stored in the energy storage component 13 to the energy consumption component 26 that consumes the energy. The energy distribution component 12 may be a power transmitter, substation, sub-control center, or the like.

The energy storage component 13 may be a storage battery, and the energy management component 14 generates information for driving one or more of the energy generation component 11, the energy distribution component 12, the energy storage component 13 and the energy consumption component 26, related to energy. The energy management component 14 may generate at least a command for the operation of a specific component.

The energy management component 14 may be an EMS. The energy metering component 15 may meter information related to the generation of energy, the distribution of energy, the usage of energy, the storage of energy, and the like. The energy metering component 15 may be an AMI as an example. The energy management component 14 may be a separate configuration, or may be included in another component as an energy management function.

The UAN 10 may communicate with the HAN 20 by a terminal component (not shown). That is, information generated or transferred in a specific component that constitutes the UAN may be transmitted to the HAN 20 through the terminal component, or information generated or transferred in another component that constitutes the HAN 20 may be received to the UAN 10 through the terminal component. The terminal component may be a gate way as an example. The terminal component may be provided to one or more of the UAN 10 and the HAN 20. The terminal component may be a component necessary for transmitting/receiving information between the UAN and the HAN. Two components that constitute the UAN 10 may communicate with each other by means of a communication unit.

The HAN 20 includes an energy generation component 21 for generating energy, an energy distribution component 22 for distributing energy, an energy storage component 23 for storing energy, an energy management component 24 for managing energy, an energy metering component 25 for metering information related to energy, an energy consumption component 26 for consuming energy, a central management component 27 for controlling a plurality of components, and an energy grid assistance component 28.

The energy generation component 21 may be a home power generator, and the energy storage component 23 may be a storage battery. The energy management component 24 may be an EMS, and the energy metering component 25 may meter information related to the generation of energy, the distribution of energy, the usage of energy, the storage of energy, and the like. The energy metering component 25 may be a smart meter as an example. The energy consumption component 26 may be, as an example, an electric home appliance or a heater, motor, display or the like, which constitutes the electric home appliance. In this embodiment, there is no limitation in the kind of the energy consumption component 26.

Specifically, the energy generation component 21 may be another component of the UAN 10, which generates energy to be supplied to the HAN 20. The energy management component 24 may be provided as a separate configuration or may be included in another component as an energy management function.

Specifically, the energy management component 14 that constitutes the UAN 10 or the energy management component 24 that constitutes the HAN 20 may be built in one or more of the plurality of components that constitute the networks 10 and 20, or may exist as a separate device. The energy management component 24 may recognize the information related to energy (energy information) and the state information of a component controlled by the energy management component 24.

The energy generation component 21, the energy distribution component 22 and the energy storage component 23 may be individual components, or may constitute a single component. The central management component 27 may be, as an example, a home server for controlling a plurality of electric home appliances.

The energy grid assistance component 28 is a component having a primary function while performing an additional function for the energy grid. For example, the energy grid assistance component 28 may be a web service providing component (e.g., a computer or the like), mobile device, television, or the like. Two components that constitute the HAN 20 may communicate with each other by means of a communication unit.

The energy generation components 11 and 21, the energy distribution components 12 and 22, the energy storage components 13 and 23, the energy management components 14 and 24, the energy metering components 15 and 25, the energy consumption component and the central management component 27 may independently exist, or two or more of them may constitute a single component.

For example, the energy management component 14 or 24, the energy metering component 15 or 25 and the central management component 27 may exist as single components so as to be configured as a smart meter, an EMS and a home server, which perform their functions, respectively. Alternatively, the energy management component 14 or 24, the energy metering component 15 or 25 and the central management component 27 may constitute a single system.

When a function is performed, it may be sequentially performed in a plurality of components and/or communication units. For example, an energy management function may be sequentially performed in the energy management component, the energy metering component and the energy consumption component.

In the network system, a plurality of UANs 10 may communicate with a single HAN 20, and a single UAN 10 may communicate with a plurality of HANs 20. The component with a specific function, which constitutes the UAN and the HAN, may be configured as a plurality of components. For example, the energy generation component, the energy consumption component or the like may be configured as a plurality of components.

Figure 3:
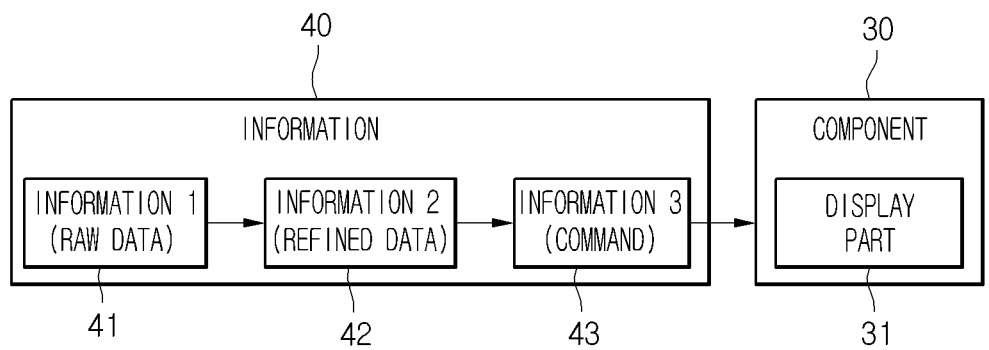
FIG. 3 is a block diagram showing an information transmission process on the network system according to the present disclosure.

FIG. 3 is a block diagram showing an information transmission process on the network system according to the present disclosure.

Referring to FIG. 3, in the network system according to the present disclosure, a specific component 30 may receive information related to energy (hereinafter, referred to as energy information 40) by means of a communication unit. The specific component 30 may further receive additional information (environment information, time information and the like) by means of the communication unit. In this instance, the information may be received from another component. That is, at least energy information is contained in the received information. The specific component 30 may be a component that constitutes the UAN 10 or a component that constitutes the HAN 20.

As described above, the energy information 40 may be one of information related to electricity, water, gas and the like. Hereinafter, information related to electricity will be described as an example of the energy information, but information related to other energy sources may be identically applied.

For example, the kind of information related to the electricity may include time-based pricing, curtailment, grid emergency, grid reliability, energy increment, operation priority, and the like.

The information may be divided into scheduled information previously produced based on previous information, and real-time information changed in real time. The scheduled information and the real-time information may be divided by whether or not predict information after the current time (in the future).

The energy information 40 may be transmitted/received as a true or false signal such as a Boolean signal on the network system, or may be transmitted/received as a real price. Alternatively, the energy information 40 may be transmitted/received by being divided into a plurality of levels. The energy information 40 may be divided into time of use (TOU) information, critical peak pattern (CPP) information or real time pattern (RTP) information according to the change in the pattern of data with respect to time.

According to the TOU information, a data is changed step by step depending on time. According to the CPP information, a data is changed step by step or in real time depending on time, and emphasis is displayed at a specific point of time. According to RTP information, a data is changed in real time depending on time.

In a case where the energy information is time-based pricing information as an example, the time-based pricing information is changed. The time-based pricing information may be transmitted/received as a true or false signal such as a Boolean signal on the network system, or may be transmitted/received as a real price. Alternatively, the time-based pricing information may be transmitted/received by being divided into a plurality of levels.

In a case where the specific component 30 receives a true or false signal such as a Boolean signal, one signal may be recognized as an on-peak signal, and the other signal may be recognized as an off-peak signal.

Alternatively, the specific component 30 may recognize information on at least one drive, which contains the time-based information, and may recognize an on-peak or off-peak signal by comparing the value of the recognized information with the value of reference information. For example, in a case where the specific component 30 recognizes information divided into levels or real pricing information, it recognizes an on-peak or off-peak signals by comparing the value of the recognized information with the value of reference information.

In this case, the value of the information on drive may be at least one of time-based pricing, electric energy, the variation of time-based pricing, the variation of electric energy, the average of time-based pricing and the average of electric energy. The value of reference information may be at least one of an average, the average between maximum and minimum values of power information during a predetermined period of time and the reference variation of power information during the predetermined period of time (e.g., the slope of consumed electric energy per unit time).

The value of reference information may be determined in real time or may be previously determined. The value of reference information may be determined on the UAN or may be determined on the HAN (a customer's direct input or an input from the energy management component, the central management component or the like).

In a case where the specific component 30 (e.g., the energy consumption component) recognizes an on-peak signal (e.g., at a point of time of recognition), an output may be determined as zero (stop or maintenance of a stop state) or may be decreased. If necessary, the output may be restored or increased. The driving scheme of the specific component may be previously determined before the specific component is operated, or may be changed when the specific component recognizes an on-peak signal posterior to the start of operation.

Alternatively, in a case where the specific component 30 recognizes an on-peak signal (e.g., at a point of time of recognition), the output is maintained under an operable condition. In this case, the operable condition means that the value of the information on drive is less than a predetermined reference. The value of the information on drive may be time-based pricing, consumed electric energy, operation time, or the like. The predetermined reference may be a relative or absolute value.

The predetermined reference may be determined in real time or may be previously determined. The predetermined reference may be determined on the UAN or may be determined on the HAN (a customer's direct input or an input from the energy management component, the central management component or the like).

Alternatively, in a case where the specific component 30 recognizes an on-peak signal (e.g., at a point of time of recognition), the output may be increased. However, although the output is increased at the point of time when the specific component recognizes the on-peak signal, the total output amount of the specific component during the entire drive period may be decreased or maintained as compared with that when the specific component is operated at a normal output level. Alternatively, although the output is increased at the point of time when the specific component recognizes the on-peak signal, the total consumed power or total time-based pricing of the specific component during the entire operation period may be decreased as compared that when the specific component is operated at a normal output level.

In a case where the specific component 30 recognizes an off-peak signal (e.g., at a point of time of recognition), the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

The curtailment information is information related to a mode in which the specific component is stopped or a small amount of time-based pricing is taken. As an example, the curtailment information may be transmitted/received as a true or false signal such as a Boolean signal on the network system. If the specific component 30 recognizes curtailment information, the output may be determined as zero (stop or maintenance of a stop state) or may be decreased as described above.

The grid emergency information is information related to a power failure or the like. As an example, the grid emergency information may be transmitted/received as a true or false signal such as a Boolean signal on the network system. The information related to a power failure or the like has a relation with the reliability of a component using energy. In a case where the specific component 30 recognizes grid emergency information, it may be immediately shut down.

The grid reliability information is information related to the supply amount of electricity supplied or information related to the quality of electricity. The grid reliability information may be transmitted/received as a true or false signal such as a Boolean signal on the network system, or may be determined by a component (e.g., an electric home appliance) through the frequency of AC power supplied to the component.

That is, if a frequency lower than the frequency of AC power supplied to the component is sensed, it may be determined that the amount of electricity supplied is small (information on the deficiency of the amount of electricity supplied). If a frequency higher than the frequency of AC power supplied to the component is sensed, it may be determined that the amount of electricity supplied is large (information on the excess of the amount of electricity supplied).

In a case where the specific component recognizes shortage of the amount of electricity or poor quality of electricity in the grid reliability information, an output may be determined as zero (stop or maintenance of a stop state) or may be decreased. If necessary, the output may be restored or increased. On the other hand, in a case where the specific component recognizes the information on the excess of the amount of electricity supplied, the output may be increased, or the operation may be converted from an off-state to an on-state.

The energy increment information is information related to a state that surplus electricity is generated because the amount of electricity used by a component is less than that of power generation. As an example, the energy increment information may be transmitted/received as a true or false signal such as a Boolean signal on the network system.

In a case where the specific component 30 recognizes energy increment information, the output may be increased. For example, in a case where the operation reservation of the specific component is set up, the drive of the specific component may be started before the setup time, or a component having a large output among a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Among the information related to energy, the on-peak information, the curtailment information and information on the deficiency of the amount of electricity supplied may be recognized as high-price information considered that energy cost is relatively expensive. On the other hand, among the information related to energy, the off-peak information, the energy increment information and the information on the excess of the amount of electricity supplied may be recognized as low-price information considered that energy cost is relatively cheap.

The information related to the fluctuation of the energy cost (high-price or low-price information) may be recognized as information for determining a power saving driving scheme of the specific component (e.g., the energy consumption component). That is, the information related to the fluctuation of the energy cost may be recognized by dividing a time slot (zone) based on energy cost or cost slot (zone) for determining a driving scheme of the specific component into at least two or more.

As an example, in a case where the information related to energy is recognized as a Boolean signal, the time slot (zone) based on energy cost or cost slot (zone) for determining a driving scheme of the specific component may be divided into two. In a case where the information related to energy is divided into a plurality of levels or recognized as real-time information, the time slot or cost slot may be divided into three or more.

Meanwhile, the information related to energy cost corresponding to at least time may be recognized as information for determining a power saving driving scheme of the specific component. That is, the information related to energy cost may be recognized by dividing a time slot (zone) or cost slot (zone) into at least two or more. As described above, the divided time slot or cost slot may be determined based on the kinds of the recognized information (the Boolean signal, the plurality of levels and the real-time information).

In other words, the information related to fluctuation of energy cost may be recognized by dividing a determination factor for driving the specific component into two or more, and functions on time and energy cost may be included in the determination factor.

In a case where the information related to energy cost is divided into two levels or more, the driving scheme of the specific component may be determined according to the information divided into levels. On the other hand, in a case where the recognized information related to energy cost is not divided based on a specific reference (e.g., real-time cost information), it is compared with predetermined information, and the driving scheme of the specific component may be determined based on the compared result.

Here, the predetermined information may be reference information (e.g. reference value) for dividing the information related to energy cost, and the compared result may be whether not the information related to energy cost is more or less than the reference value.

Specifically, each of the kinds of information related to energy may be divided into first information 41 that is raw information, second information 42 that is refined information, and third information 43 that is information for performing the function of the specific component. That is, the first information is a raw data, the second information is a refined data, and the third information is a command for performing the function of the specific component.

The information related to energy is included a signal, and the signal is transmitted. In this instance, one or more of the first to third information may be transmitted several times while the content of the information is not converted but only the signal including the information is converted. For example, as shown in FIG. 3, a component that receives a signal including the first information may convert only the signal and transmit a new signal including the first information to another component.

Therefore, it is described in this embodiment that the conversion of signal is a different concept from the conversion of information. In this instance, it can be readily understood that when the first information is converted into the second information, the signal including the first information is also converted into the signal including the second information.

However, the third information may be transmitted several times in the state that the content of the third information is converted or in the state that only the signal including the third information is converted while the content of the third information is identically maintained. Specifically, in a case where the first information is raw information on time-based pricing, the second information may be refined information on the time-based pricing. The refined information on the time-based pricing is information in which the time-based pricing is divided into a plurality of levels or analysis information. The third information is a command generated based on the second information.

The specific component may generate, transmit or receive one or more of the first to third information. The first to third information are not necessarily transmitted or received in sequence. Only a plurality of pieces of third information without the first and second information may be transmitted in sequence or parallel. Alternatively, the first and third information may be transmitted or received together, the second and third information may be transmitted or received together, or the first and second information may be transmitted or received together.

As an example, in a case where the specific component receives the first information, it may transmit the second information or may transmit the second and third information. In a case where the specific information receives only the third information, it may generate and transmit new third information.

Meanwhile, in the relation between two pieces of information, one is a message and the other is a response for the message. Thus, each of the components that constitute the network system may transmit or receive a message. In a case where each of the components receives a message, it may respond to the message. Therefore, in the case of an individual component, the transmission of a message is a relative concept with the response for the message. The message may include a data (first or second information) and/or a command (third information).

The command (third information) may include a command for storing the data, a command for generating the data, a command for processing the data (including the generation of an additional data), a command for generating an additional command, a command for transmitting the additionally generated command, a command for transmitting a received command, and the like.

In this specification, the response for the received message means storage of the data, processing of the data (including generation of an additional data), generation of a new command, transmission of the newly generated command, simple transmission of a received command (including generation of a command for transmitting the received command to another component), operation, transmission of the stored information, transmission of an acknowledge message (acknowledge character or negative acknowledge character), or the like.

For example, in a case where the message is first information, the specific component that receives the first information may generate second information by processing the first information, or may generate the second information and new third information, as a response for the message.

The specific component that receives the message may provide a response related to energy. Here, the term "response" may be understood as a concept including an operation through which the specific component can perform a function. As an example, the HAN 20 may perform an operation related to energy by receiving a message.

The response (operation) related to energy, provided by the specific component, will be described in detail. For example, the specific component may be an energy consumption component. The energy consumption component may be driven so that the energy cost when it is driven based on the recognition for energy information is reduced as compared with that when it is driven without the recognition for energy information.

The specific component may include a plurality of modes in which it is driven to perform its own function. The plurality of modes are a first mode and a second mode in which energy cost is relatively saved as compared with that in the first mode. The specific component may be driven in at least one of the first and second modes. Here, the first mode may be a general mode and the second mode may be a power saving mode. Alternatively, the first and second modes may all be power saving modes.

The general mode may be understood as a mode in which the function of the specific component is performed without recognition of energy information. On the other hand, the power saving mode may be understood as a mode in which the function of the specific component is performed based on the recognition of energy information so as to save energy cost.

In a case where the first and second modes are power saving modes, the first mode may be specified as a driving scheme for saving energy cost and the second mode may be specified as a driving scheme in which the energy cost in the second mode is more saved than that in the first mode.

Meanwhile, in a case where the specific component (e.g., the energy consumption component) is driven, at least a portion is recognized in a driving scheme including at least drive time and course. In this case, an unrecognized portion may be generated so as to save energy cost, and a recognized portion may be converted into another scheme.

For example, at least a portion of the driving scheme may be recognized under the control of the energy management component, the control of the energy consumption component, or the like. In a case where a specific driving scheme is further required so as to save energy cost, an unrecognized portion of the driving scheme may be newly generated, and a recognized portion may be converted into another scheme so as to save energy.

It will be apparent that the process of generating the unrecognized portion may be omitted. In this case, the process of converting the recognized portion into another scheme. On the other hand, the process of converting the recognized portion into another scheme may be omitted. In this case, the process of newly generating the unrecognized portion may be performed.

The drive time may include a drive start time or drive end time. The course may include a drive period of the specific component and an output of the specific component.

The generated scheme or converted scheme may be a scheme recommended by the specific component so as to save energy cost. Here, the specific component may be an energy consumption component (control component) or the energy management component.

As an example, in a case where the recognized scheme is a specific drive time, the specific drive time may be converted into another time so as to save energy cost, and a specific course may be generated. On the other hand, in a case where the recognized scheme is a specific course, the specific course may be converted into another course so as to save energy cost, and a specific time may be generated.

Under the control described above, a change in time or output may be made with respect to the output function of the specific component based on time.

The generated scheme or converted scheme may be performed within a set range. That is, in the process of recognizing at least a portion of the driving scheme, the generation or conversion of the driving scheme may be performed within a predetermined reference in which the recognized portion appears (e.g., restriction set by a user, constraint set under the control of the energy management component or energy consumption component, or the like). Therefore, in a case where the set range is out of the predetermined reference, it is restricted to generate the unrecognized portion or to convert the recognized portion into another scheme.

Another embodiment is proposed.

Cost information may further included in the recognized driving scheme. That is, in a case where the cost information is recognized, a portion related to the drive time or course may be generated. The generated driving scheme may be recommended.

Meanwhile, a response of the specific component based on the information related to the fluctuation of the energy cost (high-price or low-price information), e.g., an output control for power saving driving, may be performed. An output decrease (including an output of zero) or output increase may be included in the output control. It is as described above that the output is decreased or zero, maintained or increased based on the recognition for the information (on-peak or off-peak) related to energy cost.

If high-price information is recognized, the output may be zero or decreased. Specifically, the output in the recognition of the high-price information may be decreased as compared with that in the recognition of low-price information. As described above, the decrease of the output may be previously determined before the specific component is operated, or may be changed when the high-price information is recognized posterior to the start of the operation of the specific component.

In a case where the output of the specific component is zero or decreased, the function to be performed by the specific component may be lost as compared with a normal case. Therefore, a response for restoring the lost function may be performed.

As an example, after the output of the specific component is decreased, the specific component may be controlled so that the total operation time of the specific component is increased or so that the output is increased in at least a time period. In other words, if specific reference information related to energy information is recognized in a period after the output of the specific component is controlled, the response for controlling the output may be released. Here, the term "period" may be divided based on a point of time when the high-price information is recognized.

The total operation time may be understood as a time approaching a specific target in the process of performing the function of the specific component. As an example, in a case where the specific component is an electric appliance (washing machine, drying machine, cooking appliance or the like) intermittently driven (or driven in a specific course), the total operation time may be understood as a time until a corresponding course is completed.

On the other hand, in a case where the specific component is an electric appliance (refrigerator, water purifier, or the like) driven at normal times, the total operation time may be understood as a time approaching a target set for performing the function of the specific component. For example, the set target may be a target temperature, a target amount of ice produced, or a target amount of clean water in the refrigerator.

The total operation time may be increased as compared with the operation time set before the output of the specific component is decreased. In a case where the output of the specific component is not decreased, the total operation time may be increased as compared with the operation time of the specific component. However, although the total operation time of the specific component is increased, the specific component is controlled so that the total energy cost generated through the drive of the specific component can be saved as compared with that when the output of the specific component is not decreased.

If the high-price information is recognized, the output of the specific component may be increased. However, although the output is increased at a point of time when the high-price information is recognized, the total output of the specific component during the entire driving period may be decreased or maintained as compared with that when the specific component is operated under a normal output. Alternatively, although the output is increased at a point of time when the high-price information is recognized, the total power consumption or total time-based pricing of the specific component during the entire driving period may be decreased as compared with that when the specific component is operated under the normal output.

If the low-price information is recognized, the output of the specific component may be increased. For example, in a case where the operation reservation of the specific component is set up, the driving of the specific component may be started before the setup time, or a component having a large output in a plurality of components may be first driven. In a case where the specific component is a refrigerator, supercooling may be performed by increasing an output as compared with the existing output. In a case where the specific component is a washing machine or a washer, hot water may be stored by driving a heater earlier than the time when the heater is to be operated. Alternatively, in a case where the specific component recognizes an off-peak signal (e.g., at a point of time of recognition), electricity may be stored.

Meanwhile, in a case of a specific condition (additional condition) is generated based on the information related to the fluctuation of the energy cost (high-price or low-price information), the response of the specific component, e.g., the output control for power saving driving, may be limited. That is, the output of the specific component may be maintained. Here, the term "limitation" may be understood as the release of the output control performed or not performed.

The specific condition includes a case where influence on energy cost is minute even though the output control of the specific component is not performed or a case where it is necessary to prevent a function to be performed by the specific component from being degraded when the output of the specific component is controlled. Whether or not the influence on the energy cost is minute may be determined based on a predetermined reference (time-based pricing, power consumption or information on operation time). The predetermined reference may be a relative or absolute value. The case where the function to be performed by the specific component is degraded may be considered as a case where the specific component is a defrosting heater, for example.

In a case where it is controlled to decrease the output in a high-price time period and to increase the output in the low-price time period, the driving of the defrosting heater is more frequently performed than that during a normal time (setup period). In this case, the temperature of a storage room in the refrigerator is increased, and thus, the control of the output can be limited.

Figure 4:
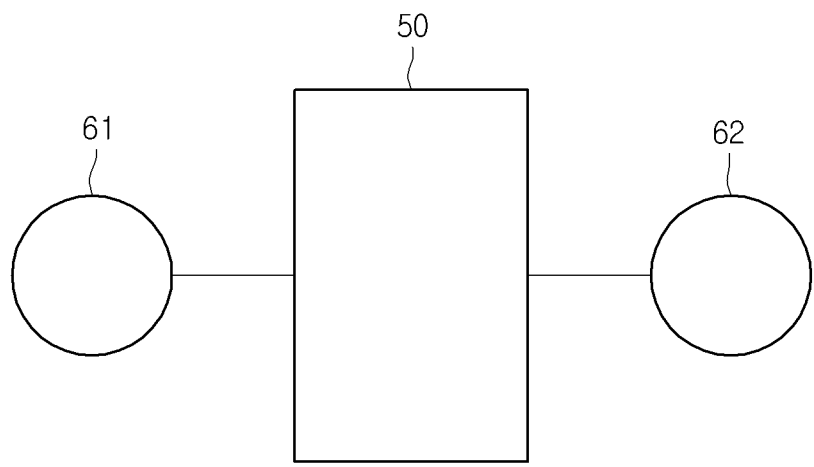
FIG. 4 is a view showing the communication structure of two components that constitute the network system according to a first embodiment.
Figure 5:
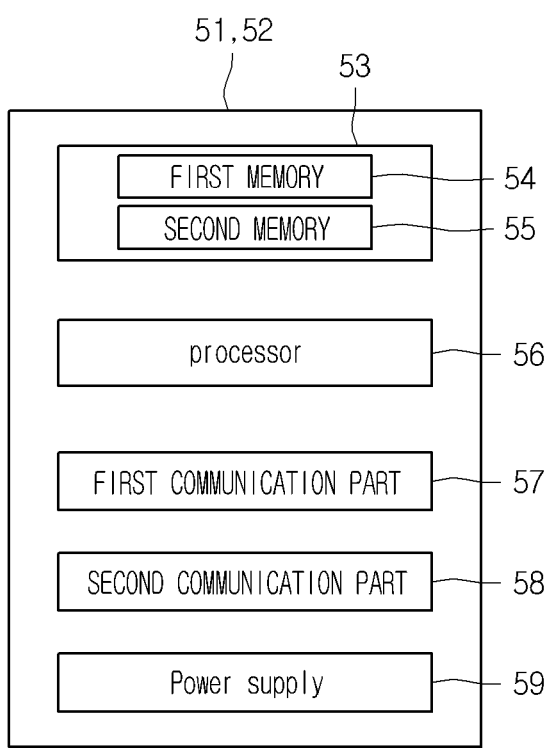
FIG. 5 is a block diagram showing the detailed configuration of a communication device that constitutes a communication unit.

FIG. 4 is a view showing the communication structure of two components that constitute the network system according to a first embodiment. FIG. 5 is a block diagram showing the detailed configuration of a communication device that constitutes a communication unit.

Referring to FIGS. 2, 4 and 5, first and second component 61 and 62 that constitute the network system may perform wired or wireless communication by means of a communication unit 50. The first and second components 61 and 62 may perform unidirectional or bidirectional communication.

In a case where the two components 61 and 62 perform wired communication, the communication unit 50 may be a simple communication line or power line communication means. It will be apparent that the power line communication means may include communicators (e.g., a modem or the like) respectively connected to the two components.

In a case where the two components 61 and 62 perform wireless communication, the communication unit 50 may include a first communicator 51 connected to the first component 61 and a second communicator 52 connected to the second component 62. In this case, the first and second communicators 51 and 52 perform wireless communication with each other. The first component 61 may be a component that constitutes the UAN 10 or a component that constitutes the HAN 20. The second component 62 may be a component that constitutes the UAN 10 or a component that constitutes the HAN 20. The first and second components 61 and may be the same kind of component or different kinds of components.

Components may be joined in the UAN 10 or the HAN 20. Specifically, addresses may be assigned to a plurality of components, e.g., first and second components, respectively. Here, the addresses are necessary for performing communication between the components and can be mapped to at least a group.

The address may be understood as values respectively converted from the unique code of the first or second component. That is, at least a portion of the components that constitute the network system may have an unchangeable/unique code, and the code may be converted into an address for building a network.

In other words, product codes for at least some of the plurality of components capable of constituting first and second networks may be converted into different network codes based on the constituted networks.

As an example, the product code may be a unique code determined in production of electric appliances or a code separately provided for the registration of a network. The product code may be converted into an identity (ID) for identifying a network to which the electric appliance is to be registered.

The first and second networks may be networks that constitute the UAN 10 or networks that constitute the HAN 20. On the other hand, the first and second networks may be the UAN 10 and the HAN 20, respectively. Alternatively, the first and second networks may be the HAN 20 and the UAN 10, respectively.

A first component and a second component for allowing the first component to participate in the network may be included in the plurality of components that constitute the network. For example, the first component may be an electric appliance and the second component may be a server.

Any one of the first and second components transmits a request signal for participating in the network, and the other of the first and second components may transmit a permission signal. That is, a signal may be transmitted/received between the first and second components, and whether or not to participate in the network may be determined based on the transmission time or number of the signal.

As an example, the first component transmits a test signal to the second component, and it is determined whether or not a response signal from the second component is transmitted to the first component. In a case where the response signal is not transmitted, the first component re-transmits the test signal, and it is re-determined whether or not a response signal from the second component is transmitted to the first component. By repeating such a process, if the transmission number of the test signal exceeds the setting number of the test signal, it may be determined that the second component does not participate in the network.

Meanwhile, the first component may transmit the test signal to the second component. If a response signal from the second component is not transmitted within a setup time, it may be determined that the second component does not participate in the network.

The first and second communicators 51 and 52 may have the same structure. Hereinafter, the first and second communicators 51 and 52 will be referred to as a communicator 51 and 52.

The communicators 51 and 52 may include a first communication part 57 for communication with the first component 61, a second communication part 58 for communication with the second component 62, a memory 513 for storing information received from the first component 61 and information received from the second component 62, a processor 56 for performing information processing, and a power supply 59 for supplying power to the communicator 51 and 52.

Specifically, the communication language (or scheme) of the first communication part 57 may be identical to or different from that of the second communication part 58. Two kinds of information respectively received from the two components may be stored in the memory 513. The two kinds of information may be stored in a single sector or may be respectively stored in sectors. In any case, an area in which the information received from the first component 61 may be referred to as a first memory 54, and an area in which the information received from the second component 62 may be referred to as a second memory 55.

The processor 56 may generate first information or generate second and third information based on information received from the component or another communicator. As an example, in a case where the communicator 51 and 52 receives the first information, it may generate information or sequentially generate the information and the second information by processing a data. Alternatively, in a case where the communicator 51 and 52 receives the first information, it may generate the second and third information by processing a data. In a case where the communicator 51 and 52 receives the third information, it may new third information.

For example, in a case where the second component is an energy consumption component (electric home appliance, component that constitutes the electric home appliance, or the like), the second communicator may generate a command for reducing energy consumption. In a case where the second component is an energy generation component, energy distribution component or energy storage component, the second communicator 52 may generate a command for energy generation time, generation amount, energy distribution time, distribution amount, energy storage time, storage amount or the like. In this case, the second communicator 52 serves as an energy management component.

The power supply 59 may receive electricity supplied from the components 61 and 62 or may receive electricity supplied from a separate power source. Alternatively, the power supply 59 may be a battery or the like.

Figure 6:
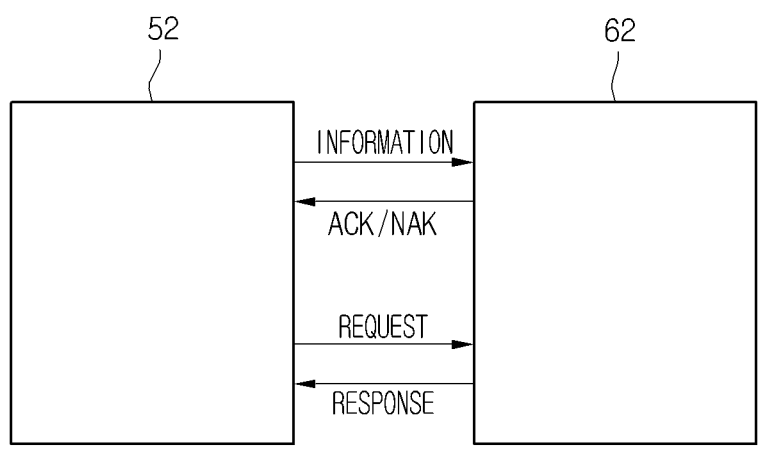
FIG. 6 is a view showing a communication performing process between a specific component and a communication device according to the first embodiment.

FIG. 6 is a view showing a communication performing process between a specific component and a communication device according to the first embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 6, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

The information received from the first communicator is stored in the memory 513. The second communicator 52 transmits a message to the second component 62 as a response for the message. In this instance, the message transmitted to the second component 62 relates to new information different from the information previously stored in the memory 513, or information generated in the processor 56.

Then, the second component 62 transmits an acknowledge character (ack) or negative acknowledge character (Nak) to the second communicator 52 as a response for the message. The second component 62 performs a function (generation of a command, operation, or the like) based on the received information, or waits for performing the function.

Meanwhile, the second communicator 52 requests component information to the second component 62 in real time or by periods. As an example, the component information may be component state information or information on a component unique code, a manufacturer, a service name code, an electricity use amount, and the like. Then, the second component 62 transmits component information to the second communicator 52 as a response for the request. The component information is stored in the memory 513 of the second communicator 52.

If the second communicator 52 receives a message for requesting the component information from the first communicator 51, it transmits the component information stored in the memory 513 to the first communicator 51 as a response for the message. Alternatively, the second communicator 52 transmits the component information stored in the memory 513 to the first communicator 51 in real time or by periods.

The second communicator 52 may transmit the information of the first component, stored in the memory, to the first component together with the information received from the first component. Alternatively, the second communicator 52 may transmit the information of the first component, stored in the memory, to the first component, separately from transmitting the information received from the first component.

The second communicator 52 stores the information of the second component 62 in the memory 513. Hence, in a case where the second communicator 52 receives a message for requesting the component information from the first communicator 51, it transmits the component information stored in the memory 513 directly to the first communicator 51 without a request for information to the second component 62, and thus, the communication load of the second component 62 can be reduced. That is, the second component becomes a virtual component.

Figure 7:
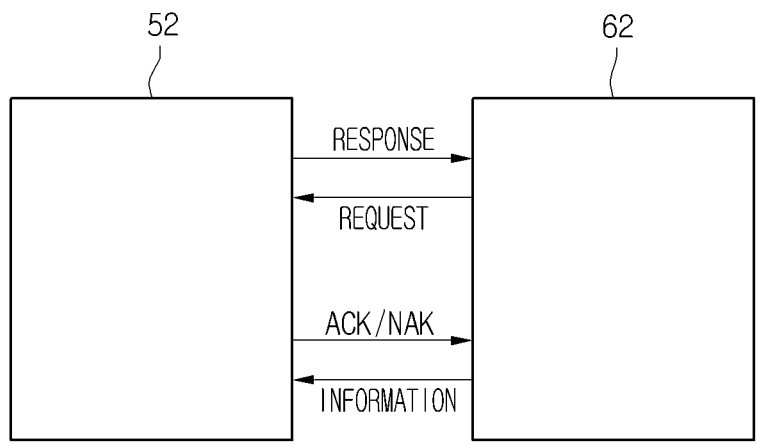
FIG. 7 is a view showing a communication performing process between a specific component and a communication device according to a second embodiment.

FIG. 7 is a view showing a communication performing process between a specific component and a communication device according to a second embodiment.

Hereinafter, for convenience of illustration, a communication performing process between the second component 62 and the second communicator 52 will be described as an example. A communication performing process between the first component 61 and the first communicator 51 may be identically applied to that between the second component 62 and the second communicator 62.

Referring to FIGS. 5 and 7, the second communicator 52 receives a message from the first communicator 51. The second communicator 52 may receive a message in real time or by periods without transmitting a request for the message to the first communicator 51, or may receive a message as a response for the request for the message to the first communicator 51. Alternatively, the second communicator 52 may receive a message by requesting information to the first communicator 51 at a point of time when it is initially turned on. Then, the second communicator 52 may receive information in real time or by periods from the first communicator 51 without a request for information.

If the second communicator 52 receives a message for requesting information from the second component 62, it transmits a message to the second component 62 as a response for the message for requesting the information. In this instance, the message transmitted to the second component 62 relates to new information different from the information previously stored in the memory 513, or information generated in the processor 56. Alternatively, the information transmitted to the second component 62 may be information received from the first component. The second component 62 performs a function based on the received information or waits for performing the function.

Meanwhile, the second component 62 transmits component information to the second component 62 in real time or by periods. As an example, the component information may be component state information or information on a component unique code, a manufacturer, a service name code, an electricity use amount, and the like.

As described above, the electric use amount may be detected by the smart meter. In a case where the electricity use amount is included in the information of the second component 62, the correction of an actual electricity use amount may be performed by comparing the information of the second component 62 with the information of the smart meter.

Then, the second communicator 52 stores the information of the second component 62 in the memory 513, and transmits an acknowledge character (ack) or negative acknowledge character (Nak) to the second component 62 as a response for the message.

If the second communicator 52 receives a message for requesting component information from the first communicator 51, it transmits the information of the second component 62, stored in the memory 513, to the first communicator 51 as a response for the message. Alternatively, the second communicator 52 the information of the second component 62, stored in the memory 513, to the first communicator 51 in real time or by periods.

The second communicator 52 stores the information of the second component 62 in the memory 513. Hence, in a case where the second communicator 52 receives the message for requesting the component information from the first communicator 51, it transmits the information stored in the memory 513 directly to the first communicator 51 without transmitting a request for information to the second component 62, and thus, the communication load of the second component 62 can be reduced. That is, the second communicator 52 becomes a virtual component.

<Applications>

In the following descriptions, the first and second components may be reversed to each other, and therefore, overlapping descriptions will be omitted. For example, in a case where the first component is an electric home appliance and the second component is an energy management component, description in a case where the first component is an energy management component and the second component is an electric home appliance will be omitted. Information transmitted/received by each of the components may be all the information described above. Particularly, specific information may be transmitted/received for each of the components.

The energy generation components 11 and 21 may transmit/receive information related to energy generation amount, and the like. The energy distribution components 12 and 22 may transmit/receive information related to energy distribution amount, distribution time, and the like. The energy storage components 13 and 23 may transmit/receive information related to energy storage amount, storage time, and the like. The energy metering components 15 and 25 may transmit/receive information related to energy consumption amount, and the like. The energy management components 14 and 24 may transmit/receive information related to energy generation, distribution, storage, consumption, cost, reliability, emergency situation, and the like.

(1) Case where Second Component is One Component of HAN

The second component 62 may be an energy consumption component 26, e.g., a heater, motor, compressor, display or the like. In this case, the first component 61 may be a MICOM or energy consumption component 26 as an example. The MICOM or energy consumption component 26 may transmit a message for reducing energy consumption to another energy consumption component 26. Then, the another energy consumption component 26 may perform an operation for reducing energy, for example.

As another example, the energy consumption component 26 may be an electric home appliance. In this case, the first component 61 may be an energy storage component 23, an energy consumption component 26 (electric home appliance), an energy management component 24, an energy metering component 25, a central management component 27, a web server component 28, or a component that constitutes the UAN 10.

In this instance, an energy management function may be included or not included in the first component 61 except the energy management component 24. In a case where an energy management function or solution is not included in the first component 61, it may be included in the communication unit or may be included in the MICOM of the second component 62. In this case, the energy management function is related to the consumption of energy.

As still another example, the second component 62 may be an energy generation component 21, an energy distribution component 22 or an energy storage component 23. In this case, the first component 61 may be an energy management component 24, a central management component 27, a web server component 28 or a component that constitutes the UAN 10.

A message may be transmitted to the second component 62. Here, the message may include energy generation time, generation amount or the like, energy distribution time, distribution amount or the like, and energy storage time, storage amount or the like. In this instance, an energy management function may be included or not included in the first component 61 except the energy management component 24.

In a case where an energy management function or solution is not included in the first component 61, it may be included in the communication unit. In this case, the energy management function is related to the generation, distribution and storage of energy.

As still another example, the second component may be an energy metering component 25. In this case, the first component 61 may be a central management component 27, a web server component 28 or a component that constitutes the UAN 10.

An energy management function may be included or not included in the energy metering component. In a case where the energy management function is included in the energy metering component 25, the energy metering component 25 performs the same operation as the EMS.

In a case where an energy management function or solution is included in the energy metering component 25, it may be included in the communication unit or may be included in the second component 62.

As still another example, the second component 62 may be a central management component 27. In this case, the first component 61 may be a web server component 28 or a component that constitutes the UAN 10.

(2) Case where Second Component is One Component of UAN

The first component 61 may be a component that constitutes the UAN 10. In this case, the first and second components 61 and 62 may be the same kind of component or different kinds of components. An energy management function may be included in the first component 61, the second component 62 or the communication unit.

The energy management function included in a specific component or the energy management function included in the energy management component 14 may be related to generation amount, distribution amount, storage amount, energy use amount of a component that constitutes the HAN 20.

In this specification, an example capable of constituting the network system has been described. However, any component not mentioned in this specification may be a first or second component that performs communication through the communication unit. For example, an automobile may be a second component, and the energy management component 24 may be a first component.

(3) Case where One of First and Second Components Communicates with Third Component Although the communication between two components has been described in the aforementioned examples, each of the first and second components may perform communication with one or more components (a third component to an n-th component). In this case, the relation of the first or second component that performs communication with the third component and the like may be one of the aforementioned examples.

For example, the first component may be a component that constitutes the UAN, the second component may be an energy management component 24 that communicates with the first component, and the third component may be an energy consumption component 26 that communicates with the second component. In this instance, one or more of the three components may communicate with another component.

In this specification, the first to n-th components may be components that constitute the UAN or components that constitute the HAN. Alternatively, a portion of the components may be components that constitute the UAN, or another portion of the components may be components that constitute the HAN.

Hereinafter, third and fourth embodiments of the present disclosure will be described. A difference between these embodiments and the aforementioned embodiments will be mainly described, and descriptions and reference numerals will be quoted to elements of these embodiments identical to those of the aforementioned embodiments.

Figure 8:
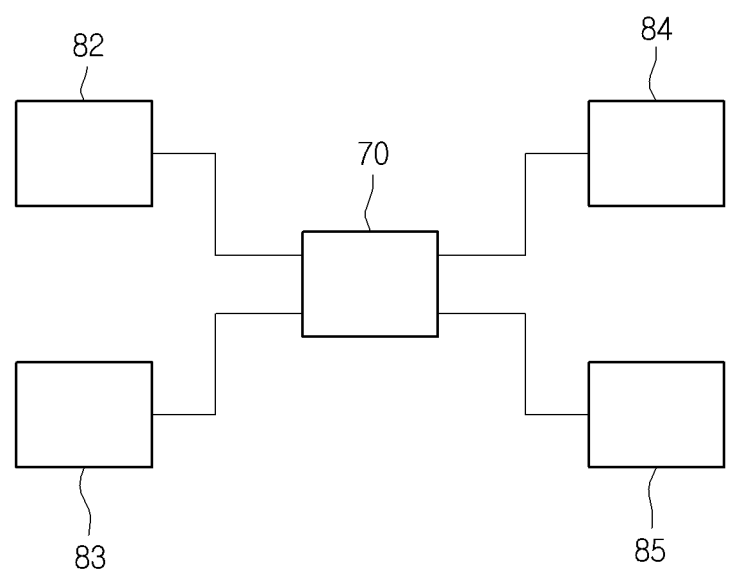
FIG. 8 is a view showing the communication structure of components that constitute the network system according to a third embodiment.
Figure 9:
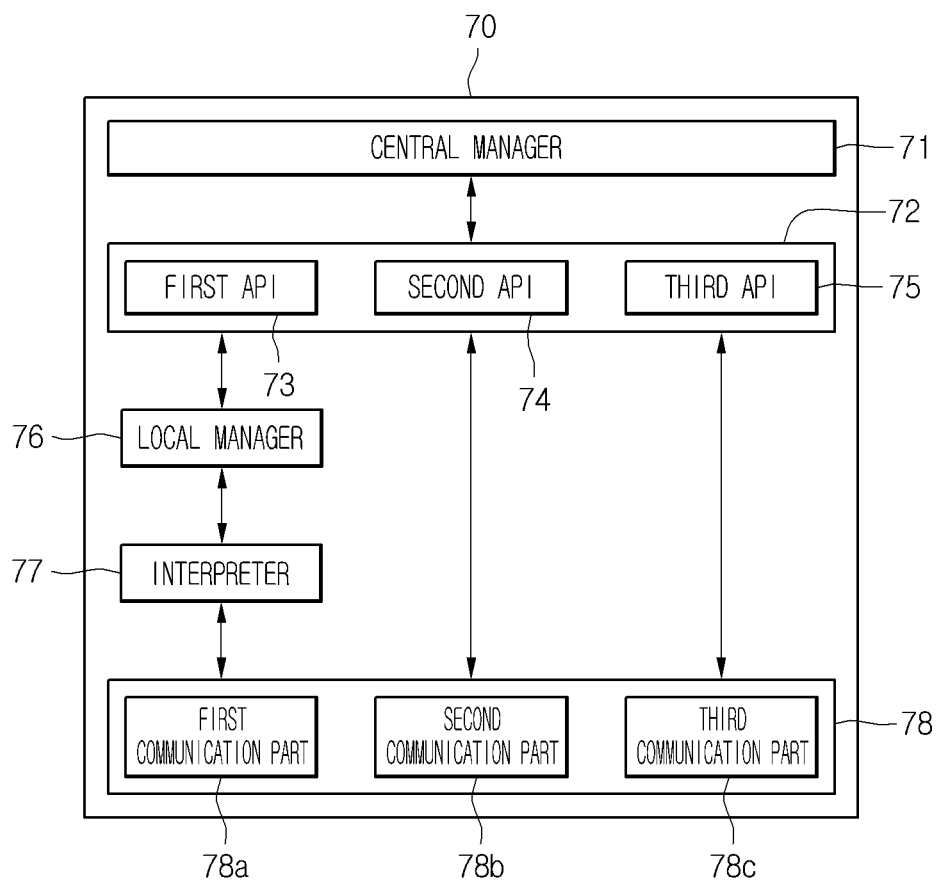
FIG. 9 is a block diagram showing the detailed configuration of a first component in FIG. 8.

FIG. 8 is a view showing the communication structure of components that constitute the network system according to a third embodiment. FIG. 9 is a block diagram showing the detailed configuration of a first component in FIG. 8.

Referring to FIGS. 8 and 9, a first component 70 may communicate with second to fifth components 82, 83, 84 and 85. Hereinafter, it will be described as an example that the first component 70 is a central management component (home server), the second and third components 82 and 83 are energy consumption components (electric home appliances), the fourth component 84 is an energy metering component (smart meter), and the fifth component 85 is a component that constitutes the UAN. The components may communicate with each other by means of a communication unit. In the network system illustrated in FIG. 8, each of the components is directly connected to the first component 70 to communicate with the first component 70. However, in a case where each of the components 82, 83, 84 and 85 is connected to new components to communicate with the new components, the network system may be extended and operated by the new components.

The second and third components 82 and 83 may be the same kind of component or different kinds of components. In this embodiment, it will be described as an example that the second and third components 82 and 83 are different kinds of energy consumption components.

The first component 70 may simply transmit information received from the fourth component 84 and/or the fifth component 85 to the second component 82 and/or the third component 83, or may process the received information and transmit the processed information.

The first component 70 may simply transmit information received from the second component 82 and/or the third component 83 to the fourth component 84 and/or the fifth component 85 (a signal may be converted), or may process the received information and transmit the processed information (the information is converted.

The first component 70 includes a communication unit 760 for performing communication with another component, a central manager 71 for managing the entire operation and/or information processing of the first component, and an application programming interface 72 (hereinafter, referred to as an "API") for performing an interface between the communication unit 760 and the central manager 71 (specifically, application software).

The communication unit 760 includes a first communication part 78a for performing communication with the second and third components 82 and 83, a second communication part 78b for performing communication with the fourth component 84, and a third communication part 78c for performing communication with the fifth component 85.

In this instance, the first and second communication parts 78a and 78b may use different communication protocols from each other. As an example, the first communication part 78a may use Zigbee and the second communication part 78b may use Wi-Fi. In this embodiment, the kind of communication protocol or method used by the first and second communication parts 78a and 78b is not limited. The third communication component 78c may use Internet communication as an example.

The API 72 includes a first API 73, a second API 74 and a third API 75. The third API 75 is an interface between the central manager 71 and the third communication part 78c, and the first API 73 is an interface between the first communication part 78a and the central manager 71. The second API 74 is an interface between the second communication part 78a and the central manager 71.

The first component 70 further includes a local manager 76 and an interpreter 77. In a case where the information to be transmitted/received between the API 72 and the communication unit 760 is information related to operations of energy consumption components (electric home appliances), the local manager 76 outputs information corresponding to the respective energy consumption components. The interpreter 77 interprets information transmitted from the local manager 76 to the communication unit 760 or information received in the communication unit 760. The information outputted from the interpreter 77 is used to set or get values of information related to the respective energy consumption components.

The local manager 76 includes a memory (not shown) in which information related to one or more energy consumption components is stored. Alternatively, the local manager 76 may be connected to a memory in which information related to one or more energy consumption components is stored. The information related to each of the energy consumption components may include operation information of each of the energy consumption components and information for controlling the energy consumption components. The information related to each of the energy consumption components may further include software download information for operating each of the energy consumption components and information for remote controlling/monitoring.

As an example, in a case where a plurality of energy consumption components include a washing machine, a refrigerator and a cooking appliance, information related to each of the energy consumption components is stored in the memory. The information related to each of the energy consumption components may be changed as components connected to the network system are changed.

If a signal is transmitted from the API 72 to the local manager 76, information corresponding to a specific energy consumption component is outputted. In a case where a plurality of energy consumption components exist, information on the plurality of energy consumption components is outputted. The interpreter 77 interprets the information transmitted from the local manager 76 into a machine language so as to transmit the information to the energy consumption components. The machine language may be a signal used to set or get the operation information of the energy consumption components.

The information transmission process in the first component 70 will be described.

As an example, the first component 70 may receive energy information (e.g., an energy reduction signal: first command) from the forth component 45 through the second communication part 78b. The received energy information is transmitted to the central manager 71 through the second API 74. In the process of information transmission between the second API and the central manager 71, only a signal including the information is converted, and the content of the information is not converted.

Since the energy information is information related to the energy consumption reduction of the energy consumption components, the central manager 71 transmits information (second command) related to operations of the energy consumption components to the API 72. As an example, the central manager 71 transmits information necessary for turning off power of the washing machine or refrigerator. Then, the information is transmitted from the first API 73 to the local manager 76.

The local manager 76 transmits information (third command) for controlling the operation of each of the energy consumption components to the interpreter 77 based on the information transmitted from the first API 73. As an example, in a case where the information transmitted from the first API 73 is information having different kinds of energy consumption components as targets, the local manager 76 transmits information related to the control of each of the energy consumption components to the interpreter 77. In this case, since the local manager 76 receives the second command and outputs the third command, the information inputted to the local manager 76 is converted and outputted by the local manager 76.

Subsequently, the interpreter 77 interprets the information transmitted from the local manager 76 into a machine language (signal). Then, the converted signal is transmitted to the target energy consumption components (second and third components) through the first communication part 78a. Then, the energy consumption components (second and third components) are finally turned off so as to reduce energy.

Although it has been described above that the first component receives information through the second communication part, the first component may receive information through the third component so that the information related to the energy consumption components is outputted.

Meanwhile, the second and third components 82 and 83 may transmit their own operation information to the first component 70. Since the information transmitted from the second and third components 82 and 83 is information related to operations of the energy consumption components, the signal received in the first communication part 78a is transmitted to the central manager 71 via the interpreter 77, the local manager 760 and the first API 73. In such an information transmission process, the information related to the second and third components 82 and 83 is stored in the local manager 76. In this embodiment, since the information related to the energy consumption components is stored in the local manager, the local manager may be understood as a virtual energy consumption component (abstraction model). The central manager 71 may transmit the received information to the second communication part 78b and/or the third communication part 78c.

The operation of the first component will be described. The information received through the communication unit 760 may be transmitted directly to the API 72, or may be converted (via the interpreter and the local manager) and then transmitted to the API 72, based on the kind of information (or the type of signal).

The information transmitted from the central manager 76 may be transmitted directly to the communication unit 760, or may be converted and then transmitted to the communication unit 760.

As another example, the interpreter may be included in the local manager 76, and the information received through the communication unit 760 is transmitted to the local manager 76. However, converted information may be outputted, or information may be outputted as it is without converting the information.

Meanwhile, in a case where the information transmitted to the API 72 through the second or third communication part 78b or 78c is information (raw data or refined data) related to time-based pricing, the central manager 71 determines the presence of on-peak time. In the case of the on-peak time, the central manager 71 may transmit the information (first command) for controlling the operations of the energy consumption components to the API 72. Then, the information is converted through the local manager 76, and the converted information (second command) is transmitted to the energy consumption components through the first communication part 78a. Alternatively, the central manager 71 may transmit the information related to the time-based pricing to the first communication part 78a through the second API 74 without determining the presence of on-peak time. In this case, the information may be converted or not converted. That is, in a case where the central manager directly receives first information (raw data), it may transmit the first information as it is, or convert the first information into a second information (refined data) and then transmit the second information.

Figure 10:
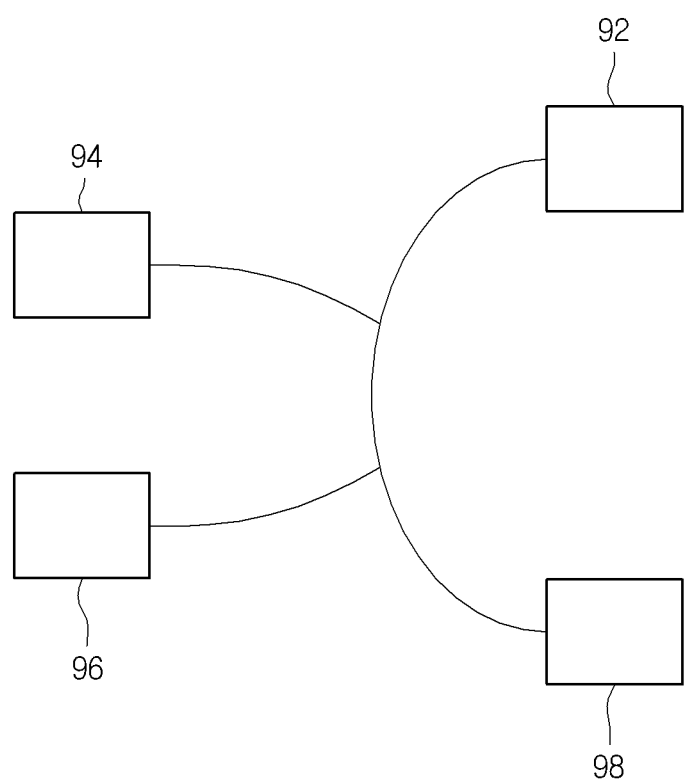
FIG. 10 is a view showing the communication structure of components that constitute the network system according to a fourth embodiment.
Figure 11:
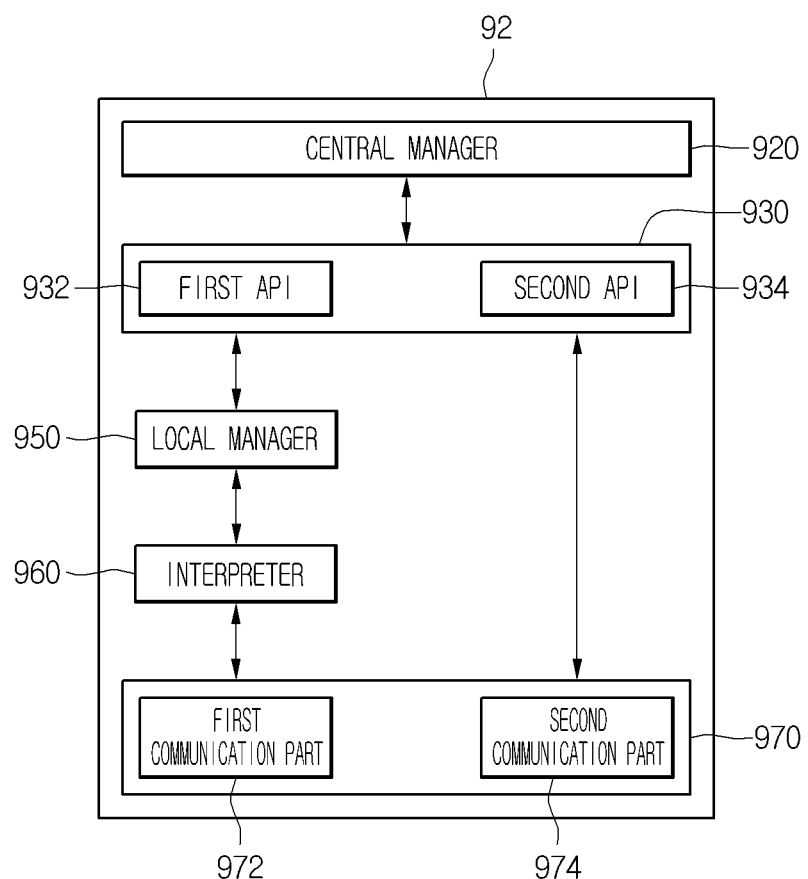
FIG. 11 is a block diagram showing the detailed configuration of a first component in FIG. 10.

FIG. 10 is a view showing the communication structure of components that constitute the network system according to a fourth embodiment. FIG. 11 is a block diagram showing the detailed configuration of a first component in FIG. 10.

Referring to FIGS. 10 and 11, the network system of this embodiment may include at least first to fourth components 92, 94, 96 and 98.

The first component 92 may communicate with the second to fourth components 94, 96 and 98. The fourth component 98 may communicate with the first to third components 92, 94 and 96.

Hereinafter, it will be described as an example that the first component 92 is a central management component (home server), the second and third components 94 and 96 are energy consumption components (electric home appliances), and the fourth component 98 is an energy metering component (smart meter). The central management component (home server) may be understood as a component necessary for controlling at least a component that constitutes the HAN 20.

The first component 92 includes a communication unit 970 for performing communication with another component, a central manager 920 for managing the entire operation and/or information transmission/reception of the first component 92, and an application programming interface 930 (hereinafter, referred to as an "API") that serves as an interface between the communication unit 970 and the central manager 920 (specifically, application software).

The communication unit 970 may include a first communication component 972 for performing communication with the second to fourth components 94, 96 and 98, and a second communication component 974 for performing Internet communication.

The API 930 includes a first API 932 and a second API 934. The second API 934 is an interface between the central manager 920 and the second communication part 974, and the first API 930 is an interface between the first communication part 972 and the central manager 920.

The first component 92 further includes a local manager 950 and an interpreter 960. In a case where the information to be transmitted/received between the API 932 and the communication unit 970 is information related to operations of energy consumption components (electric home appliances), the local manager 950 outputs information corresponding to the respective energy consumption components. The interpreter 960 interprets information transmitted from the local manager 950 to the communication unit 970 or information received in the communication unit 970. In this embodiment, the functions of the interpreter and the local manager are identical to those of the third embodiment, and therefore, their detailed descriptions will be omitted.

The information transmission process in the first component 92 will be described.

As an example, the first component 92 may receive energy information (e.g., energy reduction signal) from the fourth component 98 through the first communication part 972. Alternatively, the first component 92 may receive energy information from an external component connected to Internet through the second communication part 974.

The received energy information is transmitted directly to the first or second API 932 or 934 and then transmitted to the central manager 920. Since the energy information is information related to the energy consumption reduction of the energy consumption components, the central manager 920 transmits information related to the operations of the energy consumption components to the first API 932. As an example, the central manager 920 transmits information necessary for turning off power of a washing machine or refrigerator. Then, the information is transmitted from the first API 932 to the local manager 950.

The local manager 950 transmits information for controlling the operation of each of the energy consumption components to the interpreter 960 based on the information transmitted from the first API 932. As an example, in a case where the information transmitted from the first API is information related to different kinds of energy consumption components, the local manager 950 transmits information related to the control of each of the energy consumption components to the interpreter 960.

Subsequently, the interpreter 960 interprets the information transmitted from the local manager 960 into a machine language (signal). Then, the interpreted signal is transmitted to the energy consumption components through the first communication part 972. Then, the energy consumption components are finally turned off so as to reduce energy.

Meanwhile, the second and third components 94 and 96 may transmit their own operation information to the first component 92. Since the information transmitted from the second and third components is information related to the operations of the energy consumption components, the signal received in the first communication part 972 is transmitted to the central manager 920 via the interpreter 960, the local manager 950 and the first API 932. In such an information transmission process, the information related to the first and second components is stored in the local manager 950.

The central manager 920 may transmit the received information to the first communication part 972. Then, the information of the second and third components 94 and 96 is transmitted to the fourth component 98.

The operation of the first component will be described. The information received through the communication unit 970 may be transmitted directly to the API 930, or may be converted (via the interpreter and the local manager) and then transmitted to the API 930, based on the kind of information (or the type of signal).

On the contrary, the information transmitted from the central manager 920 may be transmitted directly to the communication unit 970, or may be converted and then transmitted to the communication unit 970.

Meanwhile, in a case where the information transmitted to the API 930 through the second communication part 974 is information related to time-based pricing, the central manager 920 determines the presence of on-peak time. In the case of the on-peak time, the central manager 920 may transmit the information for controlling the operations of the energy consumption components to the API 930. Then, the information is transmitted to the energy consumption components through the local manager, the interpreter and the first communication part. In this case, the first component may be understood as an energy management component.

Although it has been described above that two energy consumption components communicate with the first component, the number of energy consumption components that communicate with the first component is not limited.

Although it has been described as an example that the first component is a home server, the first component may be an energy management component. In this case, the fourth component may be a central management component, an energy management component, a smart meter, or the like.

As another example, the first component may be a smart meter. In this case, the fourth component may be a central management component, an energy management component, or the like. As still another example, the first component may be a terminal component (e.g., a gate way).

As still another example, each of the second and third components may be an energy generation component, an energy storage component or the like, which constitutes the HAN. That is, one or more of the energy generation component, the energy consumption component and the energy storage component may communicate with the first component. In addition to information related to the energy consumption component, information related to the energy generation component (e.g., information related to the operation of the energy generation component) and information related to the energy storage component (e.g., information related to the operation of the energy storage component) may be stored in the memory included in a local network or connected to the local network. Although it has been described above that the first component performs Internet communication, the Internet communication may not be performed.

Although it has been described in the first embodiment that a single local manager is provided, a plurality of local managers may be provided. As an example, a first local manager may process information on an electric home appliance such as a refrigerator or washing machine, and a second local manager may process information on a display product such as a television or monitor.

Figure 12:
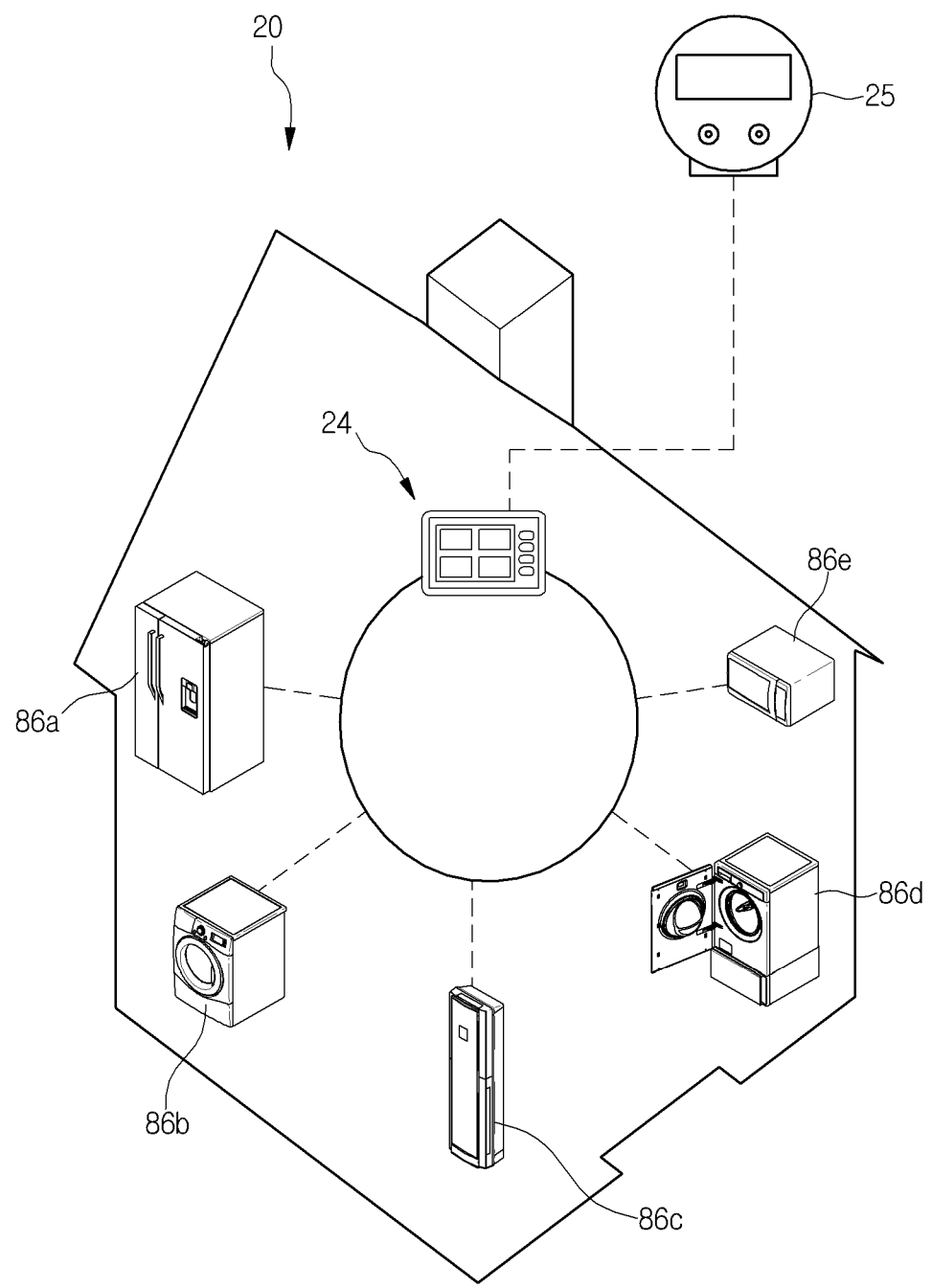
FIG. 12 is a schematic view of a home network according to an embodiment.

FIG. 12 is a schematic view of a home network according to an embodiment.

Referring to FIG. 12, the home network 20 includes an energy measuring unit 25 (e.g., a smart meter) for measuring power supplied from the utility network 10 to each home and/or an electricity charge in real-time and an energy managing unit 24 connected to the energy measuring unit 25 and electric products and controlling their operations.

Moreover, an electricity charge of each home may be charged with cost per hour. At a time interval during which power consumption is drastically increased, an electricity charge per hour may become expensive and at a time interval during which power consumption is relatively less, an electricity charge per hour may become cheaper.

The energy managing unit 24 may be connected to electric products as an energy consuming unit 26 (i.e., refrigerator 86*a*, a washing machine 86*b*, an air conditioner 86*c*, a drier 86*d*, or cooking equipment) via a network inside the home and thus may perform two-way communication.

The communication in the home may be accomplished through a wireless method such as Zigbee and Wi-Fi or a wire method such as power line communication (PLC). One appliance may be connected to other appliances to communicate with each other.

Figure 13:
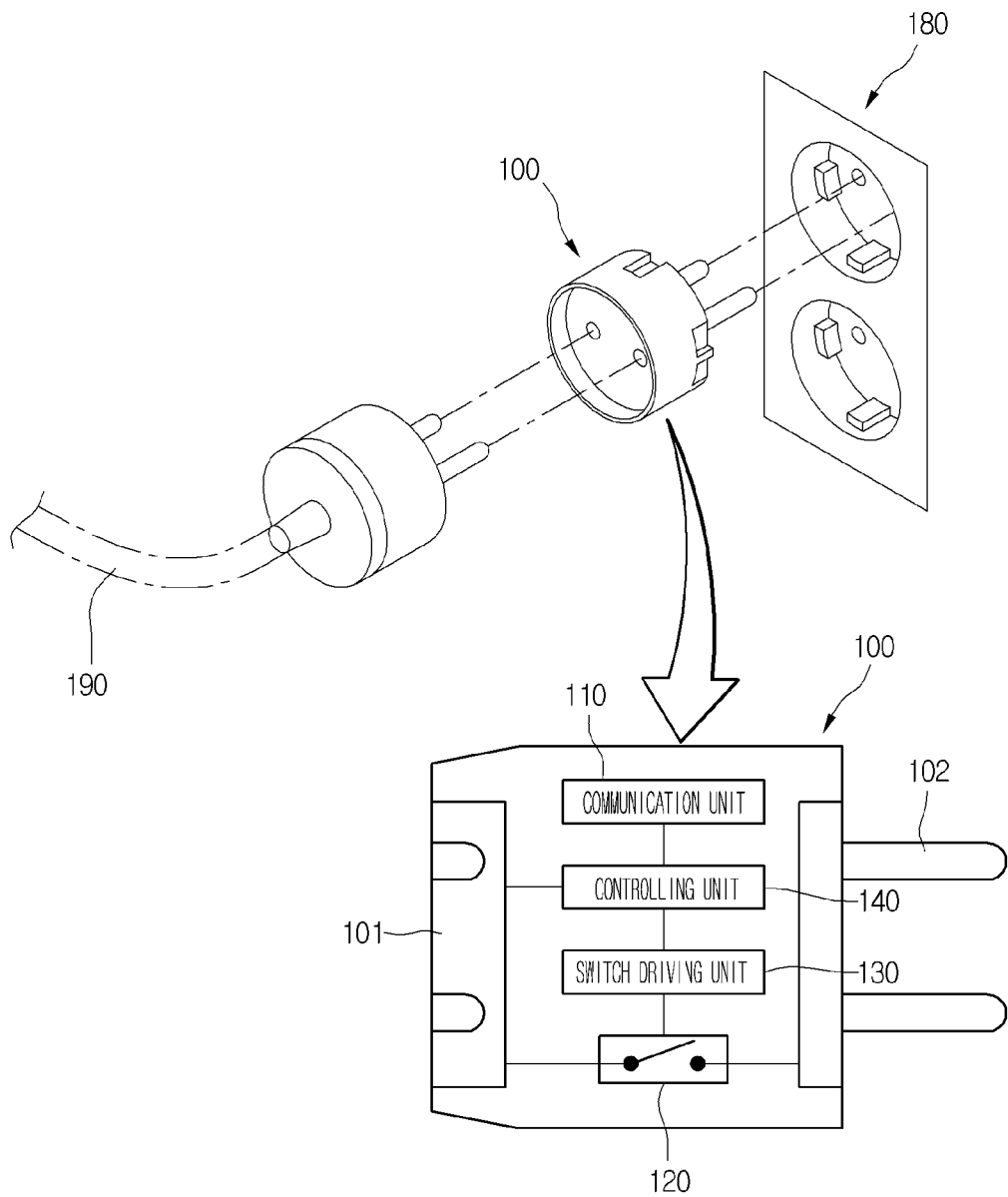
FIG. 13 is a schematic view of a power adjusting device according a first embodiment.
Figure 14:
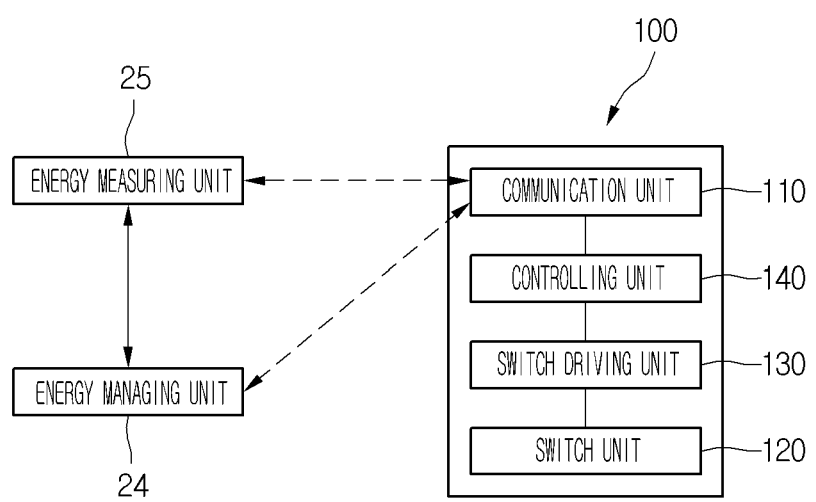
FIG. 14 is a schematic block diagram of a network system including the power adjusting device of FIG. 13.

FIG. 13 is a schematic view of a power adjusting device according a first embodiment. FIG. 14 is a schematic block diagram of a network system including the power adjusting device of FIG. 13.

Referring to FIGS. 13 and 14, the power adjusting device 100 is provided between a power supplying unit 180 and an electric product connection line 190. The power adjusting device 100 includes a first combining unit 101 combined to the electric product connection line 190 and a second combining unit 102 combined to the power supplying unit 180.

The power supplying unit 180 is a wall socket built in walls of a house or a building and the electric product connection line 190 may be understood as an electrical line connected to the energy consuming unit 26.

In more detail, the power adjusting device 100 includes at least one component constituting the utility network 10 or the home network 20, for example, a communication unit 110 communicating with the energy managing unit 24 and the energy measuring unit 25, a switch unit 120 turned on/off selectively according to information (e.g., energy information) received through the communication unit 110, a switch driving unit 130 driving the switch unit 120, and a controlling unit 140 controlling the switch driving unit 130.

The communication unit 110 may use a wire/wireless method as a communication method. More specifically, the communication method may adopt Power line communication (PLC), Public switched telephone network (PSTN) or Packet switched data network (PSDN) as a wire method and also may adopt Code division multiple access (CDMA), Global system for mobile communications (GSM), ZIGBEE, BLUETOOTH, Wi-Fi or Radio frequency (RF) as a wireless method.

The communication unit 110 may be detached from the power adjusting device 100. When the communication unit 110 is combined with the power adjusting device 100, the recognition of the communication unit 110 is confirmed and the communication availability of the communication unit 110 is confirmed. Moreover, an identification code of the power adjusting device 100 may be assigned on a network.

Furthermore, when the communication unit 110 is separated from the power adjusting device 100 and is combined to another power adjusting device 100, existing information stored in the communication unit 110 may be deleted. After the existing information of the communication unit 110 is deleted, the communication unit 110 may serve as an identifier of the another power adjusting device 100.

If it is recognized that information (i.e., energy information) about an electricity charge or power consumption exceeds a predetermined reference value (i.e., an on-peak interval), this information is delivered from the energy managing unit 24 or the energy measuring unit 25 to the communication unit 110. The information may include a command for cutting off current applied to the energy consuming unit 26 in order to reduce electricity charge or power consumption.

According to the energy information delivered to the communication unit 110, the controlling unit 140 controls the switch driving unit 130 to turn off the switch 120. On the other hand, if it is recognized that information (i.e., energy information) about electricity charge or power consumption exceeds a predetermined reference value (i.e. an on-peak interval), the switch 120 may be on according to information delivered from the energy managing unit 24 or the energy measuring unit 25.

The energy information may further include curtailment, grid emergency, grid reliability, energy generation amount, and operation priority in additional to information related to the electricity charge, Accordingly, if information about curtailment, grid emergency, grid reliability, energy generation amount, and operation priority is recognized, power is selectively supplied to the energy consuming unit 26 in correspondence to the recognized information.

Moreover, a user sets power consumption amount of a predetermined reference (limitation) with respect to the energy consuming unit 26, and if power consumed in the energy consuming unit 26 exceeds the reference, the energy managing unit 24 or the energy measuring unit 25 may deliver a command (information) for turning off the switch 120 to the communication unit 110. Moreover, the controlling unit 140 turns off the switch 120 according to the delivered command.

Moreover, by a user setting, the power adjusting device 100 may be manually operated. For example, when a user may go out for a long time, power supply may be cut off by turning off a switch connected to the energy consuming unit 26.

In FIG. 14, as a component communicating with the communication unit 110, only the energy managing unit 24 or the energy measuring unit 25 is disclosed but the central management unit 27 or the energy grid assistance unit 28 may communicate with the communication unit 110.

Hereinafter, only other embodiments distinguished from the first embodiment will be described. However, like reference numbers may refer to like elements.

Figure 15:
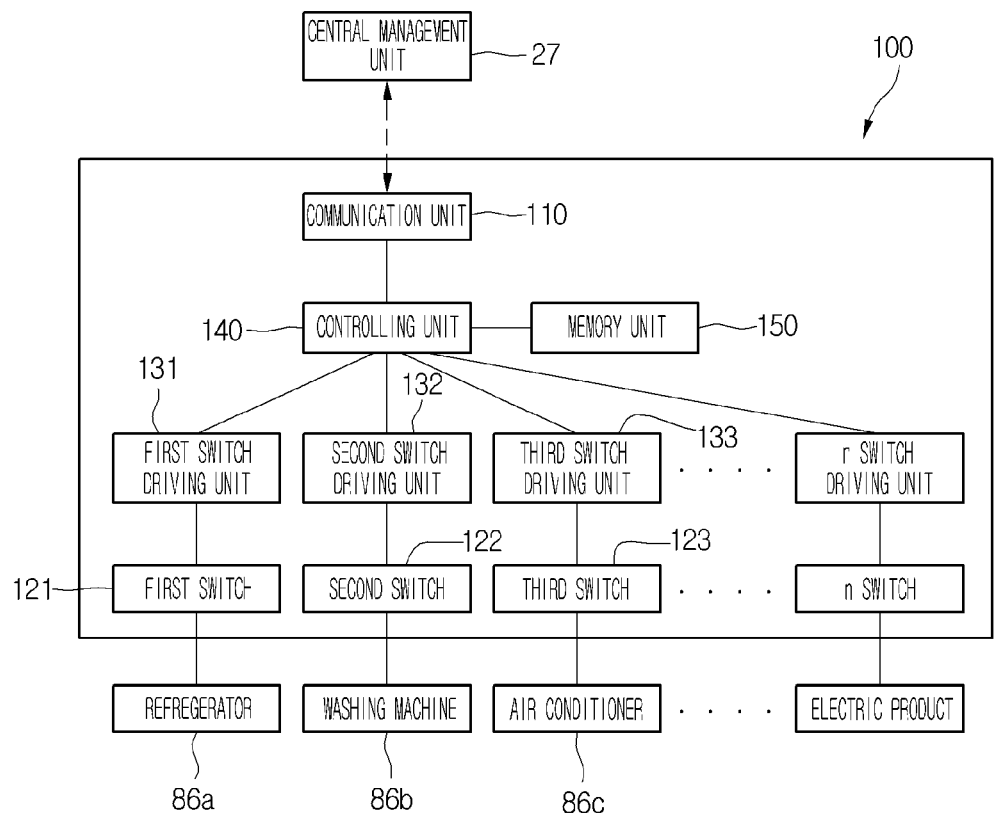
FIG. 15 is a schematic block diagram illustrating a power adjusting device according to a second embodiment.

FIG. 15 is a schematic block diagram illustrating a power adjusting device according to a second embodiment.

Referring to FIG. 15, the power adjusting device 100 includes a communication unit 110 communicating with the central management unit 27. The central management unit 27 may be understood as a component controlling a plurality of energy consuming units 26.

In more detail, the power adjusting device 100 may include a first switch 121, a second switch 122, and a third switch 123, which may selectively supply power to a plurality of energy consuming units 26 (i.e., a plurality of electric products such as a refrigerator 81, a washing machine 82, and an air conditioner 83. The numbers of electric products and switches are not limited.

Moreover, the power adjusting device 100 includes a first switch driving unit 131, a second switch driving unit 132, and a third switch driving unit 133, which drive the first to third switches 121, 122, and 123, respectively. The number of switch driving units corresponds to the number of switches.

The power adjusting device 100 further includes a controlling unit 140 for controlling a plurality of switch driving units and a memory unit 150 storing information related to the driving of the plurality of electric products.

The controlling unit 140 may control the plurality of switch driving units based on information (e.g., energy information or additional information besides energy information) delivered from the central management component 27. The plurality of switch driving units may be separately controlled. In the memory unit 150, energy information (e.g., information about priority of electric products if limited power or cheap energy is supplied or supply rate information of energy distributed into electric products) may be stored. Of course, the priority information of the electric products may be stored in advance in the central management component 27, an energy managing unit (not shown) or a controlling unit of an electric product.

Since the central management component 27 controls whether to drive a plurality of electric products through the power adjusting device 100, power usage amount in a home may be adjusted in general.

Another embodiment is introduced.

The power adjusting device 100 may further include a timer for calculating a time to turn on/off the energy consuming unit 26 at a specific time or a time interval. According to the information (energy information or additional information) delivered from the central management component 27, a time or a time interval at which the plurality of energy consuming units 26 operate may be determined, and each energy consuming unit 26 may receive energy during a determined time or a time interval by the operation of the timer.

Figure 16:
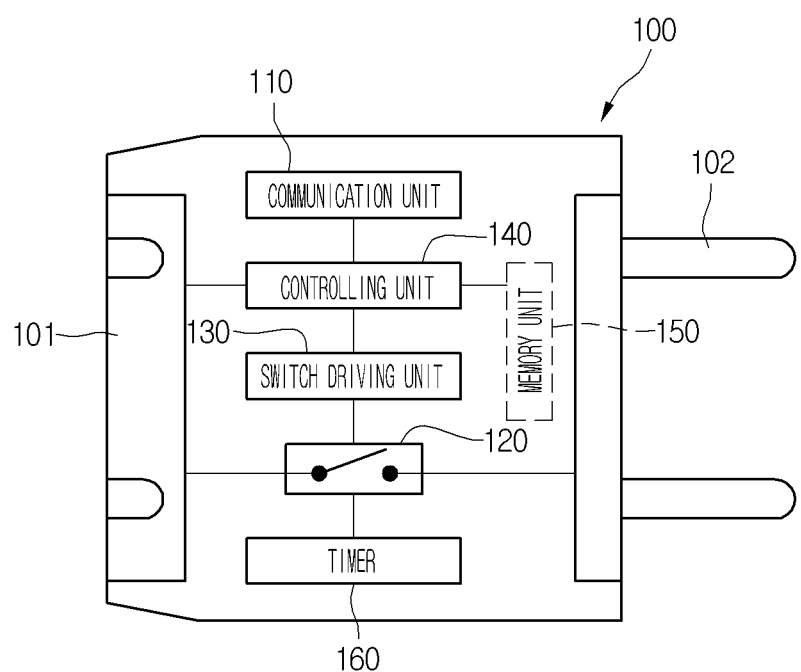
FIG. 16 is a schematic view of a power adjusting device according to a third embodiment.

FIG. 16 is a schematic view of a power adjusting device according to a third embodiment.

Referring to FIG. 16, once a connection line 190 of a component (e.g., an energy consuming unit) without a communications apparatus, it may participate in a network. That is, the power adjusting device 100 serves as a means of communication for providing communication between two components. A component may be electrically connected to the power adjusting device 100 and the power adjusting device 100 may be connected to a wall socket 1800.

The power adjusting device 100 includes at least one component constituting the utility network 10 or the home network 20, for example, a communication unit 110 communicating with the energy managing unit 24 and the energy measuring unit 25, a switch unit 120 turned on/off selectively according to information (e.g., energy information) received through the communication unit 110, a switch driving unit 130 driving the switch unit 120, and a controlling unit 140 controlling the switch driving unit 130. Moreover, a component connected to the power adjusting device and the power adjusting device may perform a power line communication, for example.

The energy managing unit 24 or the energy measuring unit 25 may deliver power information supplied to the energy consuming unit 26 or electricity charge information to the communication unit 110. Moreover, the power adjusting device 100 may further include a timer for counting the time elapsed from a reference point for an operation of the switch 120.

The energy managing unit 24 or the energy measuring unit 25 may store power information or electricity charge information in advance according to a time interval (i.e., scheduled data). The energy managing unit 24 or the energy measuring unit 25 may deliver information that supply power amount or electricity charge may change after a predetermined time elapses (e.g., an on-peak time interval arrives after three hours) to the communication unit 110, based on the stored information.

Based on the information delivered to the communication unit 110, the controlling unit 140 resets the timer 160. The timing that the timer 160 is reset may be a reference timing for driving the timer 160. After the timer 160 is reset, new time is calculated. Moreover, after the predetermined time elapses, the timer 160 notifies to the controller 140 that energy information is changed and the controlling unit 140 turns on/off the switch 120.

That is, if it is recognized that the changed energy information exceeds a predetermined reference related to electricity charge or consumption power, the switch 120 is turned off so that power supplied to the energy consuming unit 26 is cut off. On the other hand, if it is recognized that the changed energy information does not exceed a predetermined reference related to electricity charge or consumption power, the switch 120 is turned on so that power is supplied to the energy consuming unit 26.

Although FIG. 16 illustrates that one component is connected to the power adjusting device 100, a plurality of components may be connected to the power adjusting device. In this case, the power adjusting device 100 may include a plurality of switch driving units and a plurality of switches. The plurality of switches may be separately turned on/off.

Once the controller 140 recognizes the above-mentioned high cost information, the switch driving unit 130 is controlled to turn off the switch 120. Once the switch 120 is turned off, since electricity is not supplied to the connected component, the component does not operate. On the contrary, if the controlling unit 140 recognizes low cost information, the switch driving unit 130 is controlled to turn on the switch.

Additionally, when a predetermined time elapses after the connected component is turned off with the recognition of high cost information, the switch may be turned on. Or, when a predetermined time elapses after the switch is turned on, the switch may be turned off. In this case, the power adjusting device may be controlled based on the calculated time of the timer 160.

Additionally, the power adjusting device may include a memory unit 150 for storing information of a connected component or energy information received from an unconnected component or additional information. Moreover, the information stored in the memory unit 150 may be transmitted to a connected component or an unconnected component.

As another example, the power adjusting device 100 may include a power adjustor for adjusting power instead of the switch 120. The power adjustor may be a current adjustor or a voltage adjustor.

As another embodiment, the power adjusting device 100 may be equipped in a component. That is, a connection line of the component is connected to the power adjusting device 100 and the connection line is connected to the wall socket.

As another example, the power adjusting device 100 may include a sensing unit for sensing power consumed in a connected component or sensing power supplied to a connected component. Additionally, the switch 120 may be turned off when power amount sensed in the sensing unit exceeds a reference amount.

Figure 17:
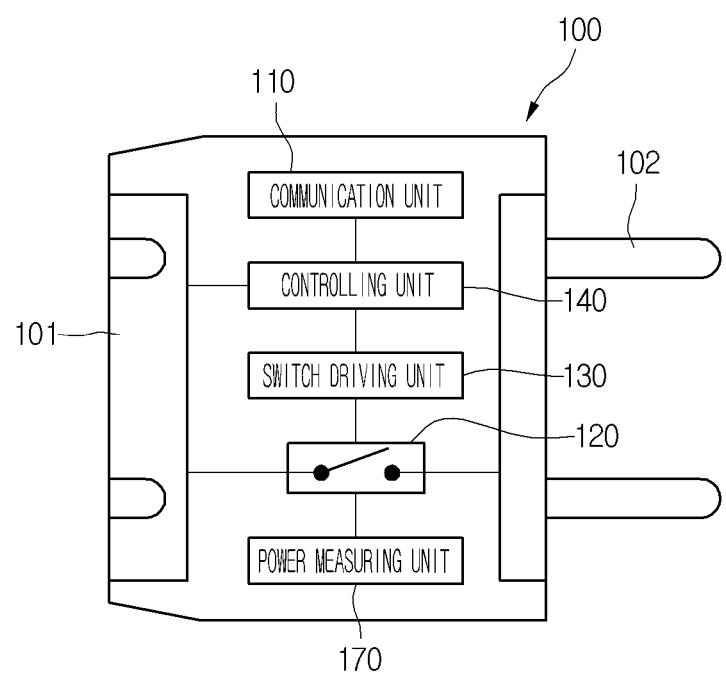
FIG. 17 is a schematic view of a power adjusting device according to a fourth embodiment.

FIG. 17 is a schematic view of a power adjusting device according to a fourth embodiment.

Referring to FIG. 17, the power adjusting device 100 includes a power measuring unit for measuring a power amount consumed in the energy consuming unit 26. The consumed power amount information sensed in the power measuring unit 170 may be delivered to the energy measuring unit 24 or the energy measuring unit 25 through the communication unit 110.

The energy managing unit 24 or the energy measuring unit 25 may generate information for driving the switch 120 based on the delivered power amount information. In more detail, the information for driving the switch 120 may be information determining power supply or power supply amount of the energy consuming unit 26 based on the consumed power amount information and electricity charge or power information recognized in a network system.

The information for driving the switch 120 is delivered to the controlling unit 140 through the communication unit 110 and the controlling unit 140 may control the turning on or off of the switch 120 according to the delivered information.

Moreover, the energy managing unit 24 or the energy measuring unit 25 may control the energy consuming unit 26 to deliver only a necessary power amount to the energy consuming unit 26 based on the power amount information delivered from the energy consuming unit 26 and the energy information recognized in the network system.

Moreover, when a plurality of energy consuming units 26 are connected to the power adjusting device 100, the energy managing unit 24 or the energy measuring unit 25 may control the energy consuming unit 26 to deliver only a necessary power amount to the energy consuming unit 26 based on the power amount information measured in the plurality of energy consuming units 26 and the energy information.

Another embodiment is introduced.

The power adjusting device 100 includes a memory unit 150 for storing reference power or current amount information of the energy consuming unit 26. The reference power amount information may be set in advance as information compared with the consumed power amount sensed in the power measuring unit 170.

If the consumed power amount exceeds the reference power amount, this may be recognized as a signal for power reduction or electricity charge reduction and accordingly, the controlling unit 140 may control the turning on/off of the switch 120 by itself.

Another embodiment is introduced.

The power adjusting device 100 may include the timer of FIG. 16. When it is sensed by the controlling unit 140 that the energy consuming unit 26 is not in use, the timer may operate. If a time calculated by the timer exceeds a predetermined time, the switch 120 is turned off so that power supplied to the energy consuming unit 26 may be cut off.

A case that the energy consuming unit 26 includes a component with a memory function will be described. Even if power supplied to the energy consuming unit 26 is cut off, an electric condenser may be equipped in the energy consuming unit 26 to supply power to the component with a memory function.

Figure 18:
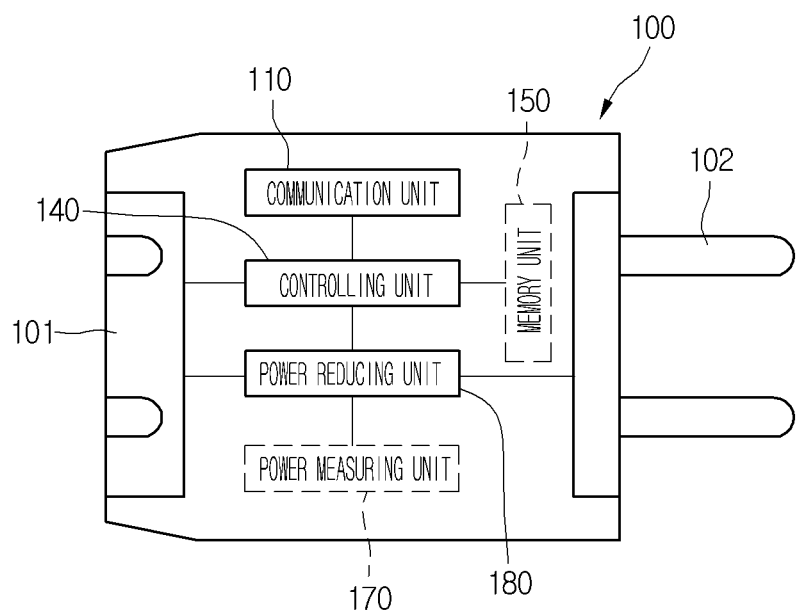
FIG. 18 is a schematic view of a power adjusting device according to a fifth embodiment.

FIG. 18 is a schematic view of a power adjusting device according to a fifth embodiment.

Referring to FIG. 18, the power adjusting device 100 may control the reducing of current applied to the energy consuming unit 26, according energy information delivered from the energy managing unit 24 or the energy measuring unit 25.

In more detail, the power adjusting device 100 may include a power reducing unit 180 for reducing power supplied to the energy consuming unit 26 or current applied to the energy consuming unit 26.

The power reducing unit 180 is configured to reduce power (current) inputted from the power supplying unit 180 by a predetermined rate to output it to the electric product connection line 190. Here, the predetermined rate may be changed in correspondence to the energy information (e.g., power reduction or electricity charge reduction information). The maximum value of the predetermined rate is 100% and in this case, the power reducing unit 180 corresponds to a state that the switch 120 is turned off.

On the contrary, in a network system, when recognizing of the power reduction or electricity charge reduction information is completed (i.e., when energy information related to power maintenance or power increase is recognized), the energy managing unit 24 or the energy measuring unit 25 may deliver energy information for maintaining or increasing current applied to the energy consuming unit 26 to the power adjusting device 100.

Of course, a current rate applied to the energy consuming unit 26 may be changed in correspondence to the energy information through the power adjusting device 100. The maximum value of the predetermined rate is 100% and in this case, power inputted from the power supplying unit 180 is outputted to the electric product connection line 190.

Another embodiment is introduced.

The power adjusting device 100 may further include a power measuring unit 170. The power measuring unit 170 measures a power amount consumed in the energy consuming unit 26 and delivers it to the controlling unit 140.

The controlling unit 140 compares the consumed power amount with a reference power amount stored in a memory 150 and controls the power reducing unit 180 to reduce current applied to the energy consuming unit 26 when the consumed power amount exceeds the reference power amount.

Moreover, when the consumed power amount becomes lower than the reference power amount, the controlling unit 140 may again increase current applied to the energy consuming unit 26.

Figure 19:
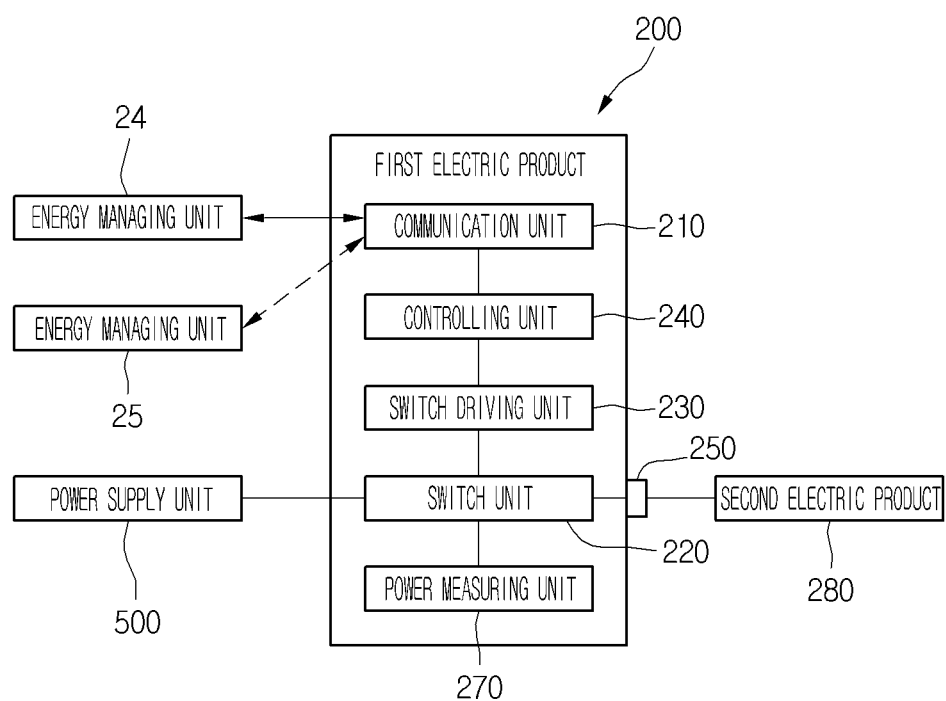
FIG. 19 is a schematic block diagram illustrating a network system with a power adjusting device according to a sixth embodiment.

FIG. 19 is a schematic block diagram illustrating a network system with a power adjusting device according to a sixth embodiment.

Referring to FIG. 19, a network system includes a first electric product 200 and a second electric product 280. Here, the first electric product 200 may be referred to as a first energy consuming unit and the second electric product 280 may be referred to as a second energy consuming unit.

The first electric product 200 as itself may be referred to as an energy consuming unit 26 having a communication environment with the network system and the second electric product 280 as itself may be referred to as an energy consuming unit 26 having no communication environment with the network system.

In more detail, the first electric product 200 includes a power output terminal 250 connected to the second electric product 280. Power supplied from the power supplying unit 280 may be outputted to the second electric product 280 through the power output terminal 250. The power output terminal 250 may be understood as a socket for connection of an electric product.

Between the power supplying unit 180 and the power output terminal 250, provided is a switch unit 220 for selectively supplying power to the second electric product 280. The switching unit 220 may be selectively turned on/off based on energy information delivered from the energy measuring unit 25 to the communication unit 210 or additional information besides the energy information.

If the information represents that the energy information exceeds a predetermined reference value, for example, information related to power reduction or electricity charge reduction, the controlling unit 240 controls the switch driving unit 230 to turn off the switch 220. On the contrary, if the energy information is less than the reference value, the switch 220 is turned on so that power is supplied from the power supplying unit 180 to the second electric product 280.

As mentioned above, since one electric product communicating with a network system and another electric product without a communication function co-exist and the one electric product has an output terminal connected to the another electric product, power usage of the another electric product may be monitored. As a result, an energy consuming unit may effectively deal with a situation in correspondence to the changed energy information.

Moreover, the first electric product 200 further include a power measuring unit 270 for measuring power consumed in the second electric product 280. The power used in the second electric product 280 is recognized in the power measuring unit 280 through the power output terminal 250.

The consumed power amount of the second electric product 280 sensed in the power measuring unit 270 may be compared with a predetermined reference power amount. If the consumed power amount is sensed greater than the reference power amount, the controlling unit 240 may control the switch driving unit 230 to turn off the switching unit 220. As a result, current applied to the second electric product 280 is limited so that power reduction of electricity charge reduction of the energy consuming unit 26 may be possible.

On the contrary, if the consumed power amount is sensed less than the reference power amount, the switching unit 220 may be turned on and accordingly, current is applied to the second electric product 280, thereby driving the second electric product 280.

The transmission and reception of the energy information between the first electric product 200, the energy managing unit 24 or the energy measuring unit 25 are mainly described. However, the additional information may be transmitted or received and the second electric product 280 may be controlled according to the additional information.

Figure 20:
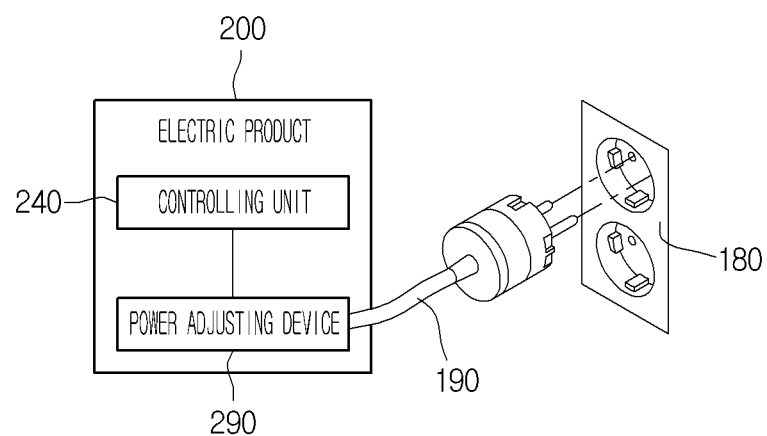
FIG. 20 is a schematic view of a power adjusting device according to a seventh embodiment.

FIG. 20 is a schematic view of a power adjusting device according to a seventh embodiment.

Referring to FIG. 20, the power adjusting device 290 may be built in an electric product 200. Description of the power adjusting device 290 refers to that of the power adjusting device 100 of FIG. 13. The power adjusting device 290 is connected to a power supplying unit 280 through an electric product connection line 190.

The power adjusting device 290 is communicated with the energy managing unit 24 or the energy measuring unit 25, and the controlling unit 240 may selectively cut off power supply in correspondence to energy information delivered from the energy managing unit 24 or the energy measuring unit 25.

Another embodiment is introduced.

The power adjusting device may be configured to selectively cut off supply of power (current or voltage) and change a power amount. That is, the power adjusting device may increase or decrease a power amount (a size of voltage or current) supplied to an electric product according to a control signal of a predetermined controlling device (e.g., the controlling unit or the EMS).

Also, another embodiment is introduced.

The power adjusting device may be disposed in an electric product. If the power adjusting device is disposed in an electric product, the power adjusting device may not include an additional controlling unit for controlling the same. Moreover, the power adjusting device may be controlled by a controlling unit in the electric product.

On the contrary, the power adjusting device may be disposed outside an electric product. If the power adjusting device is disposed outside an electric product, the power adjusting device may include an additional controlling unit (hereinafter, referred to as a power adjustment controlling unit) for controlling the same. The power adjusting device may be controlled by the additional controlling unit.

Figure 21:
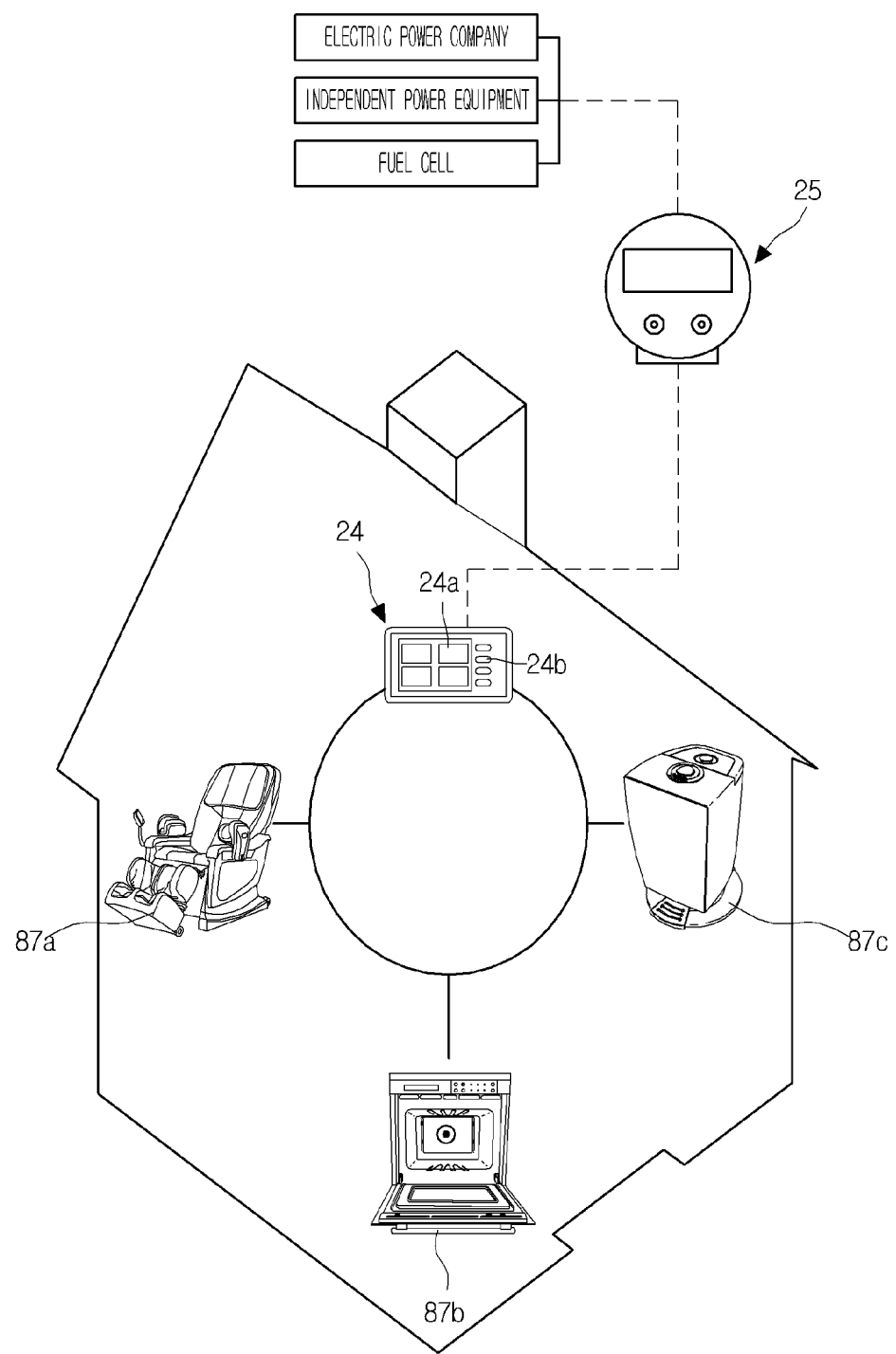
FIG. 21 is a schematic view illustrating one example of a power management network of a home where an auxiliary power supplying device is connected for charging.

FIG. 21 is a schematic view illustrating one example of a power management network of a home where an auxiliary power supplying device is connected for charging.

Referring to FIG. 21, the power management network of a home where an auxiliary power supplying device is connected for charging includes an Advanced Metering infrastructure (AMI) 25 for recognizing and utilizing the supplied power and electricity charge in real-time and an Energy Management System (EMS) 24 connected to the AMI 25 and responsible for a real-time power management of the demanding unit and a real-time prediction of consumed power.

The auxiliary power supplying device may be understood as one configuration of the power adjusting device 100. Here, the AMI 25 is a base technology for integrating consumers based on an open architecture in an intellectual power net. Also, it allows consumers to effectively use electricity and provide a power supplier the ability for effectively operating a system by sensing limitations of a system.

That is, due to the AMI 25, regardless of manufacturers, the intellectual power net provides a reference that all electric appliances are connected to each other and broadcasts a real-time price signal of a power market supplied through the AMI 25, to the EMS 24 in the demanding unit.

Additionally, the EMS 24 distributes power to a plurality of electric devices in a home and connects each electric device for communication, so that power information of each electric device is recognized. Based on this, power information processing such as consumed power amount or electricity charge limitation setting is performed so that energy and cost reduction may be obtained.

The plurality of electric devices are electric products used in a home and may include a massager 87a, a cooking appliance 87b, and a humidifier 87c. That is, a home includes an AMI 25 for measuring supplied power and electricity charge and power consumption peak time interval in real time and an EMS 24 responsible for transmission and reception of a control signal to distribute power to each home appliance with a two-way communication between the AMI 25 and the plurality of home appliances. As a result, a power supply network is established. Moreover, the home appliances are connected to the established power supply network to receive operating power.

Here, the EMS 24 includes a display unit 24a for displaying a current electricity consumption state and an external environment (e.g., temperature and humidity), an input unit 24b that a user manipulates, a communication unit (not shown) for communicating with a plurality of home appliances through wireless or wire such as PLC, and a controlling unit (not shown) for processing a control signal.

Home appliances connected for communication with the EMS 24 have unique codes for each product registered in the EMS 24 and thus, transmission information provided from an auxiliary power supplying device 400 of FIG. 22 described below may be delivered to home appliances using the registered unique code.

Figure 22:
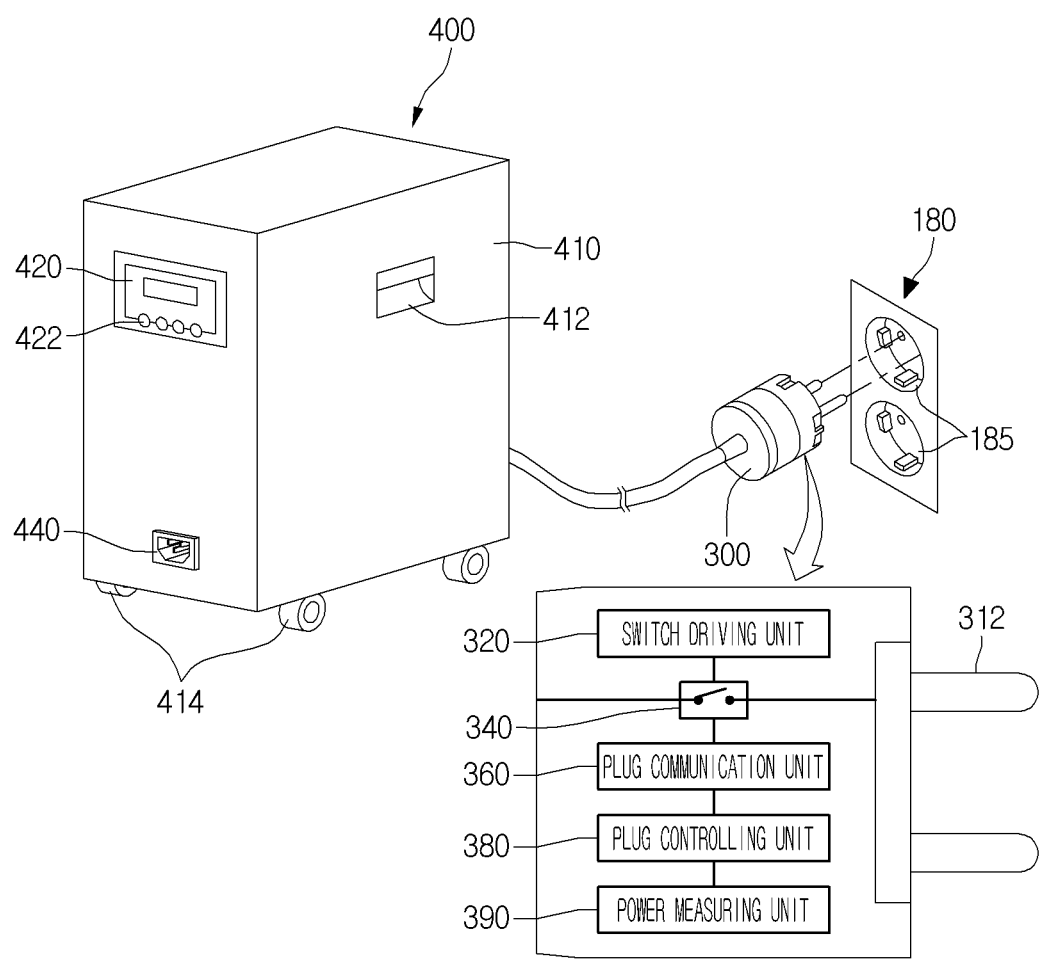
FIG. 22 is a view illustrating one example of an auxiliary power supplying device according to an embodiment.
Figure 23:
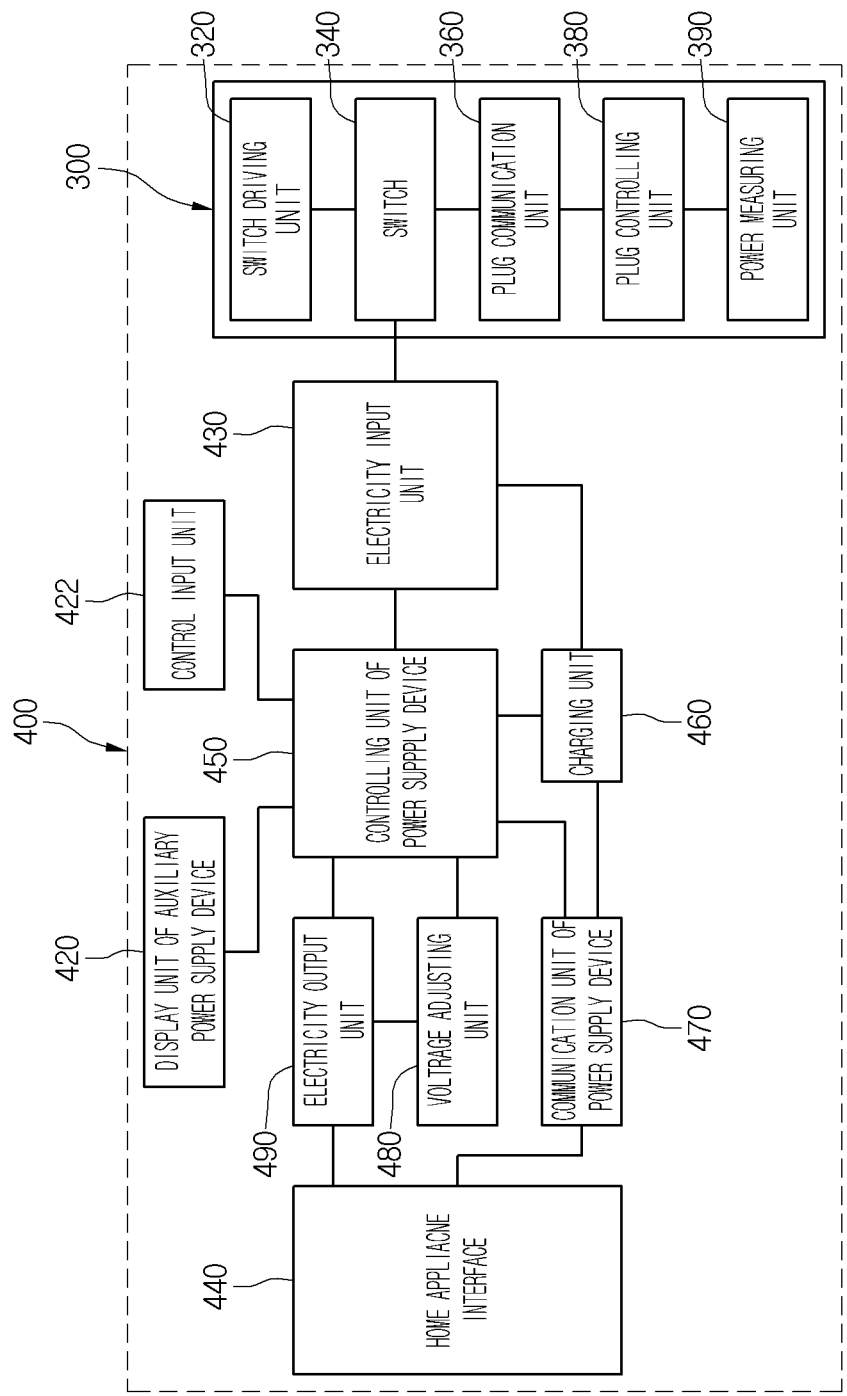
FIG. 23 is a view illustrating an internal configuration of an auxiliary power supplying device according to an embodiment.

FIG. 22 is a view illustrating one example of an auxiliary power supplying device according to an embodiment. FIG. 23 is a view illustrating an internal configuration of an auxiliary power supplying device according to an embodiment.

Referring to FIGS. 22 and 23, the auxiliary power supplying device 400 has an outer appearance by an about rectangular case 410 and is combined with a wall socket 180 connected to a power management network including the AMI 25 and the EMS 24 to receive power for charging. Moreover, the case 410 may further include a carrying handle 412 that a user grabs for carriage.

Additionally, the auxiliary power supplying device 400 includes a connecting plug 300 for communicating with the EMS 24. In more detail, the connecting plug 300 includes a combining unit 312 inserted into a socket 184 of the wall socket 180.

Moreover, the connecting plug 300 includes a plug communication unit 360 for two-way communication with the EMS 24, a switch 340 for selective charging according to price information of supplied electricity received from the EMS 24, and a switch driving unit 320 for driving the switch 340.

Additionally, the switch driving unit 320 sets the maximum price of electricity charge to be supplied in order to limit supplied electricity charge of a price range chargeable from the EMS 24 and further includes a plug controlling unit 380 for operating the switch driving unit 320 by comparing a predetermined price with a plurality of supply prices and a power measuring unit 390 for measuring a charged electricity amount.

Moreover, electricity supplied from the above connecting plug 300 is delivered to the electricity input unit 430 in the auxiliary power supplying device 400 and is stored in a charging unit 460.

Moreover, the auxiliary power supplying device 400 includes a home appliance interface 440 connected to a plurality of home appliances compatibly. The home appliance interface 440 provides electricity as an operating power stored in the charging unit 460 to the connected home appliances once one home appliance is connected and also may include a voltage adjuster 480 in the auxiliary power supplying device 400 to provide a stable operating power.

Additionally, the auxiliary power supplying device 400 includes a power supplying device communication unit 470 for transmitting/receiving a control signal to/from a connected home appliance and a power supplying device controlling unit 450 for charging and supplying a charged power and processing a control signal.

Moreover, the auxiliary power supplying device 400 includes a control input unit 422 for setting the maximum price of chargeable electricity, an auxiliary power supplying device display unit 420 for displaying a supply price of electricity in charge and a charge level and price information set through the control input unit 422, and a moving wheel for easily changing a position of the auxiliary power supplying device 400.

Hereinafter, embodiments of home appliances connected to the auxiliary power supplying device 400 are described in more detail.

Figure 24:
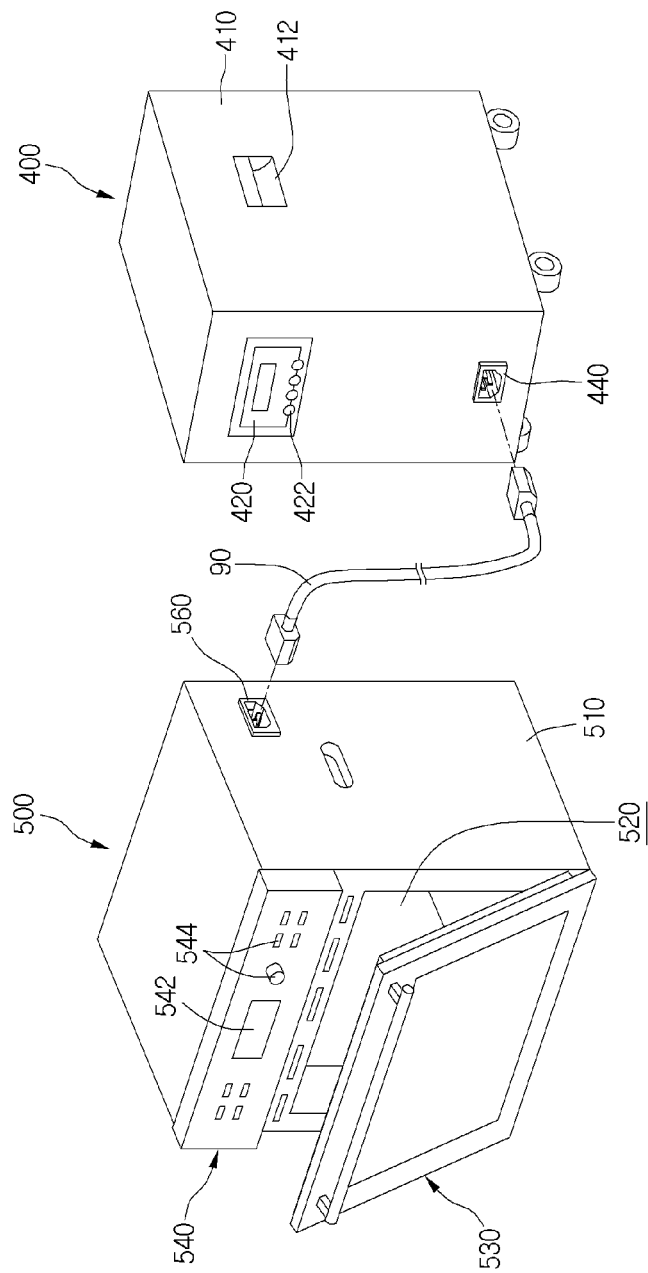
FIG. 24 is a view illustrating one example of a home appliance connected to an auxiliary power supplying device according to an embodiment.
Figure 25:
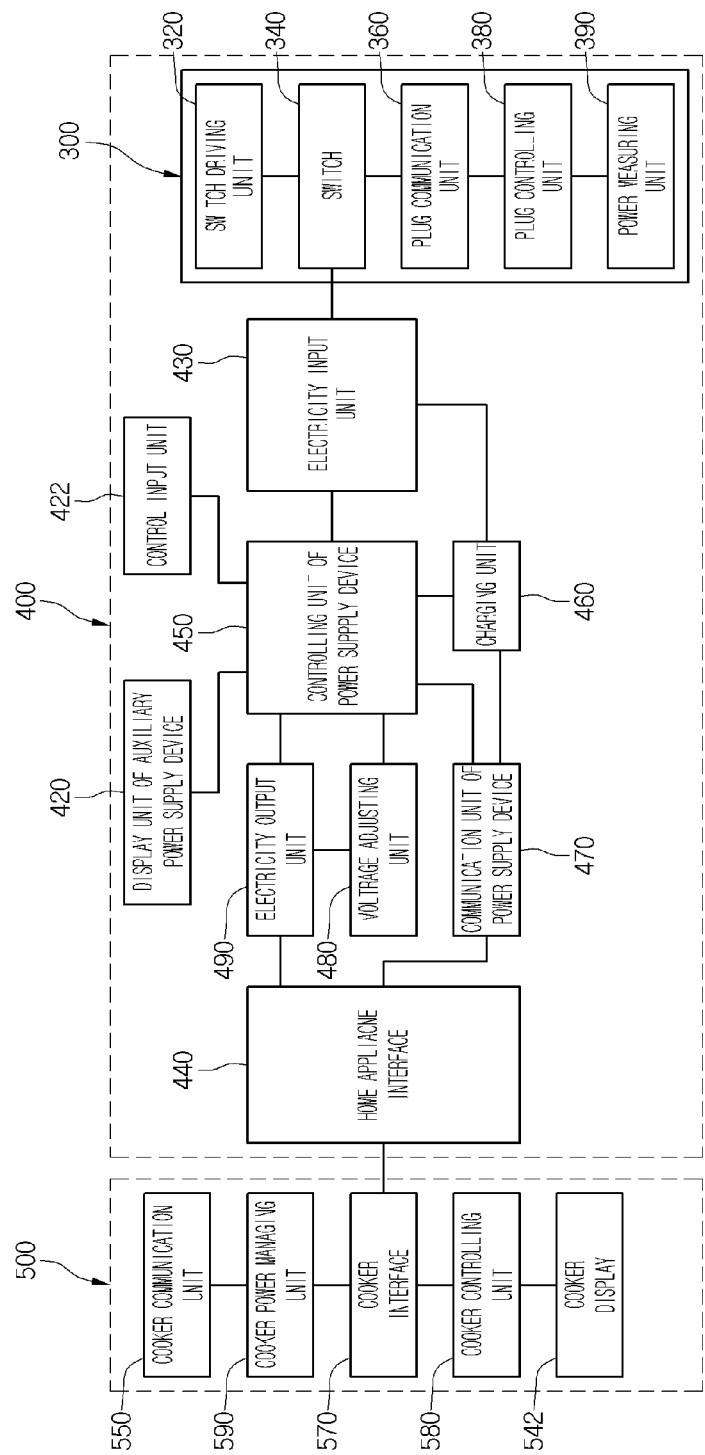
FIG. 25 is a block diagram illustrating a control configuration of a home appliance and an auxiliary power supplying device shown in FIG. 24.

FIG. 24 is a view illustrating one example of a home appliance connected to an auxiliary power supplying device according to an embodiment. FIG. 25 is a block diagram illustrating a control configuration of a home appliance and an auxiliary power supplying device shown in FIG. 24.

FIGS. 24 and 25 illustrate a cooker 500 for cooking food as a home appliance. Referring to the drawings, the cooker 500 has a rectangular inner space of a cooker main body 510 with the hollowness to receive food and a cooking chamber for cooking the received food by selectively using a plurality of heating sources. The cooking chamber 520 is selectively shield by a rotating door 530 combined to the cooker main body 510 to load/unload food.

Moreover, a control panel 540 for selectively controlling the plurality of heating sources in the cooking chamber 520 is provided on the upper front of the cooker main body 510. For this, the control panel 540 includes a manipulation unit 544 for selecting a heating source through a press or rotating operation of a user and controlling a cooking time of the selected heating source and a cooker display 542 for displaying a control command inputted through the manipulation unit 544 and a control state according thereto and operation information of the cooking chamber 520. Additionally, at one side of the control panel 540, further provided are a cooker communication unit 550 and a cooker controlling unit 580.

Moreover, at one side of the cooker main body 510, provided is a cooker auxiliary power connection unit 560 for using charged power stored in the auxiliary power supplying device 400 and the cooker auxiliary power connection unit 560 and the auxiliary power supplying device 400 may be connected through a connection cable 90.

In more detail, the auxiliary power supplying device 400 includes a home appliance interface 440 for connecting to the cooker 500 through the connection cable 90 and the cooker 500 includes a cooker interface 570 for connecting to the auxiliary power supplying device 400 through the cooker auxiliary power connection unit 560 so that supplying of charged electricity and delivering of a control signal become possible.

Once the auxiliary power supplying device 400 is connected to the cooker 500 through the connection cable 90, electricity stored in the charging unit 460 of the auxiliary power supplying device 400 is supplied to the cooker 500 through an electricity output unit 490 and the cooker 500 includes a cooker power managing unit 590 for operating the cooker 500 by using the supplied electricity.

That is, the cooker power managing unit 590 allows electricity supplied from the connected auxiliary power supplying device 400 to be used after the auxiliary power supplying device 400 is connected. Although not shown in the drawings, if a power plug of the cooker 500 is directly connected to the wall socket 180, electricity supplied through a power supply network is controlled to be used as an operating power.

Moreover, while charged power is supplied to the cooker 500, the display unit 420 of the auxiliary power supplying device 400 may display consumed amount of a charged electricity and usage charge of the supplied electricity. Moreover, the auxiliary power supplying device 400 supplying charged power to the cooker 500 may be connected another home appliance besides the cooker 500.

Figure 26:
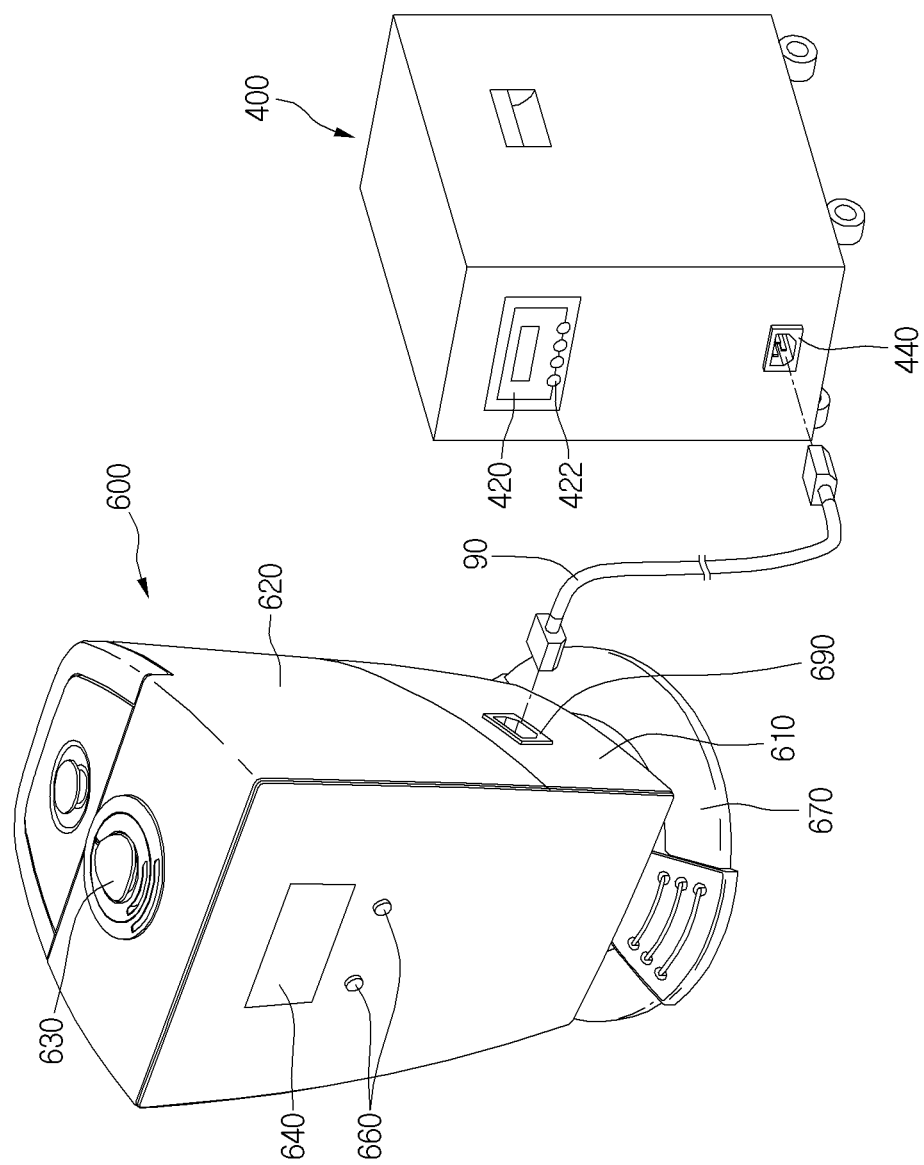
FIG. 26 is a view illustrating another example of a home appliance connected to an auxiliary power supplying device according to an embodiment.
Figure 27:
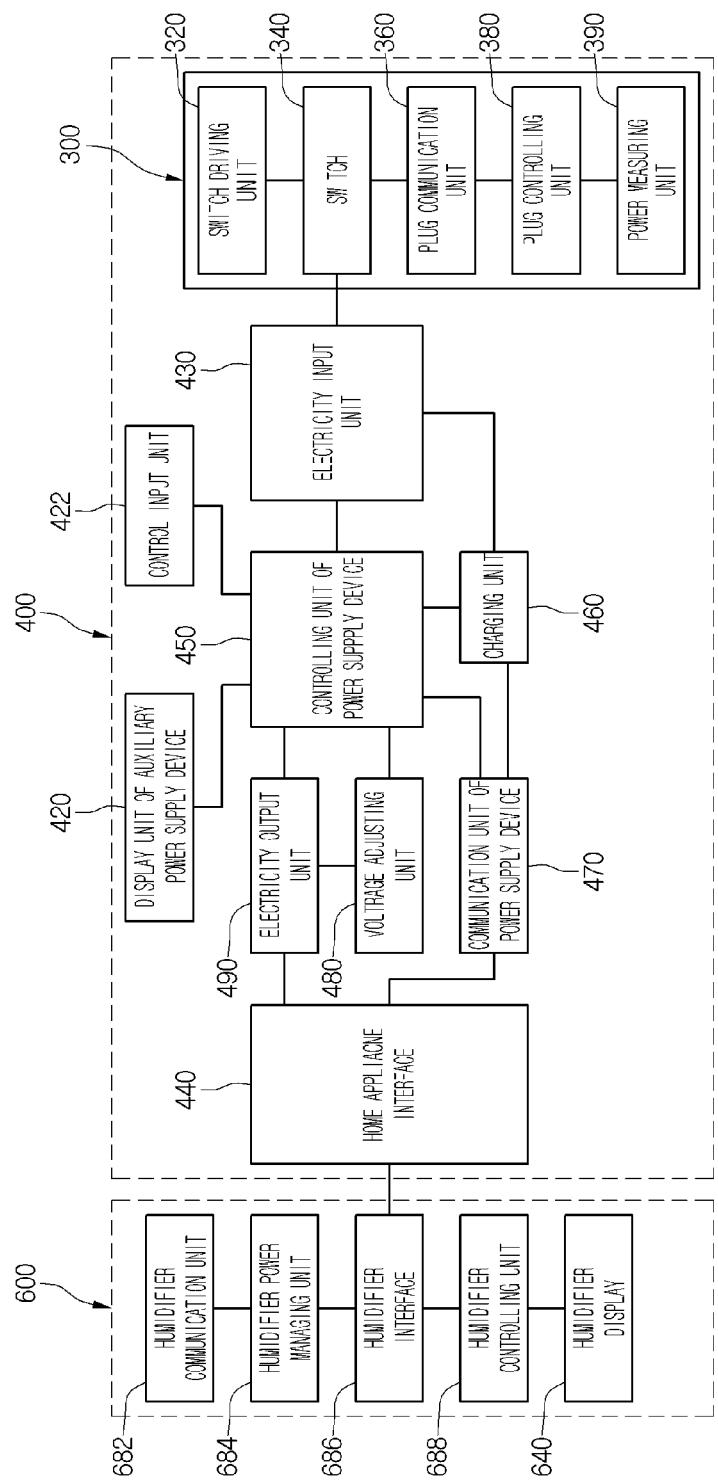
FIG. 27 is a block diagram illustrating a control configuration of the home appliance and the auxiliary power supplying device of FIG. 26.

FIG. 26 is a view illustrating another example of a home appliance connected to an auxiliary power supplying device according to an embodiment. FIG. 27 is a block diagram illustrating a control configuration of the home appliance and the auxiliary power supplying device of FIG. 26.

In FIGS. 26 and 27, as home appliances, provided is a humidifier 600 for creating a pleasant indoor environment by adjusting humidity of an interior space. Referring to drawings, the humidifier 600 largely includes a humidifier main body 610 and a water tank 620 mounted on the humidifier main body 610.

In more detail, the humidifier main body 610 provides a space at a portion of the rear to mount the water tank 620. Once the water tank 620 is mounted, it processes the water received in the water tank 620 to generate wet vapor. For this, an ultrasonic generator or a heating element is equipped in the humidifier main body 610 and a blower unit for discharging the generated wet vapor may be further included in the humidifier main body 610.

A path of the wet vapor generated from the humidifier main body 610 is prepared in the water tank 620 and an injection nozzle 630 is selectively mounted on the path to discharge the wet vapor in a direction that a user wants.

Additionally, at the front of the humidifier main body 610, provided are a manipulation unit 660 through which a user controls an injection amount and time and a humidifier display 640 for displaying an input state of a control command by the manipulation unit 660 and operating information of the humidifier 600.

Moreover, the humidifier display 640 may display information according to a control signal delivered through the auxiliary power supplying device 400 or the EMS 24 and for this, a humidifier communication unit 682 and a humidifier controlling unit 688 may be further included in the humidifier main body 610.

Moreover, at one side of the humidifier main body 610, provided is a humidifier auxiliary power connection unit 690 for utilizing charged power stored in the auxiliary power supplying device 400 and the humidifier auxiliary power connection unit 690 and the auxiliary power connection unit 690 may be connected through a connection cable 90 like the cooker 500.

More specifically, a home appliance interface 240 connected to the humidifier 600 through the connection cable 90 is equipped in the auxiliary power supplying device 400 and a humidifier interface 686 connected to the auxiliary power supplying device 200 through the humidifier auxiliary power connection unit 690 is equipped in the humidifier 600 so that supplying of charged electricity and delivering of a control signal become possible.

Once the auxiliary power supplying device 400 is connected to the humidifier 600 through the connection cable 90, the electricity stored in the charging unit 460 of the auxiliary power supplying device 400 is supplied to the humidifier 600 through an electricity output unit 490 and a humidifier power managing unit 686 is equipped in the humidifier 600 to allow the humidifier 600 to operate using the supplied electricity.

That is, the humidifier power managing unit 686 allows electricity supplied from the connected auxiliary power supplying device 200 to be used after the auxiliary power supplying device 200 is connected. Although not shown in the drawings, if a power plug of the humidifier 600 is directly connected to the wall socket 180, electricity supplied through a power supply network is controlled to be used as an operating power.

Moreover, while the charged power is provided to the humidifier 600, the display unit 420 may display a consumption amount of the charged electricity and usage fee of the provided electricity.

Figure 28:
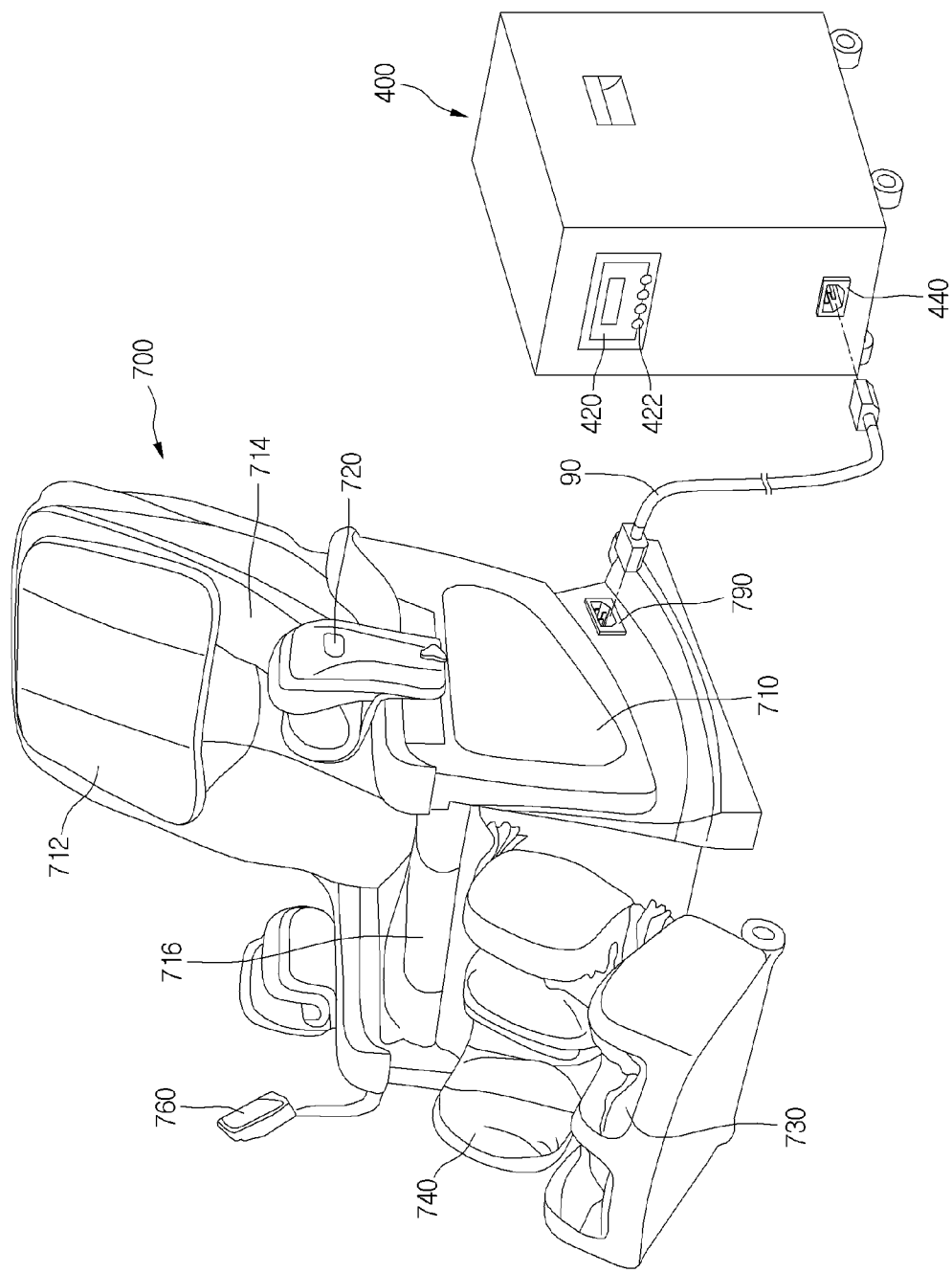
FIG. 28 is a view illustrating further another example of a home appliance connected to an auxiliary power supplying device according to an embodiment.
Figure 29:
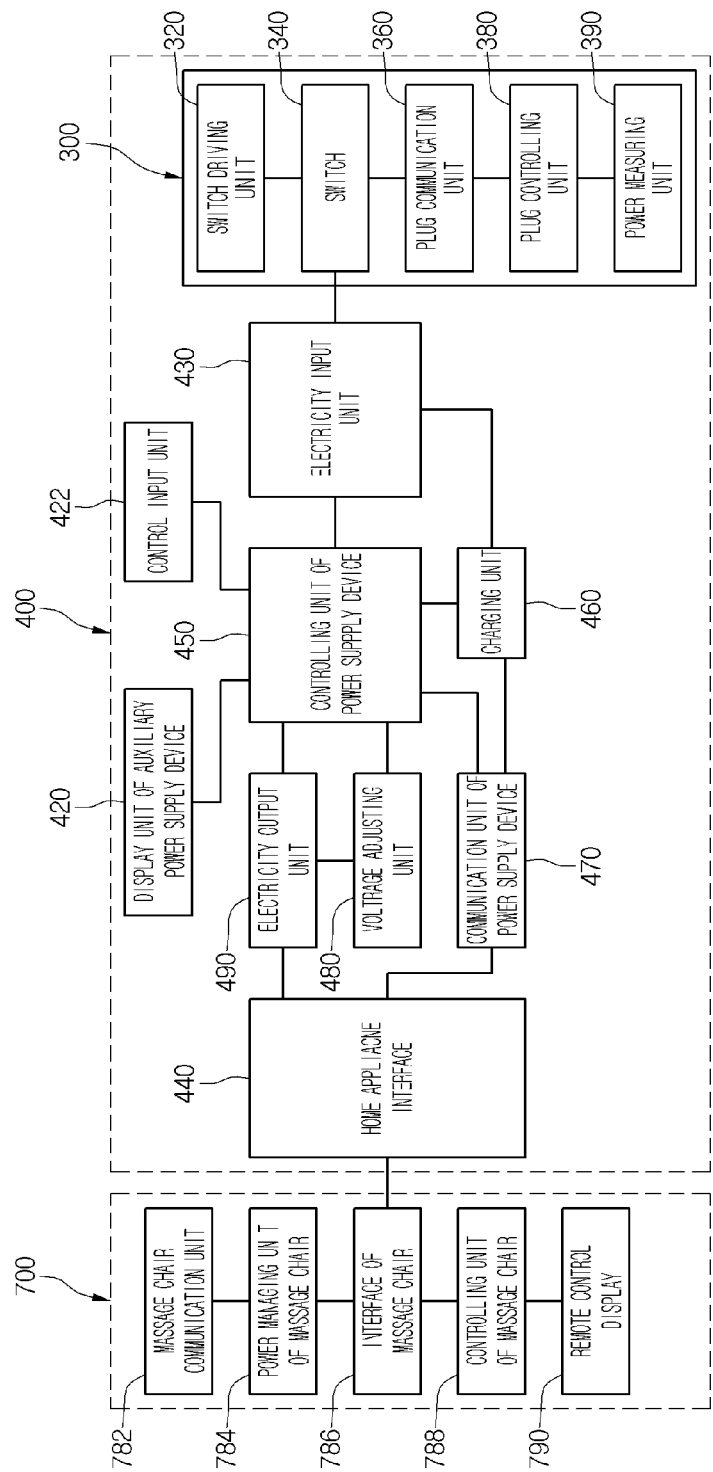
FIG. 29 is a block diagram illustrating a control configuration of the home appliance and the auxiliary power supplying device of FIG. 28

Moreover, FIG. 28 is a view illustrating further another example of a home appliance connected to an auxiliary power supplying device according to an embodiment. FIG. 29 is a block diagram illustrating a control configuration of the home appliance and the auxiliary power supplying device of FIG. 28.

In FIGS. 28 and 29, a massage chair 700 for massaging a body of user is shown as a home appliance. Referring to the drawings, the massage chair 800 is used.

In detail, a main body 710 includes a back pad 714 for massaging a user's back, a headrest pad 712 for massaging the user's neck, a hip pad 716 for massaging a user's hip, arm massage parts 720, a leg massage part 740, and a foot massage part 730, which operate independently. To this end, motors or air adjustment devices that operate independently are provided to separately massage each part of the body.

That is, each of the back pad 714, the headrest pad 712, and the hip pad 716 includes a plurality of massage protrusions connected to a motor to move in various patterns and massage an intended part of a user.

The arm massage parts 720 and the leg massage part 740 use the air adjustment devices to expand and contract the air bag, thereby massaging a user's arms and legs.

The massage chair 700 includes: a remote controller 760 for separately or concurrently operating the above-described massage parts according to a user's need; and a control part 788 for transmitting a control command to each massage part according to contents selected using the remote controller 760.

The remote controller 760 is disposed at a side of the arm massage part 720, so that a user seated on the massage chair 720 can conveniently check and operate the remote controller 760. The remote controller 760 includes a touch type display 790, so that a user can conveniently check and select an operation mode.

Accordingly, a user may input a control signal and confirm a control situation through the touch display 790 while seating on the massage chair main body 710. Additionally, at one side of the remote controller 760, further provided are a massage communication unit 782 and a massage chair controlling unit 788.

Additionally, at one side of the massage chair main body 710, provided is a massage chair auxiliary power connection unit 790 for utilizing charged power stored in the auxiliary power supplying device 400 and the massage chair auxiliary power connection unit 790 and the auxiliary power supplying device 200 are connected through a connection cable 90 like the humidifier 600.

In more detail, the auxiliary power supplying device 400 includes a home appliance interface 440 for connecting to the massage chair 700 through the connection cable 90 and the massage chair 700 includes a massage chair interface 786 for connecting to the auxiliary power supplying device 400 through the massage chair auxiliary power connection unit 790 so that supplying of charged electricity and delivering of a control signal become possible.

Once the auxiliary power supplying device 400 is connected to the massage chair 700 through the connection cable 90, the electricity stored in the charging unit 460 of the auxiliary power supplying device 400 is supplied to the massage chair 700 through an electricity output unit 490 and a massage chair managing unit 784 is equipped in the massage chair 700 to allow the massage chair 700 to operate using the supplied electricity.

That is, the massage chair power managing unit 784 allows electricity supplied from the connected auxiliary power supplying device 400 to be used after the auxiliary power supplying device is connected. Moreover, the display unit 420 may display a consumption amount of charged electricity and a usage fee of provided electricity.

Hereinafter, an operation of the auxiliary power supplying device 400 providing charged power with connection to various home appliances will be described.

Figure 30:
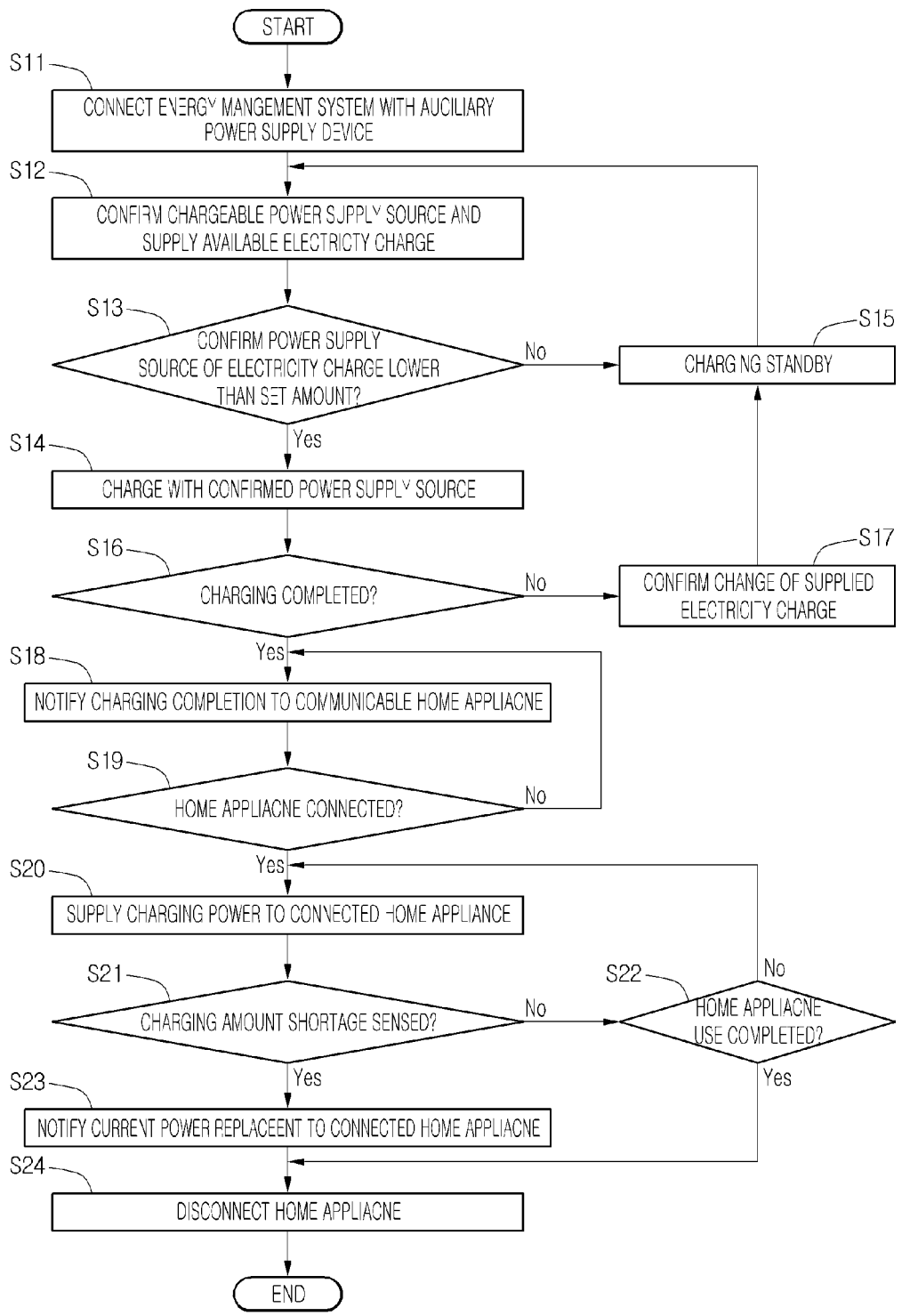
FIG. 30 is a flowchart illustrating a process for supplying power to a home appliance through an auxiliary power supplying device according to an embodiment.

FIG. 30 is a flowchart illustrating a process for supplying power to a home appliance through an auxiliary power supplying device according to an embodiment. Referring to FIG. 30, the auxiliary power supplying device 400 is connected to a power supply network configured to distribute electricity supplied from a plurality of power sources to home appliances in operation S11.

For this, a connecting plug 300 of the auxiliary power supplying device 400 is inserted into the socket 185 and once the connecting plug 300 is mounted, the EMS 24 communicates with the auxiliary power supplying device 400 through the plug communication unit 360. That is, the auxiliary power supplying device 400 confirms a power supplying source chargeable through the EMS 24 and a supply-possible electricity charge in operation S12.

In relation to the above-mentioned chargeable power source and supply-possible electricity charge, the control input unit 422 selects a power supply source with a lower electricity charge than the supply-possible maximum electricity charge set in the power supplying device controlling unit 450. Once the selection is completed, the plug controlling unit 380 operates a switch driving unit 320 to turn on a switch 340 so that charging is performed. Through the above processes, if a chargeable power supply source is confirmed, charging of the auxiliary power supplying device 400 is performed from the confirmed power supplying source in operations S13 and S14.

Moreover, a change of a supply electricity charge is periodically confirmed through the EMS 24 during a charging period and if there is a change, cheaper supply electricity charge than after charge standby is confirmed to perform charging in operations S15 and S17. Moreover, once charging is completed, the auxiliary power supplying device 400 notifies charging completion information to the EMS 24 through the plug communication unit 360.

Also, the EMS 24 receiving the charging completion information notifies whether the auxiliary power supplying device 400 is completely charged or not only to home appliances connected to a power management network in operations S16 and S18.

Once the auxiliary power supplying device 400 is connected to home appliances, a charged power stored in the charging unit 460 is provided to operate home appliances and connection of the auxiliary power supplying device 400 is maintained until usage of the home appliances is finished.

Moreover, while the charged power is provided to the home appliances, if deficiency of the charged power is sensed, the auxiliary power supplying device 400 delivers a message notifying replacement of usage power to the home appliances through a power supplying device communication unit 470 in operations S19, S21, S22, and S23.

Additionally, the disconnected auxiliary power supplying device 200 is connected again to the power management network 10 so that charging is performed and once the charging is completed, the above processes are repeated so that cheaper electricity may be provided to the home appliances 1 in operation S24.

Figure 31:
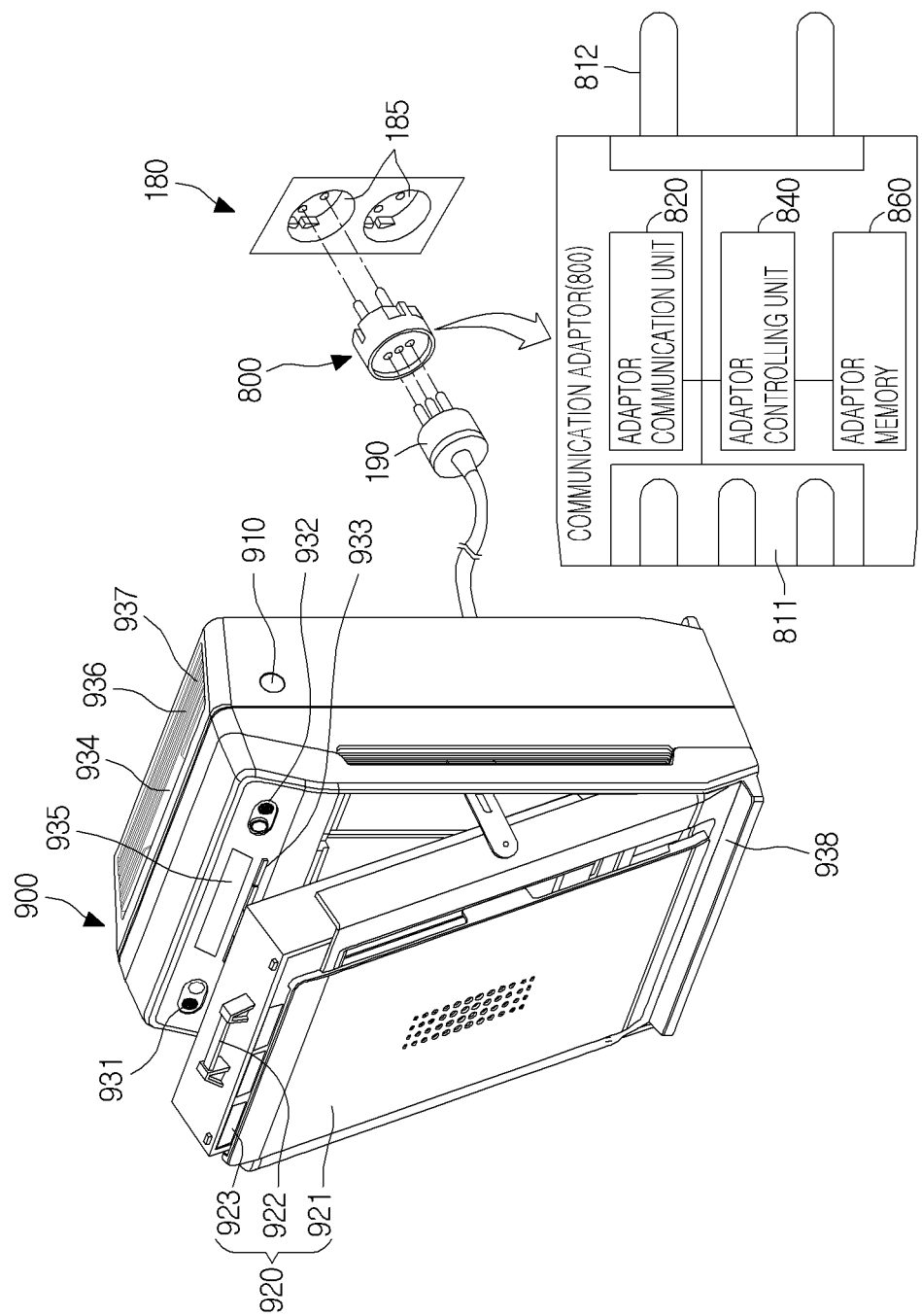
FIG. 31 is a view of a home appliance according to an embodiment.
Figure 32:
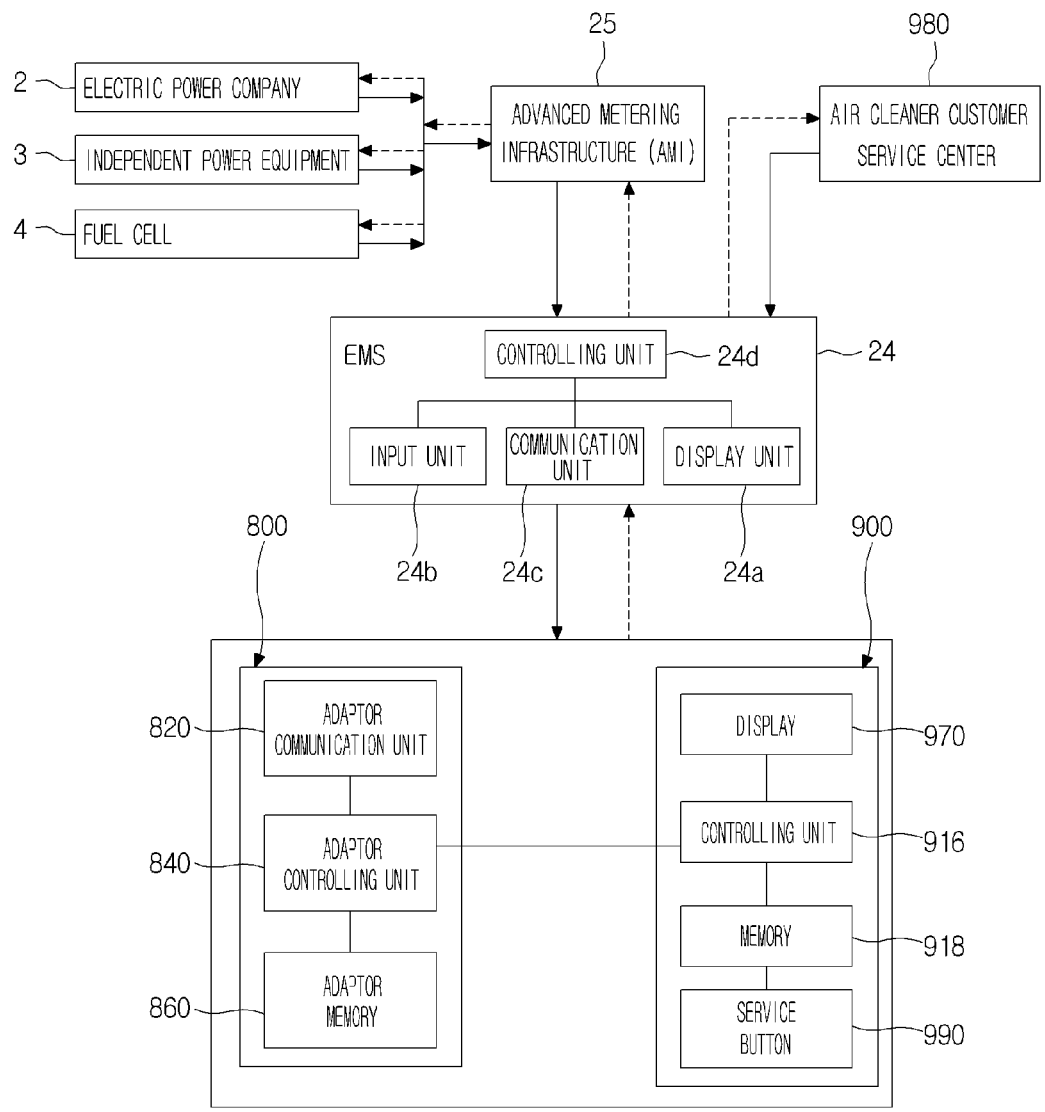
FIG. 32 is a view of a system configuration for service of the home appliance of FIG. 31.
Figure 33:
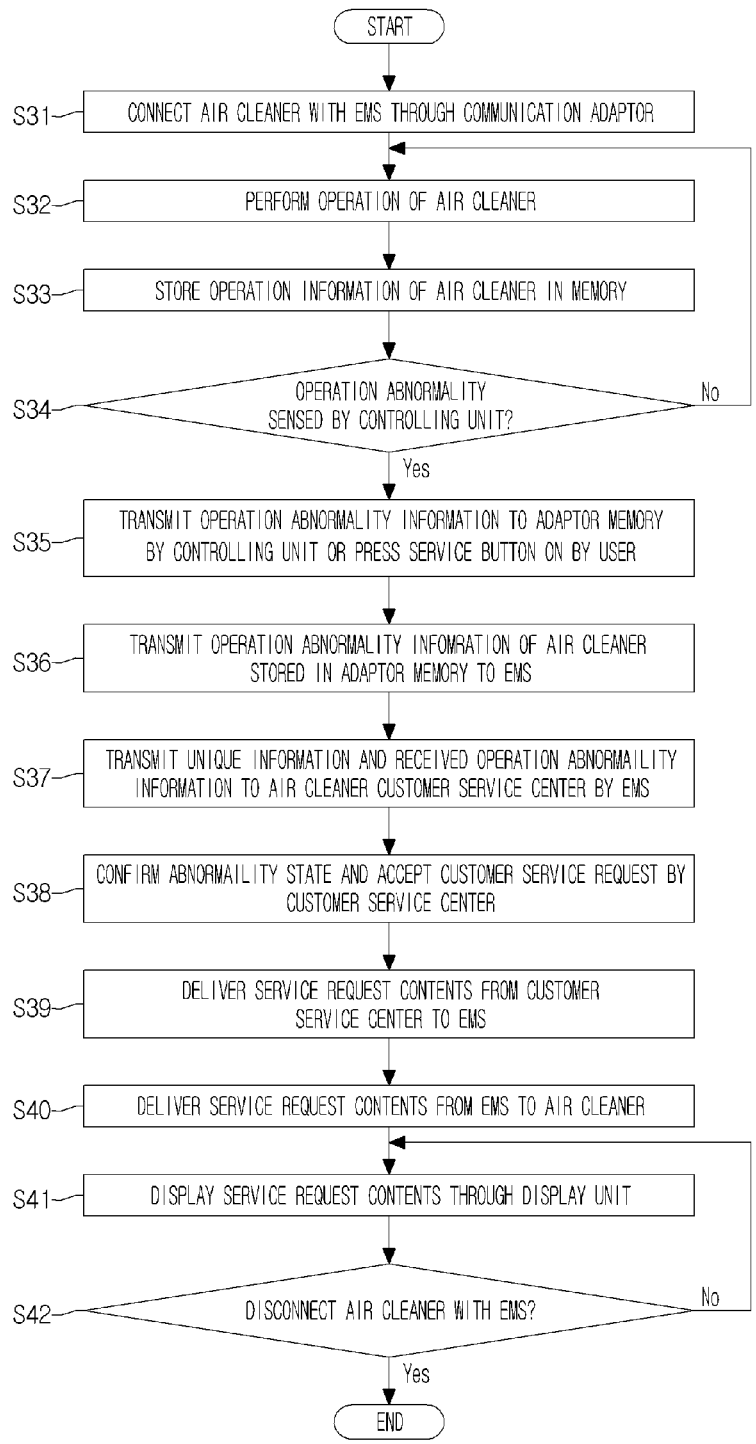
FIG. 33 is a flowchart illustrating a process of receiving a customer service situation of a home appliance according to the system configuration of FIG. 32.

FIG. 31 is a view of a home appliance according to an embodiment. FIG. 32 is a view of a system configuration for service of the home appliance of FIG. 31. FIG. 33 is a flowchart illustrating a process of receiving a customer service situation of a home appliance according to the system configuration of FIG. 32.

In FIGS. 31 through 33, an air cleaner 100 is shown as a home appliance.

Referring to FIGS. 31 through 33, the air cleaner 900 includes a front panel unit 920 forming a front appearance, a main body 930 for forming an overall outer appearance, suctioning external air with foreign materials, and including a mounted filter (not shown) for filtering the suctioned air, an operation displaying unit 935 disposed on the main body 930 and displaying an operation state of the air cleaner 900, an adjustment unit 933 adjusting an operation of the air cleaner 900 by a user, a smell sensing unit 933 disposed at one side of the main body and sensing bad smell among air, an air discharging outlet 936 discharging the filtered air to the air again, a safety shielding net 934 for preventing foreign materials from flowing into the air discharging outlet 936, and a dust sensing unit 931 sensing dust state among air.

Additionally, a detachable filter case 923 for fixing and protecting a filter that separates and filters foreign materials among inflowing air is mounted on the front panel unit 920 and a detachable filter handler 922 that a user grabs is disposed on the filter case 923. The front panel unit 920 has a detachable structure that is hinge-combined with the main body and rotates by a predetermined angle.

Moreover, according to the air cleaner 900, a communication adaptor 800 for power supply through communication with the EMS 24 is connected to a plug 190 for delivering operating power to the main body, so that power supply and two-way communication are performed. The communication adaptor 800 may be understood as one example of the above mentioned power adjusting device 100.

That is, the communication adaptor 800 is mounted to connect between a socket 185 of the wall socket 180 connected to the power supply network and the plug 190 so that power supply and two-way communication may be performed. In more detail, the communication adaptor 800 includes a first combining unit 811 formed in correspondence to a insertion mounting of the plug 190 and a second combining unit 812 inserted into the socket 185 with a shape formed in correspondence to the socket 185, so that the air cleaner 900 may be connected to the power supply network.

Moreover, an adaptor memory 860 for storing operation information of the air cleaner 900, an adaptor communication unit 820 for transmitting and receiving driving information through communication with a communication unit 24c of the EMS 24 and the air cleaner 900, and an adaptor controlling unit 840 are included in the communication adaptor 800.

For this, a data terminal for transmission and reception of data besides a power terminal is further equipped in a plug 190 of the air cleaner 900 and the first connection unit 811 is formed in correspondence to this. Or, a power managing communication chip for transmitting and receiving driving information and power information to/from the adaptor communication unit 820 and the communication unit 24c of the EMS 24 may be further equipped in the air cleaner 900.

Once the air cleaner 900 is connected to a power supply network through the communication adaptor 800 according to the above configuration, a power consumption amount is checked according to an operating signal of the air cleaner 900 and is stored in the adaptor memory 860. For this, an encoder for checking the revolution of a suction motor may be further equipped in the main body 910 and Moreover, a memory 918 storing driving information is equipped in the main body 910 and based on the stored information in the memory 918, a controlling unit 916 for determining whether the air cleaner 900 operates normally is equipped in the main body 910.

The memory 918 stores information related to an operation of the air cleaner 900 (i.e., whether the operation is normal or not), a suction amount and a discharge about of air, a normal operation of the filter, and operations of various sensors at a predetermined time interval.

The controlling unit 916 determines a normal operation of the air cleaner 900 based on the information stored in the memory 918 and an operating environment of a product. If the controlling unit 916 determines that a filter replacement period is passed and an operation of the air cleaner 900 is abnormal, information related to that is automatically transmitted to a customer service center 980 through the adaptor communication unit 820.

Moreover, the main body 930 may further include a service button 990 for transmitting the driving information stored in the memory 918 to the air cleaner customer service center 980 through the EMS 24 through a manual operation of a user. A user directly presses the service button 990 when there is an operational fault in the air cleaner 900.

The service button 990 may be used also when the controlling unit 916 may not automatically request customer service or a request needs to be manually made according to needs of a customer.

Moreover, a display means for displaying customer service reception information delivered from the air cleaner customer service center 980 in correspondence to the information transmitted by the controlling unit 916 or the service button 990 is equipped in the main body 930.

For this, the display means may include a display 970 of a liquid crystal panel for displaying letters and the displayed contents may include an estimated failure part of the air cleaner 900, estimated cost for repair, repair period, and a position of a close service center.

Hereinafter, effects according to an embodiment having the above configuration will be described.

If a user cleans up a house using the air cleaner 900, after inserting the communication adaptor 800 into the plug 190 and inserting and then mounting the communication adaptor 800 into and on the wall socket 180 connected to a power supply network in a home, the air cleaner 900 is connected to an EMS 24 in operation S31.

Once the EMS 24 is connected to the air cleaner 900, the EMS 24 selects a power supply source to be supplied from a plurality of power supply sources to the air cleaner 900 according to an energy supply mode and the selected power source is distributed according to a control of the EMS 24, so that power is supplied to the air cleaner 900 in operation S32.

Once the power is supplied, an air cleaning process is performed by suctioning and filtering external air of the air of the air cleaner 900 and as soon as the air cleaner 900 is connected to the EMS 24, driving information of the air cleaner 900 is stored in the memory 918 during the air cleaning process in operation S33.

Moreover, while the air cleaner 900 is properly connected to the EMS 24, if driving abnormality (e.g., an air filtering process is not smooth or a filter replacement period is passed) is sensed by the controlling unit 916, the controlling unit 916 may transmit operational abnormality information stored in the memory 918 to the air cleaner customer service center 980 through the adaptor communication unit 820 or transmit a service request of the air cleaner 900 to the customer service center 980 when a user directly and manually presses a service button 990 on the main body 910 in operations S34 and S35.

That is, once the service button 990 is pressed, the communication adaptor 800 temporarily stores the corresponding information transmitted through the controlling unit 916 in the adaptor memory 860 and transmits the driving information about the air cleaner 900 to the EMS 24 in operation S36.

Moreover, the EMS 24 delivers the driving information of the air cleaner 900 stored in the adaptor memory 860 and a unique code of the air cleaner 900 to the air cleaner customer service center 980 and then the air cleaner customer service center 980 confirms whether the air cleaner 900 is normal based on the received information in operation S37.

Additionally, on receiving the requested customer service, the air cleaner customer service center 980 accepts the customer service after a home code of the EMS 24 with q requested customer service, the unique code of the air cleaner 900 and the driving information of the air cleaner 900 are confirmed and then delivers the reception related information to the EMS 24 that demands the customer service in operation S38.

Here, the reception related information delivered to the air cleaner customer service center 980 includes an estimated failure part, estimated cost for repair, repair period, and a position of a close service center.

Then, the EMS 24 delivers the received information to the air cleaner 900 through the communication adaptor 800 and a user confirms that the customer service request is completed through the display 970 and receives service without difficulties in operations S39, S40, and S41. Moreover, according to the determination (manually or automatically) about connection removal between the air cleaner 900 and the EMS 24, the connection removal may be selectively made in operation S42.

Figure 34:
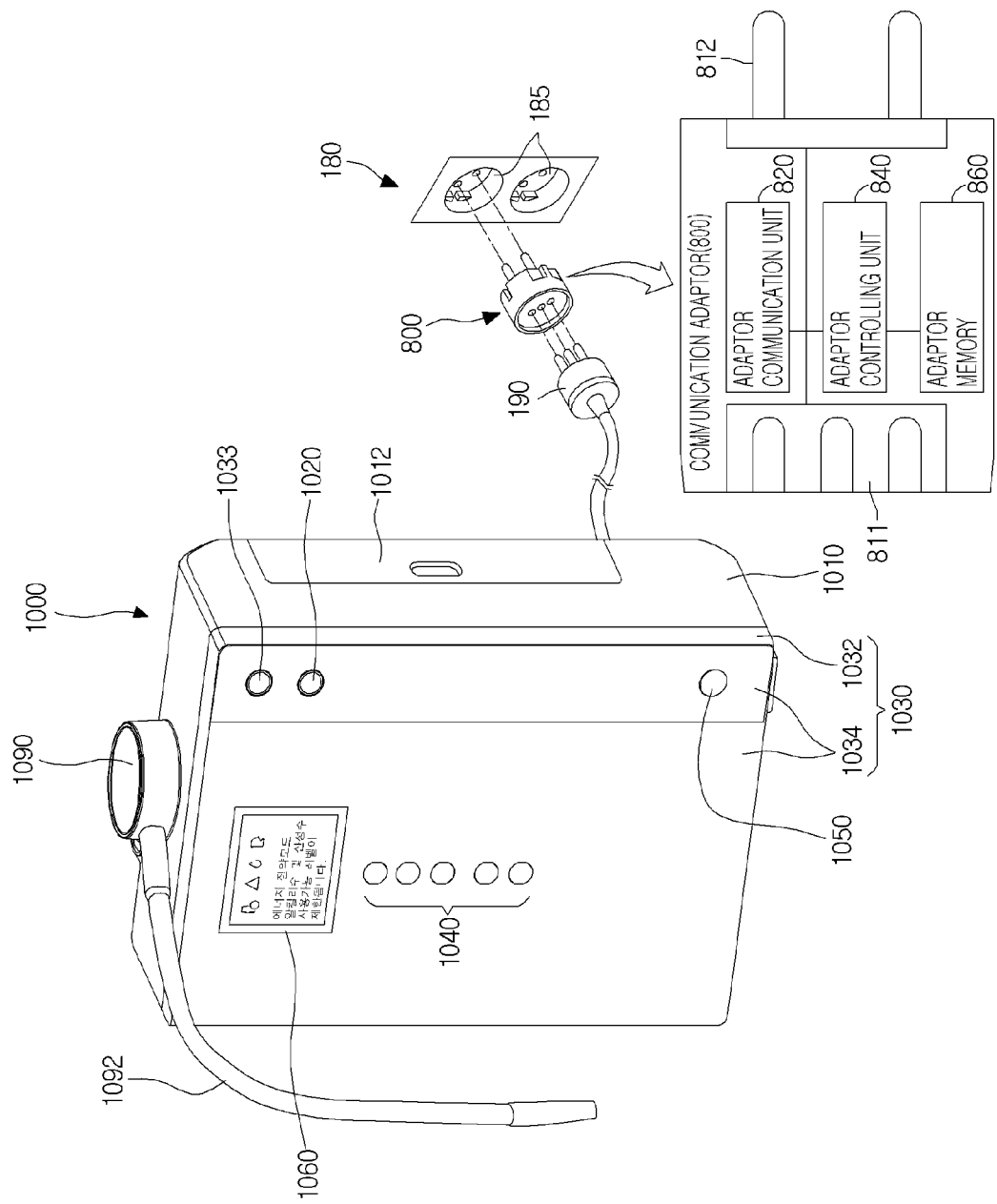
FIG. 34 is a view illustrating another embodiment of a home appliance according to an embodiment.
Figure 35:
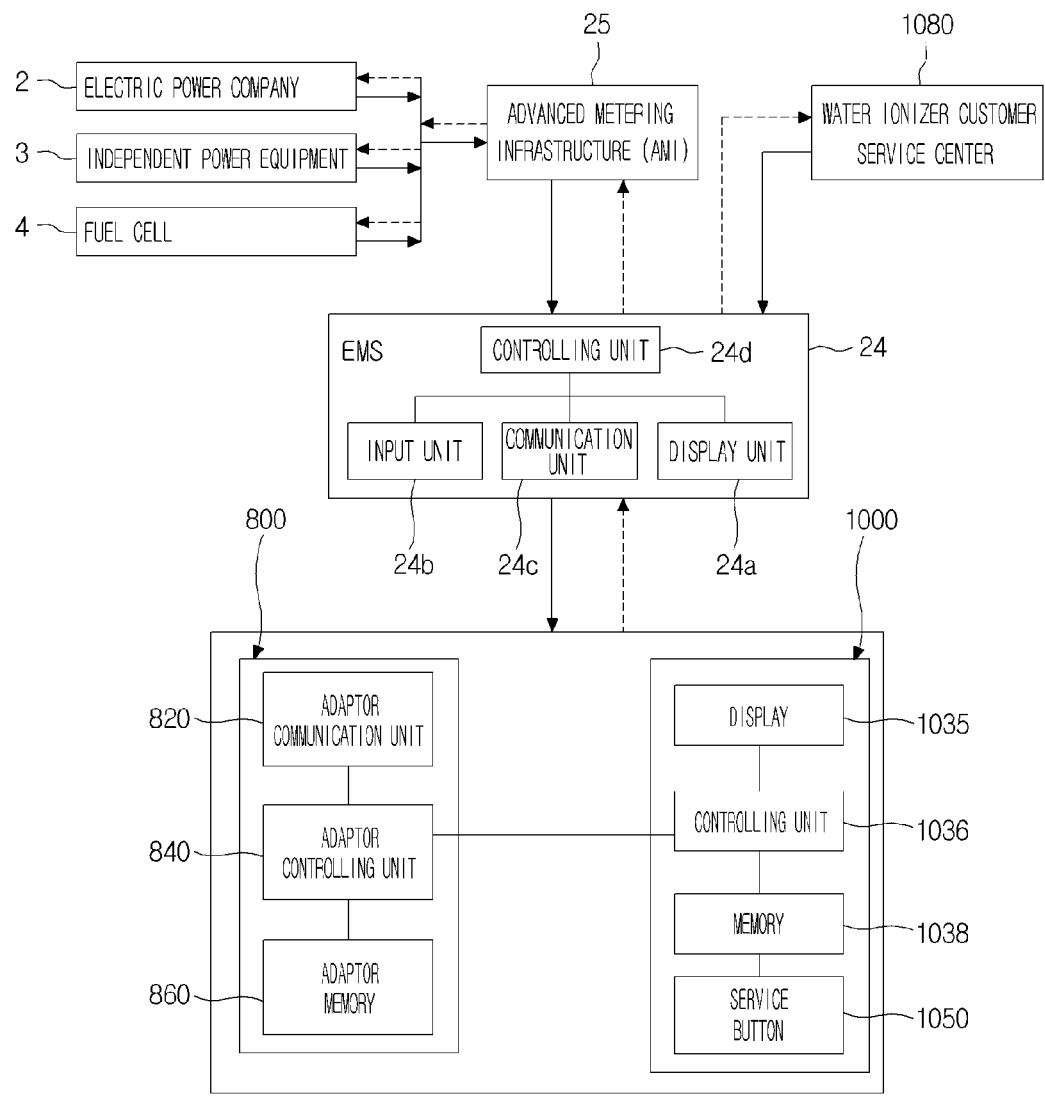
FIG. 35 is a system configuration for service of the home appliance shown in FIG. 34.
Figure 36:
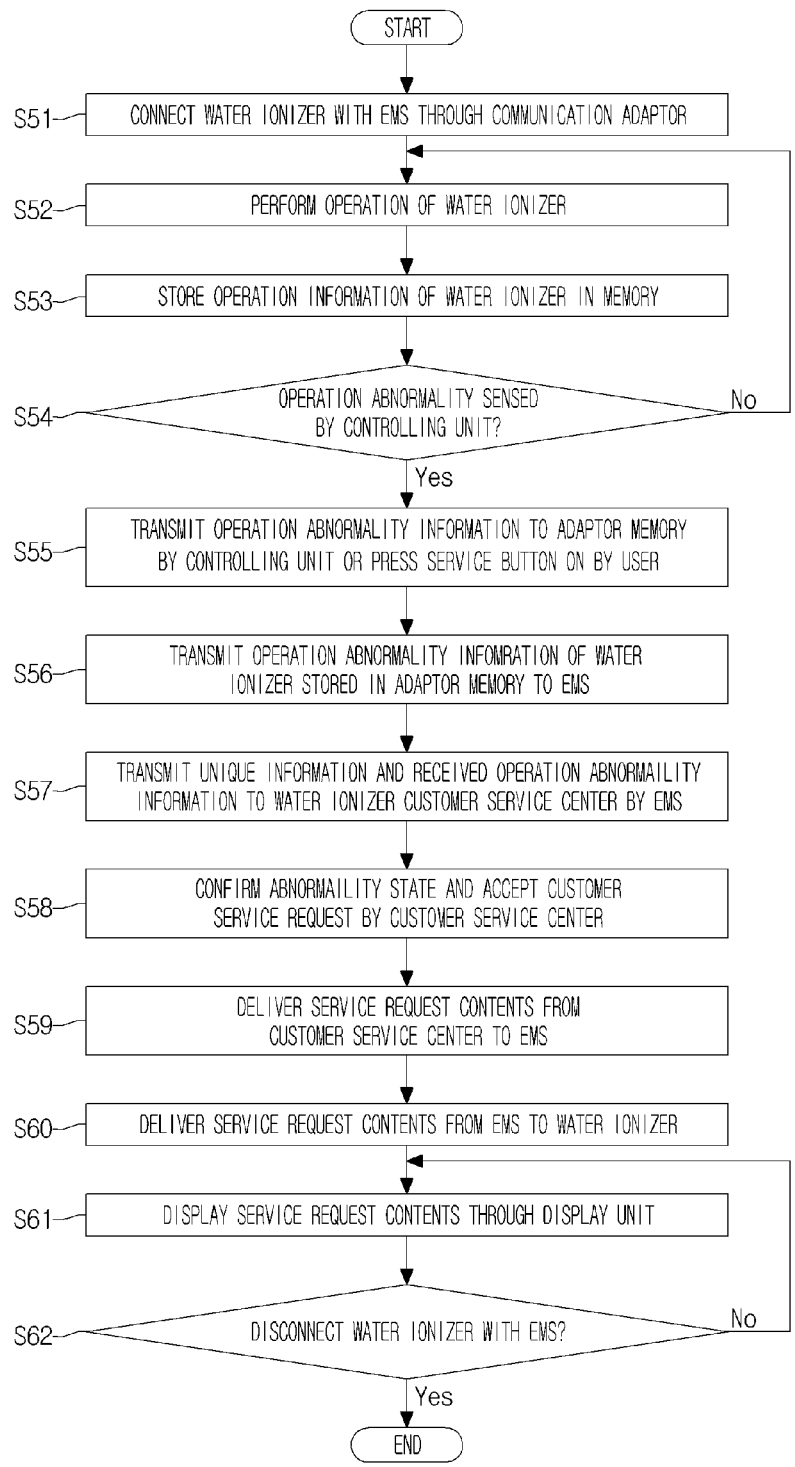
FIG. 36 is a flowchart illustrating a process when a customer service situation is accepted according to the system configuration of FIG. 35.

FIG. 34 is a view illustrating another embodiment of a home appliance according to an embodiment. FIG. 35 is a system configuration for service of the home appliance shown in FIG. 34. FIG. 36 is a flowchart illustrating a process when a customer service situation is accepted according to the system configuration of FIG. 35.

Referring to FIGS. 34 and 36, a water ionizer 1000 according to an embodiment includes a main body 1010 having an open front portion and a hollowed inner portion. The main body 1010 is coupled with a front cover 1032 covering an open front surface of the main body 1010, and deco panels 1034 coupled to the front cover 1032 to constitute the appearance of the water ionizer 1000, thereby forming a predetermined inner space of the main body 1010. An electrolyzer (not shown) is disposed in the inner space of the main body 1010 to produce ionized water.

A water pipe may be connected to the main body 1010 to supply source water for producing ionized water. At least one filter may be disposed in the inner space of the main body 1010 to purify water supplied through the water pipe. The filter can be easily attached or detached by opening and closing a filter cover 1012 disposed at a portion of the main body 1010.

The upper surface of the main body 1010 is provided with a nozzle holder assembly 1090 that is coupled with a water discharge nozzle 1092 for discharging ionized water. The nozzle holder assembly 1090 is rotatably installed on the main body 1010 to change a discharge direction of ionized water through the water discharge nozzle 1092.

An operation button 1033 is disposed at a side portion of the deco panel 1034 to input a command for operating or stopping the water ionizer 1000. The operation button 1033 may be a touch-type one, so that capacitance of the operation button 1033 can be sensed to transmit a control signal.

Additionally, the water ionizer 1000 includes a display 1060 connected to the power management network to confirm power supply information and a manipulation unit 1040 for inputting a control command by a user when the user sees the information through the display 1060.

In the above water ionizer 1000, a communication adaptor 800 for communicating with the EMS 24 and supplying power is connected to a plug 1080 for delivering an operating power like the above embodiment, so that power supply and two-way communication are provided.

That is, the communication adaptor 800 is mounted to connect between a socket 185 of the wall socket 180 connected to the power supply network and the plug 190 so that power supply and two-way communication may be performed.

In more detail, the communication adaptor 800 includes a first combining unit 811 formed in correspondence to a insertion mounting of the plug 190 and a second combining unit 812 inserted into the socket 185 with a shape formed in correspondence to the socket 185, so that the water ionizer 1000 may be connected to the power supply network.

Moreover, an adaptor memory 860 for storing operation information of the water ionizer 1000, an adaptor communication unit 820 for transmitting and receiving driving information through communication with a communication unit 24c of the EMS 24 and the air cleaner 900, and an adaptor controlling unit 840 are included in the communication adaptor 800.

For this, a data terminal for transmission and reception of data besides a power terminal is further equipped in a plug 190 of the water ionizer 1000 and the first connection unit 811 is formed in correspondence to this. Or, a power managing communication chip for transmitting and receiving driving information and power information to/from the adaptor communication unit 820 and the communication unit 24c of the EMS 24 may be further equipped in the water ionizer 1000.

Once the water ionizer 1000 is connected to a power supply network through the communication adaptor 800 according to the above configuration, a memory 1038 storing driving information is equipped in the water ionizer 1000 and based on the stored information in the memory 1038, a controlling unit 1036 for determining whether the water ionizer 1000 operates normally is equipped in the water ionizer 1000.

The controlling unit 1036 determines a normal operation of the water ionizer 1000 based on the information stored in the memory 1038 and an operating environment of a product. If the controlling unit 1036 determines that a filter replacement period is passed and an operation of the water ionizer 1000 is abnormal, information related to that is automatically transmitted to a customer service center 1080 through the adaptor communication unit 820.

Moreover, the water ionizer 1000 may further include a service button 1020 for transmitting the driving information stored in the memory 1038 to the air cleaner customer service center 1080 through the EMS 24 through a manual operation of a user. A user directly presses the service button 1020 when there is an operational fault in the water ionizer 1000.

Accordingly, when the adaptor controlling unit 840 transmits the operating information of the water ionizer 1000 stored in the adaptor memory 860 to the energy management device 24 through the adaptor communication unit 820 when a user presses the service button 1090. Additionally, the EMS 24 receiving the operating information of the water ionizer 1000 delivers the received operating information with a unique code of the water ionizer 1000 to the water ionizer customer service center 1080 so that a service request of the water ionizer is made.

Hereinafter, an operation according to an embodiment will be described.

Once the EMS 24 is connected to the water ionizer 1000, the EMS 24 selects a power supply source to be supplied from a plurality of power supply sources to the water ionizer 1000 according to an energy supply mode and the selected power source is distributed according to a control of the EMS 24, so that power is supplied to the water ionizer 1000 in operation S51.

Once the power is supplied, a user inputs a manipulation command through a manipulation unit 1030 of the water ionizer 1000. Then, operating information of the water ionizer 1000 is stored in the memory 1038 in operations S52 and S53.

Even when a predetermined command is inputted through the manipulation unit 1030, if the water ionizer 1000 does not operate normally, the controlling unit 1036 transmits automatically the operation abnormality information stored in the memory 1038 to the customer service center 1080 or a user may press the service button 1020 to request a service to the water ionizer customer service center 1080.

In more detail, when the controlling unit 1036 automatically transmits the operation abnormality information or a user presses the service button after confirming the operation abnormality, the communication adaptor 800 transmits the operation information of the water ionizer 1000 stored in the adaptor memory 860 to the EMS 24.

Moreover, the EMS 24 delivers the driving information of the water ionizer 1000 stored in the memory 1038 and a unique code of the water ionizer 1000 to the water ionizer customer service center 1080 and then the water ionizer customer service center 1080 confirms whether the water ionizer 1000 is normal based on the received information in operations S54, S55, S56, and S57.

Additionally, on receiving the requested customer service, the water ionizer customer service center 1000 accepts the customer service after a home code of the EMS 24 with q requested customer service, the unique code of the water ionizer 1000 and the driving information of the water ionizer 1000 are confirmed and then delivers the reception related information to the EMS 24 that demands the customer service in operations S58 and S59.

Then, the EMS 24 delivers the received information to the water ionizer 1000 through the communication adaptor 800 and a user confirms that the customer service request is completed through the display 1035 and receives service without difficulties in operations S60 and S61. Moreover, according to the determination (manually or automatically) about connection removal between the water ionizer 1000 and the EMS 24, the connection removal may be selectively made in operation S62.

Figure 37:
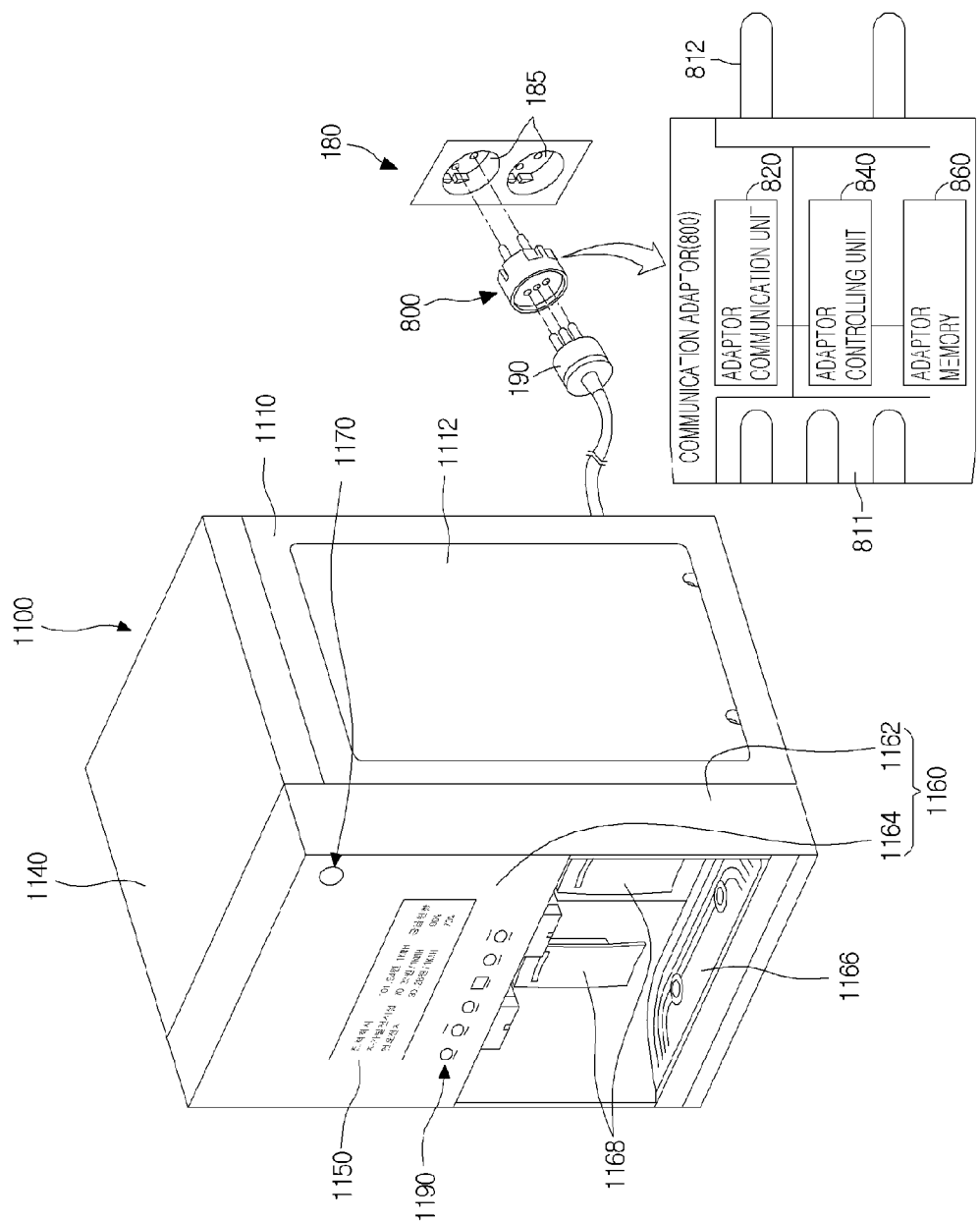
FIG. 37 is a view illustrating a home appliance according to further another embodiment.
Figure 38:
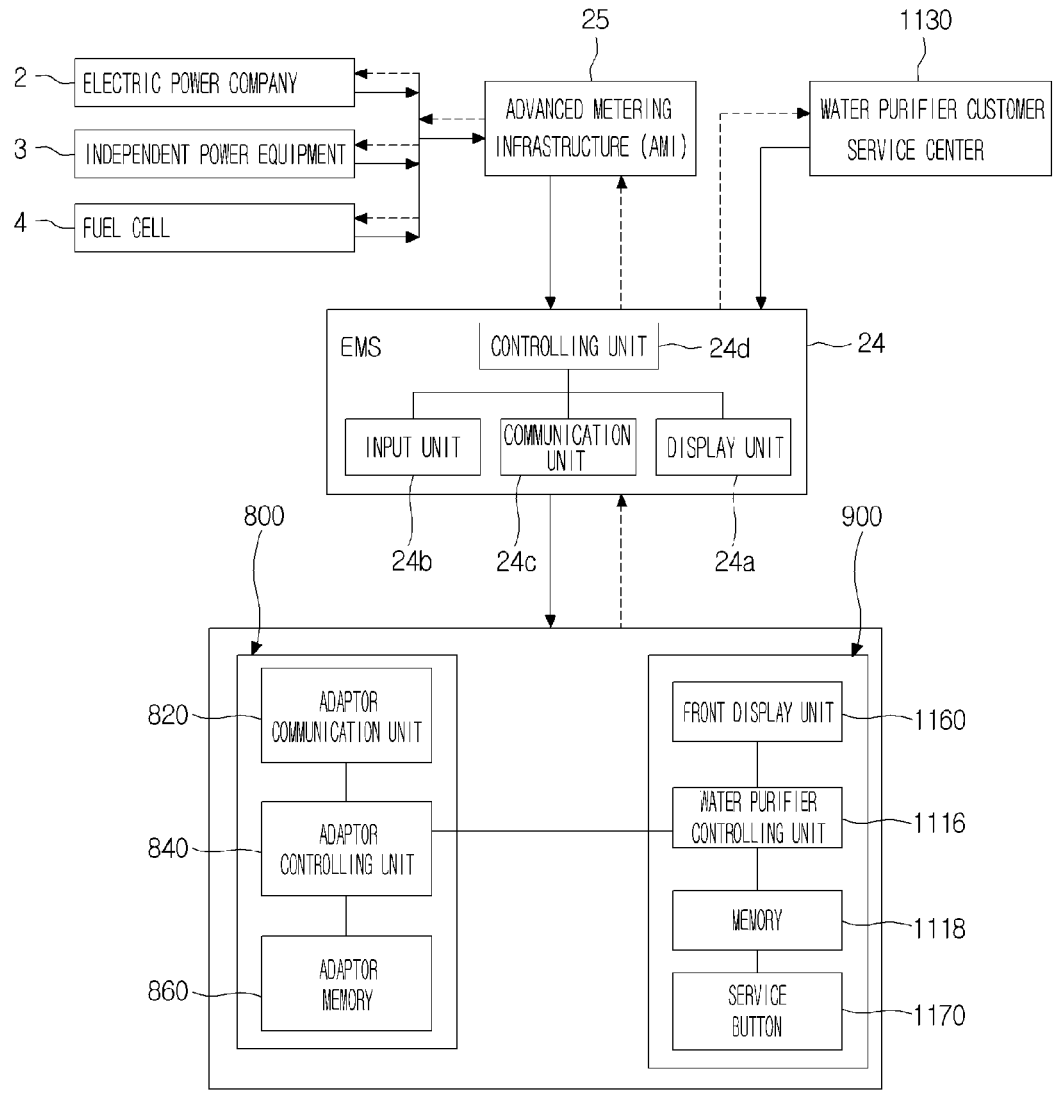
FIG. 38 is a system configuration for service of the home appliance of FIG. 37.
Figure 39:
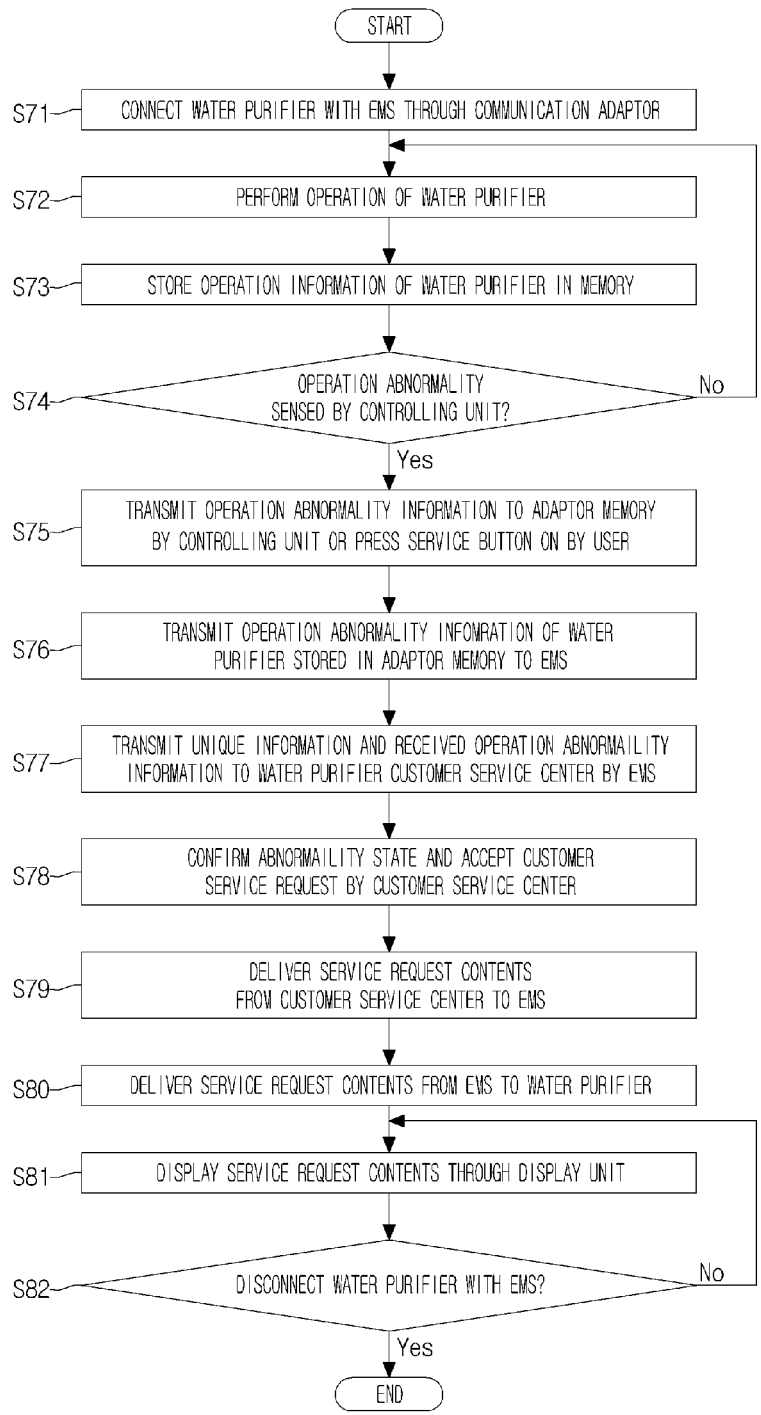
FIG. 39 is a flowchart illustrating a process when a customer service situation is accepted according to the system configuration of FIG. 38.

FIG. 37 is a view illustrating a home appliance according to further another embodiment. FIG. 38 is a system configuration for service of the home appliance of FIG. 37. FIG. 39 is a flowchart illustrating a process when a customer service situation is accepted according to the system configuration of FIG. 38.

In FIGS. 37 through 39, a water purifier 300 is shown as a home appliance. The water purifier 300 has an external appearance formed by a main body 1110 for a frame and a front assembly 1160 and a top cover 1140 mounted on the main body 1110.

Moreover, although not shown in the drawings, a plurality of filters for filtering natural water supplied, a water tank for receiving water purified by the filter, and a cool water tank and a warm water tank for cooling and heating purified water supplied from the water tank are included inside the main body 1110.

Additionally, an open predetermined portion for smooth management of the filter is formed at one side of the main body 1110. Moreover, a filter cover 1112 is selectively mounted on an opening at one side of the opened main body 1110, such that filter replacement may be made without difficulties after removing of the filter cover 1112.

Also, a front assembly 1160 for forming a portion of a front and side appearance is mounted at the front of the main body 1110 and a top cover 1140 for forming a top appearance is mounted on the top of the main body 1110.

More specifically, the front assembly 1160 includes a front cover 1162 for surrounding a portion of the side and the front of the main body 1110 and a deco plate 1164 for forming an appearance of the front cover 1162 combined thereto. The front cover 1162 has a bottom sunk toward the inside for providing a space for dispensing water and a flat top for providing a mounting position of the deco plate 1164.

Then, the deco plate 1164 includes an input unit 1190 of a touch input type for confirming an operation state of the water purifier 1100 and also inputting a control command and a display 1150 at the top of the input unit 1190 for confirming a control situation and input contents of a control command.

Also, a dispense lever 1168 for dispensing water is disposed at the sunken bottom of the front cover 1162. The dispense lever 1168 may be divided into a warm water lever (not shown) and a cool water lever (not shown) so that water having a temperature that a user selects is supplied.

In addition, a water gutter 1166 for receiving dropping water while water is supplied through the dispense lever 1168 is disposed at the bottom of the front assembly 11160 and since the gutter 1166 is selectively separated, a user personally may empty water received in the water gutter 1166.

Moreover, an enhanced glass plate of a corresponding size is formed at the fronts of the display 1150 and the input part 1190 and a function display unit for determining a position of the input unit 1190 is shown at the rear of the enhanced glass plate.

That is, the function display unit may display simple icons representing cool water or warm water indication and filter replacement period and continuous water dispense with a printed design. Accordingly, a user may confirm the function display unit and may manipulate the input unit 1190.

Moreover, a memory 1118 storing driving information is equipped in the main body 1140 and based on the stored information in the memory 918, a controlling unit 1116 for determining whether the water purifier 1100 operates normally is equipped in the main body 1140.

The memory 1118 stores information related to an operation of the water purifier 1100 (i.e., whether the operation is normal or not), an amount and purified water, a normal operation of the filter, and operations of various sensors at a predetermined time interval.

The controlling unit 1116 determines a normal operation of the water purifier 1100 based on the information stored in the memory 1118 and an operating environment of a product. If the controlling unit 1116 determines that a filter replacement period is passed and an operation of the water purifier 1100 is abnormal, information related to that is automatically transmitted to a customer service center 1130 through the adaptor communication unit 820.

Moreover, the main body 1140 may further include a service button 1170 for transmitting the driving information stored in the memory 1118 to the water purifier customer service center 1130.

Moreover, a display means for displaying customer service reception information delivered from the water purifier customer service center 1130 in correspondence to the information transmitted by the controlling unit 1116 or the service button 1170 is equipped in the main body 1140.

Hereinafter, effects according to an embodiment having the above configuration will be described.

If a user takes water using the water purifier 1100, after inserting the communication adaptor 800 into the plug 1130 and inserting and then mounting the communication adaptor 800 into and on the wall socket 180 connected to a power supply network in a home, the water purifier 1100 is connected to an EMS 24 in operation S71.

Once the EMS 24 is connected to the water purifier 1100, the EMS 24 selects a power supply source to be supplied from a plurality of power supply sources to the water purifier 1100 according to an energy supply mode and the selected power source is distributed according to a control of the EMS 24, so that power is supplied to the water purifier 1100.

Once the power is supplied, a water dispensing process is performed and as soon as the water purifier 1100 is connected to the EMS 24, driving information of the water purifier 1100 is stored in the memory 1118 during the water dispensing process in operations S72 and S73.

Moreover, while the water purifier 1100 is properly connected to the EMS 24, if driving abnormality (e.g., an air filtering process is not smooth or a filter replacement period is passed) is sensed by the controlling unit 1116, the controlling unit 1116 may transmit operational abnormality information stored in the memory 1118 to the customer service center 1130 through the adaptor communication unit 820 or transmit a service request of the water purifier 1100 to the customer service center 1130 when a user directly and manually presses a service button 1170 on the main body 1140.

That is, once the service button 1170 is pressed, the communication adaptor 800 temporarily stores the corresponding information transmitted through the controlling unit 1116 in the adaptor memory 860 and transmits the driving information about the water purifier 1100 to the EMS 24.

Moreover, the EMS 24 delivers the driving information of the air cleaner 1130 stored in the adaptor memory 860 and a unique code of the water purifier 1100 to the air cleaner customer service center 1130 and then the air cleaner customer service center 1130 confirms whether the water purifier 1100 is normal based on the received information in operations S74, S75, S76, and S77.

Additionally, on receiving the requested customer service, the air cleaner customer service center 1130 accepts the customer service after a home code of the EMS 24 with q requested customer service, the unique code of the water purifier 1100 and the driving information of the water purifier 1100 are confirmed and then delivers the reception related information to the EMS 24 that demands the customer service in operations S78 and S79.

Then, the EMS 24 delivers the received information to the water purifier 1100 through the communication adaptor 800 and a user confirms that the customer service request is completed through the front display unit 1160 and receives service without difficulties in operations S80 and S81. Moreover, according to the determination (manually or automatically) about connection removal between the water purifier 1100 and the EMS 24, the connection removal may be selectively made in operation S82.

Another embodiment is introduced.

The power adjusting device includes a communication unit for communication, a switch unit for selectively applying current to an energy consuming unit, and a timer for calculating a time that an operation of the switch is performed.

While power of an energy consuming unit is turned on/off, the timer calculates the elapsed time. Also, after a predetermined time elapses, whether to turn on or off the switch may be controlled.

As one example, when an off-peak time (energy price is relatively cheap) comes after 3 hours from a current time, the timer calculates the time elapsed from the current time and then, the energy consuming unit enters into an on-state after 3 hours.

Further another embodiment is introduced.

The power adjusting device may include a power meter for measuring a power amount applied to the energy consuming unit or a power amount used in the energy consuming unit. The energy managing unit or the central managing unit may control an operation of the energy consuming unit to adjust a usage amount of the energy consuming unit from a power amount measured in the power meter.

On the other hand, an additional controlling unit may be prepared in the power adjusting device. The controlling unit may turn on/off a switch by itself to apply power to the energy consuming unit based on the power amount information measured from the power meter.

Further another embodiment is introduced.

A power adjusting device in one energy consuming unit may include a detachable communication unit. The communication unit may operate to communicate with another energy consuming unit or an energy management unit. If the communication unit is combined with the power adjusting device, the power adjusting device recognizes a combination state of the communication unit and supplies power for an operation of the communication unit.

Further another embodiment is introduced.

A network system may include a plurality of energy consuming units. The plurality of energy consuming units include first energy consuming unit without a communication function and a second energy consuming unit with a communication function and selectively supplying a power source to the first energy consuming unit.

The second energy consuming unit may adjust a voltage or a current applied to the first energy consuming unit based on energy information or additional information received from an external. As one example, once high cost information is received, the voltage or the current applied to the first energy consuming unit may be cut off.

Moreover, the second energy consuming unit includes a power output terminal connected to the first energy consuming unit and a power measuring unit for sensing power consumption of the first energy consuming unit. The second energy consuming unit may adjust a voltage or a current applied to the first energy consuming unit if power consumption of the first energy consuming unit sensed in the power measuring unit exceeds a predetermined power value.

In relation to a network system according to an embodiment, electric products in a home may be driven and controlled using energy information from a supplier and energy usage cost and power consumption may be reduced, so that the possibility of industrial application is excellent.

According to the embodiments, an energy source is effectively produces, uses, distributes, stores and the like, so that it is possible to perform the effective management of the energy source.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A network system comprising:
   a home network consuming energy generated from an energy generating unit provided at a utility network and including an electric product operating based on energy information including at least one energy price information; and
   a power adjusting device through which a current or a voltage supplied for an operation of the electric product is passed, the power adjusting device being configured to reduce energy cost or an energy amount used by adjusting a voltage or current amount applied to the electric product based on the energy information,
   wherein the power adjusting device comprises:
      a body;
      a communication unit disposed inside the body to communicate with an energy managing unit having the energy information;
      a power measuring unit disposed inside the body to sense power amount consumed in the electric product;
      a power reducing unit to reduce current or power supplied to the electric product;
      a memory to store information of a reference power amount; and
      a controller to determine current or power supplied to the electric product based on the information of the consumed power amount and the reference power amount,
      wherein the controller controls the power reducing unit such that the power reducing unit reduces current applied to the electric product when the consumed power amount exceeds the reference power amount, and increases current applied to the electric product when the consumed power amount becomes lower than the reference power amount.

2. The network system according to claim 1, wherein the power reducing unit comprises a switch unit adjusting a power or a current applied to the electric product according to whether the energy information is high or low cost information.

3. The network system according to claim 1, wherein the memory stores information about operation of a plurality of the electric products.

4. The network system according to claim 3, wherein the information related to the driving of the plurality of electric products comprises priority information about the driving of the plurality of electric products or supply rate information of energy distributed to the plurality of electric products.

5. The network system according to claim 1, wherein a time or a time interval that the electric product operates is determined according to information delivered from the energy managing unit; and
   the power adjusting device further comprises a timer calculating a time to allow the the electric product to be turned on/off at the time or during the time interval.

6. The network system according to claim 1, wherein the power adjusting device comprises a display unit displaying price information and a charge state of energy to an external.

7. The network system according to claim 1, wherein the power adjusting device further comprises:
   a connecting plug connected to be communicated with the energy managing unit and receiving energy for charging;
   a charging unit provided for charging of energy delivered through the connecting plug;
   a home appliance interface delivering a power source charged as the electric product is connected through a connection cable, to the electric product; and
   a controlling unit processing a control signal for charging, supply, and communication of energy.

8. The network system according to claim 7, wherein the connecting plug comprises:
   a plug communication unit communicating with the energy managing unit;
   a switch cutting off selectively energy supplied to the charging unit according to price information of energy received through the plug communication unit; and
   a plug controlling unit controlling supply of energy for charging from the power supply source below the highest price, based on price information received from the energy managing unit.

9. The network system according to claim 1, further comprising a customer service center responsible for custom service of the electric product and connected to be communicated with the energy managing unit.

10. The network system according to claim 1, wherein the electric product or the energy managing unit comprises a service button requesting customer service to a customer service center; and
    information about operation abnormality of the electric product is provided to the customer service center to request the customer service.

11. The network system according to claim 1, wherein the energy information comprises additional information including time information and weather information.

12. The network system according to claim 11, wherein the energy price information comprises at least one of an electricity charge, a power amount, a change rate of electricity charge, a change rate of power amount, an average value of electricity charge, and an average value of power amount.

13. The network system according to claim 1, wherein the energy information further comprises information besides energy price; and
    the information beside energy price is one of energy reduction, emergency, net safety, an output amount, an operation priority, and an energy consumption amount.

14. The network system according to claim 1, wherein the body of the power adjusting device includes a first coupler to separately couple with a connection line of the electric product and a second coupler separately couple with a power supply source.

\* \* \* \* \*